United States Patent
Yoshino et al.

(10) Patent No.: US 7,753,413 B2
(45) Date of Patent: Jul. 13, 2010

(54) VAPOUR-COMPRESSION TYPE REFRIGERATING MACHINE AND DOUBLE PIPE STRUCTURE AND DOUBLE PIPE JOINT STRUCTURE PREFERABLY USED THEREFOR

(75) Inventors: Makoto Yoshino, Okazaki (JP); Fumiaki Nakamura, Kariya (JP); Satoru Yamanashi, Kariya (JP); Shun Kurata, Kariya (JP); Takahisa Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 413 days.

(21) Appl. No.: 10/765,758

(22) Filed: Jan. 26, 2004

(65) Prior Publication Data
US 2004/0261450 A1    Dec. 30, 2004

(30) Foreign Application Priority Data

| Jan. 28, 2003 | (JP) | ............................. 2003-019038 |
| Feb. 4, 2003 | (JP) | ............................. 2003-027285 |
| Feb. 21, 2003 | (JP) | ............................. 2003-044806 |
| Oct. 27, 2003 | (JP) | ............................. 2003-366318 |

(51) Int. Cl.
 *F16L 7/00* (2006.01)
(52) U.S. Cl. .............................. 285/123.12; 285/123.1; 285/123.5; 285/330; 285/382
(58) Field of Classification Search ............. 285/122.1, 285/123.1, 123.12, 256, 330, 382, 904, 123.3, 285/123.4, 123.5
See application file for complete search history.

(56) References Cited

U.S. PATENT DOCUMENTS

| 2,143,843 A | * | 1/1939 | Cowan | ......................... 285/18 |
| 3,980,112 A | * | 9/1976 | Basham | ................... 285/123.15 |
| 4,732,414 A | * | 3/1988 | Inaba | ..................... 285/123.15 |
| 4,796,924 A | * | 1/1989 | Kosugi et al. | .................. 285/39 |
| 5,265,652 A | * | 11/1993 | Brunella | ....................... 141/59 |

(Continued)

FOREIGN PATENT DOCUMENTS

JP    54-146410    10/1979

(Continued)

OTHER PUBLICATIONS

Office Action in corresponding JP Application No. 2003-027285 dated Jul. 20, 2006 with English translation.

*Primary Examiner*—Aaron M Dunwoody
*Assistant Examiner*—Fannie Kee
(74) *Attorney, Agent, or Firm*—Harness, Dickey & Pierce, PLC

(57) ABSTRACT

A refrigerant pipe connected to a suction side of a compressor and a refrigerant pipe connected to a discharge side of the compressor are integrated into one body. A refrigerant pipe connected to an inlet side of a condenser and a refrigerant pipe connected to an outlet side of the condenser are integrated into one body. A refrigerant pipe connected to an inlet side of a decompressor and a refrigerant pipe connected to an outlet side of the temperature detecting portion are integrated into one body. In these piping structures, a double pipe structure and a double pipe joint structure are adopted in which an inner pipe for circulating high pressure fluid and an outer pipe for circulating low pressure fluid are formed separate from each other and the respective end portions of the pipes are joined to a joint member by plastically deforming the pipes.

12 Claims, 35 Drawing Sheets

U.S. PATENT DOCUMENTS

| | | |
|---|---|---|
| 5,492,376 A | 2/1996 | Usui et al. |
| 5,749,138 A | 5/1998 | Usui et al. |
| 6,533,328 B2 | 3/2003 | Takamatsu |
| 6,866,090 B2 | 3/2005 | Takamatsu et al. |
| 2004/0169369 A1 | 9/2004 | Takamatsu et al. |

FOREIGN PATENT DOCUMENTS

| | | |
|---|---|---|
| JP | 58-132280 | 9/1983 |
| JP | 59-10589 | 1/1984 |
| JP | 59-63289 | 4/1984 |
| JP | 60-201184 | 10/1985 |
| JP | 61-84490 | 4/1986 |
| JP | 61-173887 | 10/1986 |
| JP | 63-135092 | 9/1988 |
| JP | 3-79063 | 8/1991 |
| JP | 05-141580 | 6/1993 |
| JP | 06-300176 | 10/1994 |
| JP | 7-35271 | 2/1995 |
| JP | 2595578 | 1/1997 |
| JP | 09-053780 | 2/1997 |
| JP | 2000-046278 | 2/2000 |
| JP | 2001-235080 | 8/2001 |
| JP | 2001-235081 | 8/2001 |
| JP | 2001-277842 | 10/2001 |

* cited by examiner

VAPOUR-COMPRESSION TYPE REFRIGERATING MACHINE AND DOUBLE PIPE STRUCTURE AND DOUBLE PIPE JOINT STRUCTURE PREFERABLY USED THEREFOR

BACKGROUND OF THE INVENTION

1. Field of the Invention

The present invention relates to a vapour-compression type refrigerating machine. More particularly, the present invention relates to a vapour-compression type refrigerating machine for vehicle use, that is, the present invention relates to an air-conditioner for vehicle use and a double pipe structure and double pipe joint structure provided with an inner pipe and outer pipe preferably used for this refrigerating machine.

2. Description of the Related Art

In the case of a conventional vapour-compression type refrigerating machine, a refrigerant pipe made of rubber, which is connected with the suction side of the compressor, and a refrigerant pipe made of rubber, which is connected with the discharge side of the compressor, are formed into a double cylindrical shape being integrated into one body. This structure is disclosed, for example, in the official gazette of Japanese Patent No. 2595578.

There is provided an invention in which a high pressure refrigerant passage communicating with the compressor, condenser and evaporator is integrated with a low pressure refrigerant passage. For example, this structure is disclosed in the official gazette of Japanese Unexamined Patent Publication No. 2001-277842.

However, according to the invention described in Japanese Patent No. 2595578, only the pipe connected with the compressor is integrated into one body. Therefore, it is difficult to further reduce the number of pipes and the number of joints to connect the pipes.

According to the invention described in Japanese Unexamined Patent Publication No. 2001-277842, the high pressure refrigerant passage and the low pressure refrigerant passage are integrated into one body. Therefore, refrigerant which has flowed out from the evaporator must be returned to the compressor via the condenser. Accordingly, the length of the low pressure refrigerant passage is extended by the length of the condenser. As a result, there is a high possibility that the pressure loss of refrigerant is increased and the power consumption of the compressor is increased. In general, in the air-conditioner composing a refrigerating cycle, pipe-shaped piping members are connected among the compressor, condenser, expansion valve and evaporator for circulating refrigerant. When the length of the piping members increases, the manufacturing cost is raised. Therefore, in the case of an air-conditioner, investigations have been made into the arrangement of each device so that the piping length can be made as short as possible. However, in the case of an air-conditioner mounted on a vehicle, for example, when an air-conditioner is mounted on a one-box type vehicle, the length of piping is greatly increased to lay the piping members for the rear seat evaporator.

In order to solve the above problems, it is conventional to use a double pipe so that the length of piping can be reduced. For example, in Japanese Unexamined Patent Publication No. 2001-235081, the double pipe 71 is described which is composed in such a manner that the inner pipe 72 and the outer pipe 73 are integrally formed into one body by means of extrusion or drawing. According to this double pipe 71, as shown in FIGS. 18 and 19, the inner pipe 72 and the outer pipe 73 are connected with each other by the connecting ribs 74, which are radially arranged, connecting the outer circumferential face of the inner pipe 72 with the inner circumferential face of the outer pipe 73. At the end portion, a forward end portion of the outer pipe 73 is cut off so that the inner pipe 72 can be protruded from the outer pipe 73, and the inner pipe 72 is joined to the joint member 80. Further, the forward end portion of the outer pipe 73 is closed, and the pipe-shaped connecting member 75, which surrounds the protruding inner pipe 72, is joined between the protruding portion 72a of the inner pipe 72 and the outer pipe 73. In order to connect the passage of fluid flowing in the outer pipe 73 with the joint member 80, the connection member 75 is connected with the joint member 80 via the piping member 76 for the use of extension.

As shown in FIG. 12, this double pipe 71 is applied to an air-conditioner for automobile use mounted on a one-box type vehicle and laid in the passage from the air-conditioner 51, which is arranged outside the passenger's chamber, to the air-conditioner unit 61 used for a rear seat.

The double pipe is originally employed for the object of reducing the manufacturing cost by decreasing the piping length. Therefore, it is not preferable that, for example, the structure of connecting the joint member becomes complicated and the manufacturing cost is raised. For example, according to the structure shown in the official gazette of Japanese Unexamined Patent Publication 2001-235081, in order to protrude the inner pipe 72, it is necessary to cut off the forward end portion of the outer pipe 73, which increases the machining cost. Further, as an outer pipe passage, it is necessary to arrange the piping member 76 used for extension in the joint member 80. Therefore, the manufacturing cost is increased for arranging the connecting member 75. As a result, the manufacturing cost is increased.

As described in the official gazette of Japanese Unexamined Patent Publication No. 2001-235081, the double pipe structure is composed in such a manner that the inner and the outer pipe are formed different from each other, the inner pipe is inserted into the outer pipe and then an end portion of the outer pipe is connected to the inner pipe with pressure by means of drawing so that the inner and the outer pipe can be integrated into one body. According to this structure, the manufacturing cost is increased when the end portion of the outer pipe is subjected to drawing so that the end portion of the outer pipe can be connected to the inner pipe with pressure. Further, it is necessary to newly compose a structure for joining the joint member.

Further, the double pipe joint structure for connecting this double pipe is disclosed in the official gazette of Japanese Unexamined Patent Publication No. 2001-235081.

According to this double pipe, as shown in FIG. 36, the inner pipe 72 and the outer pipe 73 are connected with each other by the connecting ribs, which are radially arranged, connecting the outer circumferential face of the inner pipe 72 with the inner circumferential face of the outer pipe 73. At the end portion, a forward end portion of the outer pipe 73 is cut off so that the inner pipe 72 can be protruded from the outer pipe 73, and the inner pipe 72 is joined to the joint member 80. Further, the forward end portion of the outer pipe 73 is closed, and the pipe-shaped connecting member 75, which surrounds the protruding inner pipe 72, is joined between the protruding portion 72a of the inner pipe 72 and the outer pipe 73. In order to connect the passage of fluid flowing in the outer pipe 73 with the joint member 80, the connection member 75 is connected with the joint member 80 via the piping member 76 for the use of extension.

The forward end portion of the inner pipe 72 and the forward end portion of the piping member 76 used for extension are connected with the first joint member 80. After the male portions 81, 82, which are formed in the first joint member 80, have been respectively joined to the female portions of the second joint member 85 connected with the two different piping members, the first joint member 80 is connected with the second joint member 85 by the bolts 86 and others.

Further, in the joint member for connecting these double pipes, the male portions 81, 82 of the first joint member 80 to connect the inner pipe 72 with the outer pipe 73 of one double pipe 71 are connected with the female portions of the second joint member 85 to connect two piping members which are laid differently, and then the male portions and the female portions are connected by the bolts 86 and others. Therefore, it is impossible to instantly connect the double pipe 71 with the joint member 80. Therefore, it takes time and much labor to make the connection. Further, the first joint member 80 and the second joint member 85 are respectively joined to the inner pipe 72 and the outer pipe 73 (the piping member 76 used for extension) by means of soldering or welding. Accordingly, the sizes of the respective joint members are increased, and it takes time to join the inner pipe to the outer pipe.

SUMMARY OF THE INVENTION

In view of the above points, it is a first object of the present invention to provide a new vapour-compression type refrigerating machine which is different from a conventional vapour-compression type refrigerating machine. It is a second object of the present invention to provide a structure in which the number of pipes and the number of joints to connect the pipes are further reduced.

It is a third object of the present invention to provide a double pipe structure in which the cost can be reduced when the double pipe is joined to a joint member.

It is a fourth object of the present invention to provide an inexpensive double pipe joint structure in which double pipes, the inner pipes and outer pipes of which are formed integrally with or differently from each other, can be easily connected with each other or alternatively a double pipe and two piping members, which are arranged in parallel with each other, can be easily connected so that the manufacturing cost can be reduced.

In order to accomplish the above objects, in the first aspect of the present invention, a vapour-compression type refrigerating machine is provided, by which heat is moved from the low temperature side to the high temperature side, and the vapour-compression type refrigerating machine comprises: a compressor for sucking and compressing refrigerant; a condenser for cooling refrigerant of high pressure; a decompressing means for decompressing refrigerant; and an evaporator for evaporating refrigerant of low pressure, wherein a refrigerant pipe connected on the suction side of the compressor and a refrigerant pipe connected on the discharge side of the compressor are integrated with each other into one body and, further, a refrigerant pipe connected with the inlet side of the condenser and a refrigerant pipe connected with the outlet side of the condenser are integrated with each other into one body.

Due to the above structure, the number of pipes and the number of joints to join the pipes can be reduced compared with a conventional refrigerating machine.

Accordingly, the time necessary for assembling the refrigerant pipe can be reduced and, further, the piping can be simply arranged. Therefore, the mounting property for a vapour-compression type refrigerating machine on a vehicle can be enhanced.

The present invention provides a vapour-compression type refrigerating machine, in which the decompressing means is a temperature type expansion valve in which a variable throttling portion for adjusting the degree of throttle opening according to the superheat degree of refrigerant on the outlet side of the evaporator and a temperature detecting portion for detecting the degree of super heat of refrigerant are integrated into one body, and the refrigerant pipe connected with the inlet side of the decompressing means and the refrigerant pipe connected with the outlet side of the temperature detecting portion are integrated into one body.

The present invention provides a vapour-compression type refrigerating machine, further comprising an intermediate joint by which: the refrigerant pipe connected with the discharge side of the compressor is connected with the refrigerant pipe connected with the inlet side of the condenser; the refrigerant pipe connected with the outlet side of the condenser is connected with the refrigerant pipe connected with the inlet side of the decompressing means; and the refrigerant pipe connected with the outlet side of the temperature detecting portion is connected with the refrigerant pipe connected with the suction side of the compressor.

Due to the foregoing, different from a conventional refrigerating machine, a refrigerant at low pressure, which has flowed out from the evaporator, is returned to the compressor without flowing in the condenser. Accordingly, the length of the low pressure passage can be shortened compared with the length of the low pressure passage of a conventional refrigerating machine. Therefore, the pressure loss of refrigerant can be reduced, and the power consumption can be prevented from being increased.

The present invention provides a vapour-compression type refrigerating machine, by which heat is moved from the low temperature side to the high temperature side, comprising: a compressor for sucking and compressing refrigerant; a condenser for cooling refrigerant of high pressure; a decompressing means for decompressing refrigerant; and an evaporator for evaporating refrigerant of low pressure, wherein a refrigerant pipe connected on the suction side of the compressor and a refrigerant pipe connected on the discharge side of the compressor are integrated with each other into one body and, further, a refrigerant pipe connected with the inlet side of the condenser and a refrigerant pipe connected with the outlet side of the condenser are integrated with each other into one body.

In the present invention, the pipe in which the two types of refrigerant pipes are integrated into one body is integrally formed into one body by means of extrusion or drawing.

In the present invention, the length of the pipe from the intermediate joint to the condenser is smaller than the length of the pipe from the intermediate joint to the decompressing means.

Due to the foregoing, it is possible to suppress a heat exchange between the refrigerant, which has flowed out from the condenser, and the refrigerant flowing into the condenser. Therefore, it is possible to prevent the heat absorbing capacity of the evaporator from deteriorating by an increase in the enthalpy of the refrigerant flowing into the evaporator.

In order to solve the above problems, in the double pipe structure of the second aspect of the present invention, the inner pipe and the outer pipe are formed differently from each other and joined respectively to the joint member by the plastic deforming means. That is, the joint members are arranged at both end portions of the double pipe, and the inner pipe and the outer pipe are differently respectively connected with the joint members when either the inner and the outer pipe or the joint member is plastically deformed. Therefore, the inner pipe and the outer pipe are supported by the joint members at both end portion. Accordingly, it is possible to avoid the process in which the inner pipe and the outer pipe are joined to each other. Therefore, the manufacturing cost can be reduced.

In the present invention, a specific aspect of the plastic deforming means is described as follows. After a forward end portion of the inner pipe is inserted into the joint member, an end portion of the inner pipe is expanded from the inside to the outside, so that the inner pipe can be connected to the joint member with pressure. Alternatively, a forward end portion of the inner pipe is subjected to bead machining by which an expanded diameter portion is formed at the forward end portion of the inner pipe. Then, a diameter of the outer circumferential face of the bead portion is formed to be larger than a diameter of the inner circumferential face of the joint member, and the bead portion is press-fitted into the inner pipe. In this way, the inner pipe can be joined to the joint member by plastic deformation. After a forward end portion of the outer pipe is externally engaged with the male portion of the joint member, the forward end portion of the outer pipe is plastically deformed by means of drawing so that it can be joined to the joint member.

Due to the foregoing, the inner pipe and the outer pipe can be respectively differently joined to the joint member. Therefore, in the same manner as that of the second aspect described before, both end portions of the inner and the outer pipe are supported by the joint member. Accordingly, it is possible to avoid a process in which the inner pipe and the outer pipe are joined to each other, and the manufacturing cost can be reduced.

In the present invention, another aspect of the plastic deforming means is described as follows. After a forward end portion of the inner pipe is inserted into the joint member, an end portion of the inner pipe is expanded from the inside to the outside, so that the inner pipe can be connected to the joint member with pressure. Alternatively, a forward end portion of the inner pipe is subjected to bead machining by which an expanded diameter portion is formed at the forward end portion of the inner pipe. Then, a diameter of the outer circumferential face of the bead portion is formed to be larger than a diameter of the inner circumferential face of the joint member, and the bead portion is press-fitted into the inner pipe. In this way, the inner pipe can be joined to the joint member by plastic deformation. After a forward end portion of the outer pipe is internally engaged with the female portion of the joint member, the forward end portion of the male portion of the joint member is plastically deformed by means of drawing so that it can be joined to the outer pipe.

Due to the foregoing, the inner pipe and the outer pipe can be respectively differently joined to the joint member. Therefore, in the same manner as that of the second aspect described before, both end portions of the inner and the outer pipe are supported by the joint member. Accordingly, it is possible to avoid a process in which the inner pipe and the outer pipe are joined to each other, and the manufacturing cost can be reduced.

According to the present invention, when sealing members are interposed in the joining portion between the inner pipe and the joint member and also in the joining portion between the outer pipe and the joint member, it is possible to prevent refrigerant circulating in the inner pipe or refrigerant circulating in the outer pipe from leaking outside, and the property of air-tightness can be enhanced.

Further, according to the present invention, when the inner pipe is arranged inside the outer pipe so that the inner pipe and the outer pipe can be formed into a double structure, as pressure in the outer pipe is higher than the atmospheric pressure, a difference in pressure between the outside and the inside of the inner pipe can be reduced. According to the reduction of the difference in pressure, the rigidity of the inner pipe can be decreased to be lower than that of the outer pipe. Accordingly, the manufacturing cost can be reduced.

In the present invention, in the case where piping is conducted when a portion of the double pipe in the longitudinal direction, in which the inner pipe is arranged in the outer pipe, is bent, there is a possibility that the inner pipe interferes with the outer pipe in the case of bending the double pipe. For example, there is a possibility that abrasion is caused in either the outer pipe or the inner pipe by vibration generated when a vehicle is running. When the double pipe is composed in such a manner that the support members are interposed between the inner pipe and the outer pipe, it becomes possible to prevent interference between the inner pipe and the outer pipe.

In the third aspect of the present invention, the inner pipe and the outer pipe are formed integrally with or differently from each other and connected by the connecting means, and the first double pipe and the second double pipe are connected with each other by the joint means.

When one of the first double pipe and the second double pipe is made to proceed to the other double pipe, the joint means is elastically deformed and the diameter is expanded. When one double pipe is further made to proceed, the diameter of the joint means is contracted, so that the first double pipe and the second double pipe can be connected with each other, that is, the connection can be accomplished through a one action operation. Therefore, the working property can be greatly enhanced. Further, it becomes unnecessary to connect both the pipes by means of soldering or welding. Therefore, the manufacturing cost can be reduced.

According to the present invention, the joint means in the third aspect of the present invention includes: a joint member, one end of which is joined to one double pipe by the plastically deforming means; and an engaging member having an elastic engaging portion, the diameter of which can be expanded and contracted. Due to the above structure, for example, when the second double pipe is moved toward the first double pipe, the outer pipe of the second double pipe pushes the elastic engaging portion of the engaging member and enters the joint member while expanding the diameter. When the outer pipe of the second double pipe reaches a predetermined position, the diameter of the elastic engaging portion of the engaging member is contracted and the engaging member engages with the outer pipe of the second double pipe.

At this time, the inner pipe of the second double pipe proceeds into the joint member simultaneously when the second double pipe proceeds. Therefore, the inner pipe of the second double pipe engages and connects with the inner pipe of the first double pipe.

Accordingly, the first double pipe and the second double pipe are connected with each other by the joint member through a one action operation without using a means of soldering or welding. Therefore, the connection can be conducted in a very short period of time, and the working property can be enhanced and the manufacturing cost can be reduced.

According to the present invention, as the inserting groove portion for inserting the elastic engaging portion is formed in the joint member, the elastic engaging portion of the engaging member can be inserted. Therefore, while a movement of the engaging member is restricted by the joint member in the axial direction, the engaging member can be attached. At the same time, the elastic engaging portion, which is inserted into the inserting groove portion, can be instantly engaged with the second double pipe by elasticity. Therefore, the working property can be enhanced. Further, as the engaging member composed of one member can be formed into a cylindrical shape covering the joint member, the cost of the engaging member itself can be reduced, and a double pipe joint of a compact structure can be provided.

According to the present invention, only when one end of the joint member described above is joined to the groove portion formed in the outer pipe of the first double pipe by means of drawing the end portion of the pipe, the outer pipe of the second double pipe can be inserted. Therefore, the joint member can be easily attached, and the structure can be made compact. Further, the outer pipe of the second double pipe can be easily inserted.

In the present invention, the engaging member includes horizontal window portions which alternately extend from both end faces in the axial direction. Therefore, the thick portion in which the horizontal window portions are not formed can be bent round one end. When an elastic engaging portion is arranged in the forward end portion, for example, the elastic engaging portion, which is pushed by the outer pipe of the second double pipe, can be easily expanded, and the outer pipe of the second double pipe can be made to proceed into the joint member. Accordingly, the first double pipe and the second double pipe can be joined to each other through a one action operation, and the working property can be greatly enhanced.

Further, in the present invention, a groove portion is formed on the outer pipe of the second double pipe in the circumferential direction. Therefore, when the second double pipe proceeds into the joint member and reaches a predetermined position, the elastic engaging portion of the engaging member can be engaged with the groove portion. Therefore, a movement in the axial direction of the outer pipe of the second double pipe, which is engaged with the engaging member, is restricted, and the outer pipe of the second double pipe can be positively connected to the first double pipe.

In the present invention, another aspect is shown in which the above engaging member is engaged with, for example, the outer pipe of the second double pipe. When a ring member is attached to the groove portion formed on the outer pipe of the second double pipe, the elastic engaging portion of the engaging member inserted into the insertion groove portion of the joint member is engaged with the outer pipe of the second double pipe, which proceeds into the joint member, via the ring member. In this case, when the ring member and the joint member are contacted to each other under pressure, the property of airtightness can be enhanced when the elastic engaging portion engages with the ring member.

In the present invention, still another aspect is shown in which the above engaging member is engaged with, for example, the outer pipe of the second double pipe. Instead of the ring member described in the present invention, an expanded portion, the diameter of which is larger than the diameter of the common cylindrical portion, is integrally arranged on the outer pipe of the second double pipe. Due to the foregoing, in the same manner as that of the present invention, the elastic engaging portion of the engaging member inserted into the insertion groove portion of the joint member engages with the expanded portion of the outer pipe of the second double pipe which has proceeded into the joint member. In this case, when the expanded portion of the outer pipe of the second double pipe and the joint member are contacted to each other with pressure, the property of airtightness can be enhanced when the elastic engaging portion engages with the expanded portion. Further, as it is unnecessary to newly manufacture another member such as a ring member, the double pipe joint structure can be provided at a low manufacturing cost.

In the present invention, for example, a forward end portion of the outer pipe of the first double pipe is expanded as compared with the common cylindrical portion, so that the forward end portion of the outer pipe of the first double pipe is formed into a female side joint portion, and an engaging member capable of engaging with the outer pipe of the second double pipe is attached to the female side joint portion. Due to the foregoing, the female side joint and the engaging member compose a joint means, and the outer pipe of the second double pipe can be made to proceed into the female side joint portion. When the engaging member engages with the outer pipe of the second double pipe, the second double pipe can be connected to the first double pipe. Further, when the outer pipe of the second double pipe proceeds into the female side joint member, the elastic engaging portion of the engaging member is pushed, so that the diameter can be expanded. Therefore, both double pipes can be connected through one-touch operation. Accordingly, the working property can be enhanced and the manufacturing cost can be reduced.

In the present invention, even in the double joint structure in which the double pipe and the two-way branch joint, capable of connecting with two parallel pipes, are connected, when the engaging member for engaging with the outer pipe of the double pipe is attached, the joint member is composed, and the double pipe and the two-way branch joint can be connected to each other. When the pipe for high pressure communicating with the inner pipe of the double pipe and the pipe for low pressure communicating with the outer pipe of the double pipe are connected to the two-way branch joint, the double pipe branches and piping can be conducted.

As the engaging member includes an elastic engaging portion inserted into the groove portion formed in the two-way branch joint and engaging with the outer pipe of the double pipe, when the elastic engaging portion is pushed and expanded by the outer pipe of the double pipe proceeding into the hollow portion of the two-way branch joint, the outer pipe of the double pipe further proceeds and reaches a predetermined position. Due to the foregoing, the diameter of the elastic engaging portion is contracted, and the elastic engaging portion is engaged with the outer pipe of the double pipe. Accordingly, in the double pipe joint structure of this invention, the two-way branch joint and the double pipe can be connected with each other through one-touch operation. Accordingly, the working property can be greatly enhanced and the manufacturing cost can be reduced.

In the present invention, the first double pipe and the second double pipe, in which the inner pipe and the outer pipe are formed integrally with or differently from each other and connected by the connecting means, are joined to each other by the joint means.

When the first double pipe and the second double pipe are located at a connecting position, the joint means is joined to one of the first double pipe and the second double pipe by the plastically deforming means so as to connect the first double pipe with the second double pipe. Alternatively, the first double pipe and the second double pipe are fastened by the fastening means. Accordingly, both double pipes are not connected by means of soldering or welding. Therefore, the working property is greatly enhanced and the manufacturing cost can be reduced.

In the present invention, the first double pipe and the second double pipe, in which the inner pipe and the outer pipe are formed integrally with or differently from each other and connected by the connecting means, are connected to each other by the joint means.

When the first double pipe and the second double pipe are located at a connecting position, the first double pipe and the second double pipe are connected to each other when one of the double pipes is contacted to the other double pipe with pressure by a screw means in such a manner that both double pipes are opposed to each other. Accordingly, both double pipes are not connected by means of soldering or welding. Therefore, the working property is greatly enhanced and the manufacturing cost can be reduced.

In the present invention, in the double pipe in which the inner pipe and the outer pipe are integrally formed, the fin portion for connecting the inner pipe with the outer pipe in the radial direction is provided. Therefore, when the double pipe is connected with the joint means or the forward end portion of the inner pipe is expanded, it is difficult for the pipe to collapse, that is, the pipe profile can be stably maintained. Therefore, the connecting work can be easily performed.

According to the present invention, when the male portion of the inner pipe of the second double pipe is inserted into the female portion of the inner pipe of the first double pipe, the female portion of the inner pipe of the first double pipe is expanded, so that the male portion can be easily inserted into the female portion. Further, when the diameter of the female portion is expanded, it possible to conduct machining in which the surface roughness of the inner circumferential face of the expanded portion can is increased. Therefore, when a seal member is interposed between the male portion and the female portion, the property of airtightness can be enhanced.

According to the present invention, when the fin portion is formed into a spiral shape, it is possible to reduce the rigidity of the fin portion, so that a force given from the fin portion to the inner pipe and the outer pipe can be decreased. Therefore, plastic deformation such as expansion of the inner pipe or contraction of the outer pipe can be easily executed.

According to the present invention, one end portion of the fin portion is formed so that it can be directed toward an eccentric position from the center of the inner pipe. Therefore, in the same manner as that of the invention described above, it is possible to reduce the rigidity of the fin portion, so that a force given from the fin portion to the inner pipe and the outer pipe can be decreased. Therefore, plastic deformation such as expansion of the inner pip or contraction of the outer pipe can be easily executed.

According to the present invention, the fin portion described above is formed between the inner pipe and the outer pipe being bent. Therefore, in the same manner as that of the invention described above, it is possible to reduce the rigidity of the fin portion, so that a push given from the fin portion to the inner pipe and the outer pipe can be decreased. Therefore, plastic deformation such as expansion of the inner pipe or contraction of the outer pipe can be easily executed.

According to the present invention, the wall thickness of the fin portion is smaller than the wall thickness of the inner pipe, and the wall thickness of the inner pipe is smaller than the wall thickness of the outer pipe. Therefore, in the same manner as that of the above invention, the fin portion, the wall thickness of which is smallest, can be easily plastically deformed.

According to the present invention, when two double pipes are connected to each other by a joint means, the forward end portions of the inner pipes of the double pipes, which are opposed to each other, are expanded so that the diameters can be enlarged, and both end portions are connected to each other by the bypass inner pipe. Therefore, when two double pipes, in which the inner pipe and the outer pipe are integrally formed into one body, are connected by a joint means, it is unnecessary to cut out a forward end portion of the outer pipe in order to protrude the inner pipe from the outer pipe. Therefore, the manufacturing cost can be reduced.

According to the present invention, in the case where the double pipe is laid in the two-way branch joint, an introducing port of the two-way branch joint to be communicated with the inner pipe is connected to the inner pipe of the double pipe by the bypass inner pipe. Therefore, in the same manner as that of the above invention, it is unnecessary to cut out a forward end portion of the outer pipe in order to protrude the inner pipe from the outer pipe. Therefore, the manufacturing cost can be reduced.

According to the invention, when two double pipes, the inner pipes of which are connected to the bypass inner pipe, are connected to each other, one of the first double pipe and the second double pipe is made to proceed to the other double pipe and then the joint means is expanded by plastic deformation. When one of the double pipes is further made to proceed, the joint means is contracted and the first and the second double pipe can be connected to each other. That is, the first and the second double pipe can be connected through one-touch operation. Accordingly, the working property can be greatly enhanced. Further, it is unnecessary to connect both double pipes by means of soldering or welding. Therefore, the manufacturing cost can be reduced.

According to the present invention, when two double pipes are connected by a joint means, the joint means includes a first screw means having a female screw and a second screw means having a male screw. Therefore, after the inner pipes are connected to each other by the bypass inner pipe and the two double pipes are arranged being opposed to each other, the first screw means is screwed to the second screw means. In this way, the two double pipes are connected to each other. Accordingly, compared with a case in which the double pipes are connected by means of soldering or welding, the working property can be greatly enhanced and the manufacturing cost can be reduced. Further, when the bypass inner pipe is interposed between the inner pipes, it becomes unnecessary to cut out a forward end portion of the outer pipe. Due to the foregoing, the manufacturing cost can be reduced.

According to the present invention, the position of the first screw means in the axial direction is restricted by a restricting means such as a C-ring attached to the outer pipe of the first double pipe, a cylindrical member attached by means of spinning machining or a cylindrical member attached by means of drawing for contracting an end portion. Therefore, the first double pipe and the second double pipe can be connected to each other at a predetermined position.

According to the present invention, the second screw means is composed of a hexagonal union portion. Therefore, after two double pipes are opposed to each other, only the union portion is rotated by a hexagonal spanner frequently used, and the two double pipes can be easily connected.

According to the present invention, the above bypass inner pipe is composed in such a manner that O-rings are attached to both end portions of a cylindrical piping member. Alternatively, the above bypass inner pipe is composed in such a manner that rubber members are arranged at both end portions of a piping member made of resin and subjected to bicolor forming. Therefore, while the property of airtightness is being maintained, the double pipes can be connected to each other or the double pipe and the two-way branch joint can be connected by the bypass branch pipe, the manufacturing cost of which is reduced.

According to the present invention, when the bypass inner pipe is held by the holding ring, the connected bypass inner pipe can be stably held and assembled.

The present invention may be more fully understood from the description of preferred embodiments of the invention, as set forth below, together with the accompanying drawings.

DESCRIPTION OF THE PREFERRED EMBODIMENTS

Figure 1:
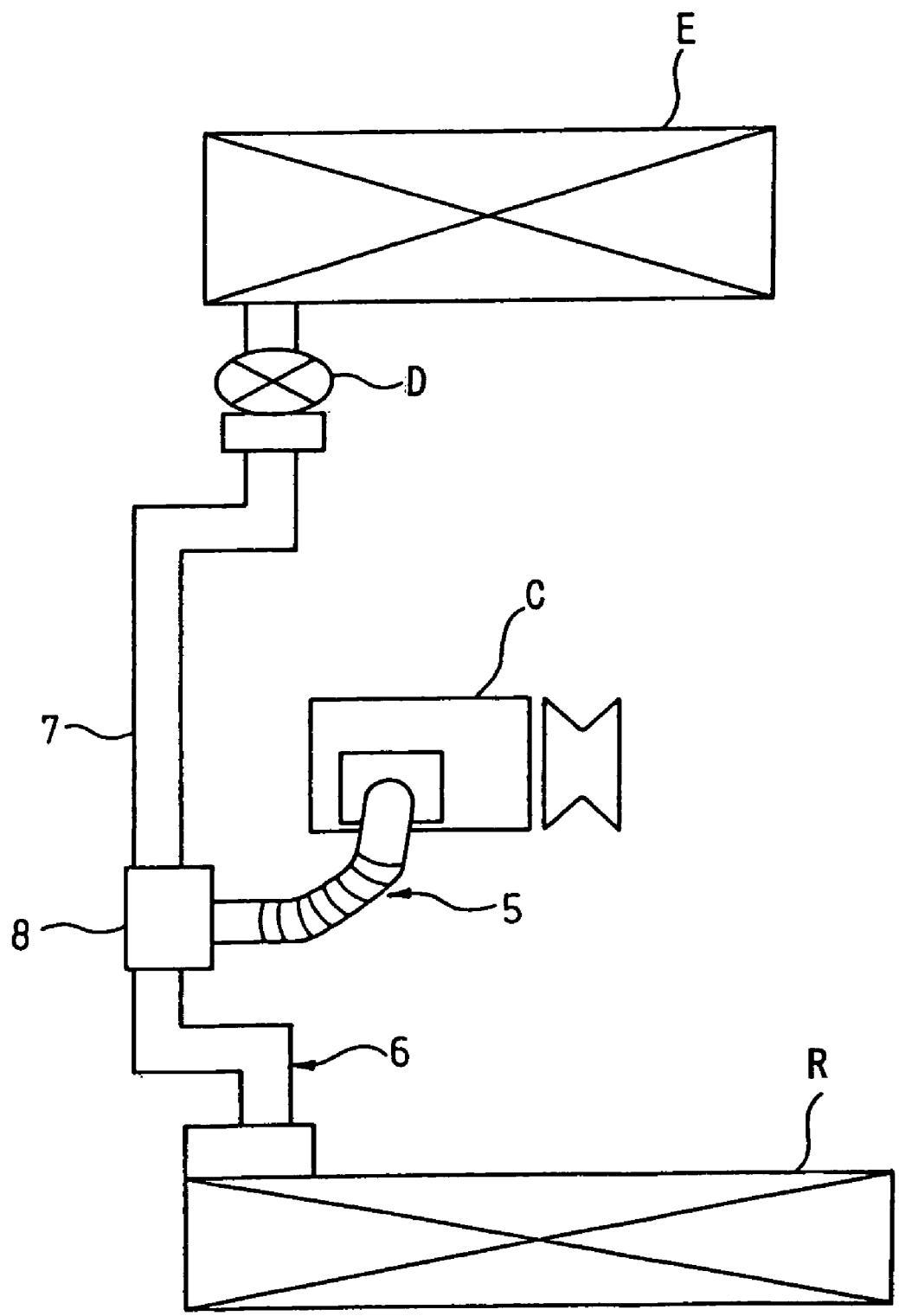
FIG. 1 is a view showing a model of the air-conditioner for vehicle use of an embodiment of the present invention.

In the present embodiment, a vapour-compression type refrigerating machine of the present invention is applied to an air-conditioner for vehicle use. FIG. 1 is a view showing a model of the air-conditioner for vehicle use.

In FIG. 1, the compressor C sucks and compresses refrigerant. In this embodiment, the compressor C is assembled to an engine used for running a vehicle so as to obtain power from the engine. The radiator (condenser) R is a heat exchanger arranged on the high pressure side for cooling refrigerant on high pressure when heat exchange is conducted between refrigerant of high pressure and outside air.

In this connection, in the present embodiment, the pressure of refrigerant of high pressure is set at a value lower than the critical pressure of refrigerant. Therefore, the enthalpy of the refrigerant is lowered in the condenser R while the phase of refrigerant is changed from gas phase to liquid phase.

The decompressor D is a decompressing means for decompressing refrigerant of high pressure. In this embodiment, the decompressor D is a temperature type expansion valve in which a variable throttling portion for adjusting the degree of throttling according to the degree of superheat on the outlet side of the evaporator E and a temperature detecting portion for detecting the degree of superheat of refrigerant are integrated into one body.

In this connection, the evaporator E is a heat exchanger arranged on the low pressure side in which liquid-phase refrigerant of low pressure is evaporated. In this embodiment, the evaporator E sucks heat from the air, which is blown out into a passenger's compartment, and evaporates the refrigerant, so that the air, which is blown out into a passenger's compartment, can be cooled, and the thus absorbed heat is emitted outside the passenger's compartment from the condenser R. On the contrary, the passenger's compartment may be heated in such a manner that heat is sucked from the outside air, and the thus absorbed heat is emitted into the air blown out in to the passenger's compartment.

The compressor pipe 5 is composed in such a manner that the refrigerant pipe connected with the suction side of the compressor C and the refrigerant pipe connected with the discharge side of the compressor C are integrated into one body. The condenser pipe 6 is composed in such a manner that the refrigerant pipe connected with the inlet side of the condenser R and the refrigerant pipe connected with the outlet side of the condenser R are integrated into one body. The decompressor pipe 7 is composed in such a manner that the refrigerant pipe connected with the inlet side of the decompressor D and the refrigerant pipe connected with the outlet side of the temperature detecting portion are integrated into one body.

Figure 2A:
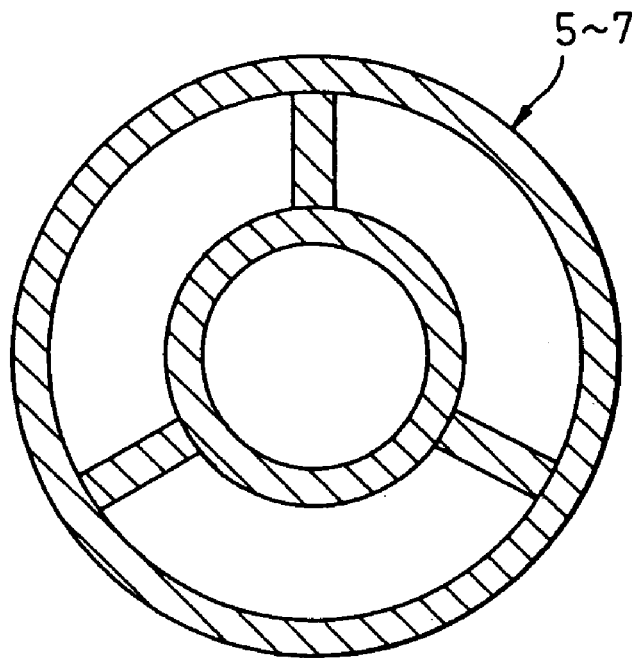
FIGS. 2A and 2B are sectional views of the refrigerant pipe of an embodiment of the present invention.
Figure 2B:
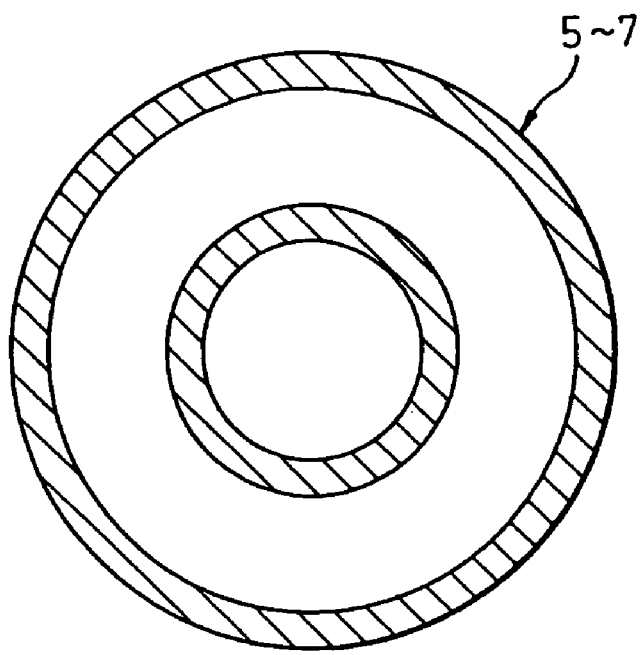

In this connection, as shown in FIGS. 2A and 2B, the condenser pipe 6 and the decompressor pipe 7 are composed in such a manner that a metallic material member made of aluminum alloy is subjected to extrusion or drawing, so that the metallic material member can be formed into a double cylindrical shape, and the compressor pipe 5 is composed in such a manner that a double cylindrical shape is formed from a flexible piping member made of rubber.

Figure 3:
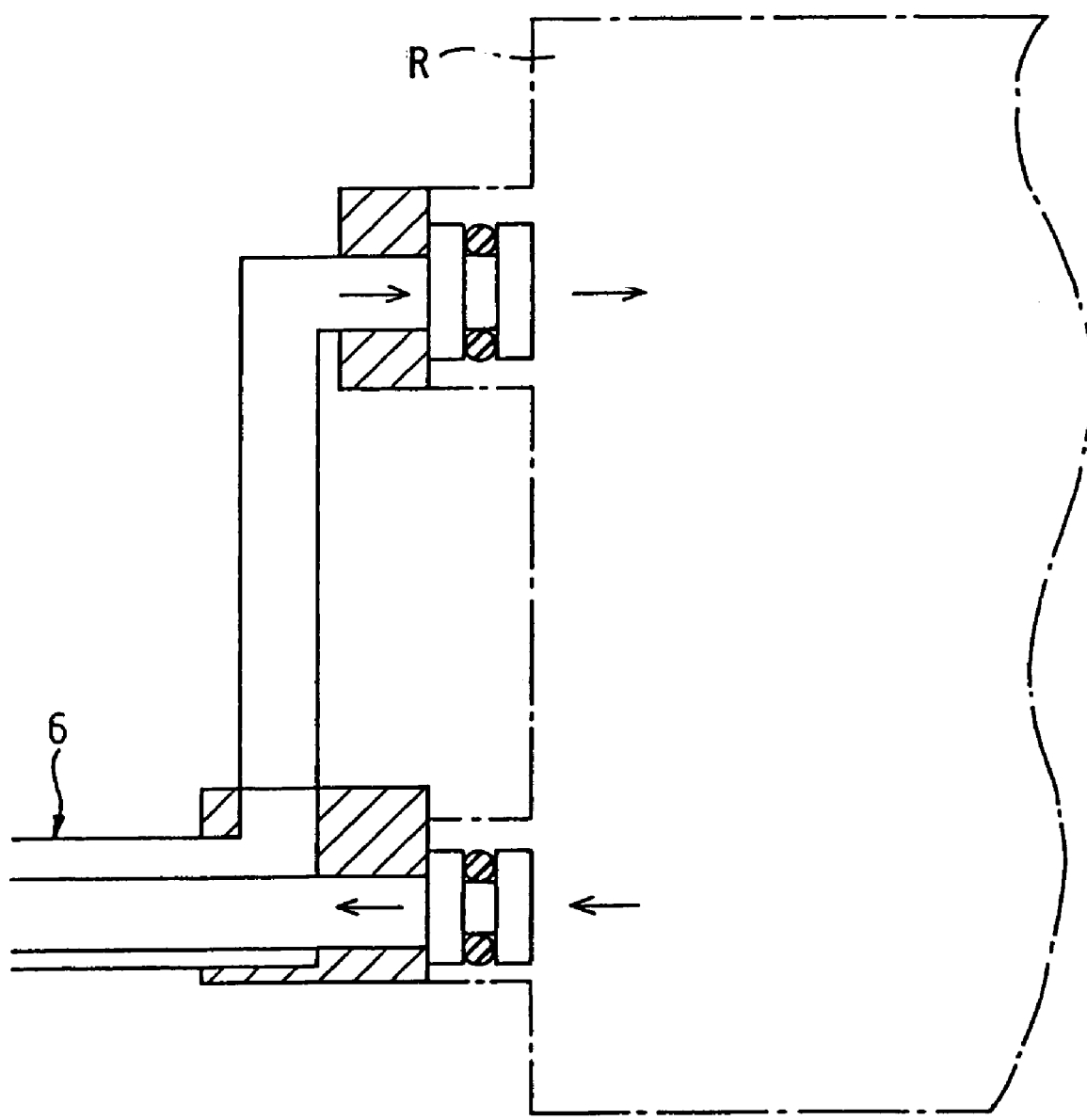
FIG. 3 is a schematic illustration showing a connecting portion of the refrigerant pipe of an embodiment of the present invention.
Figure 4:
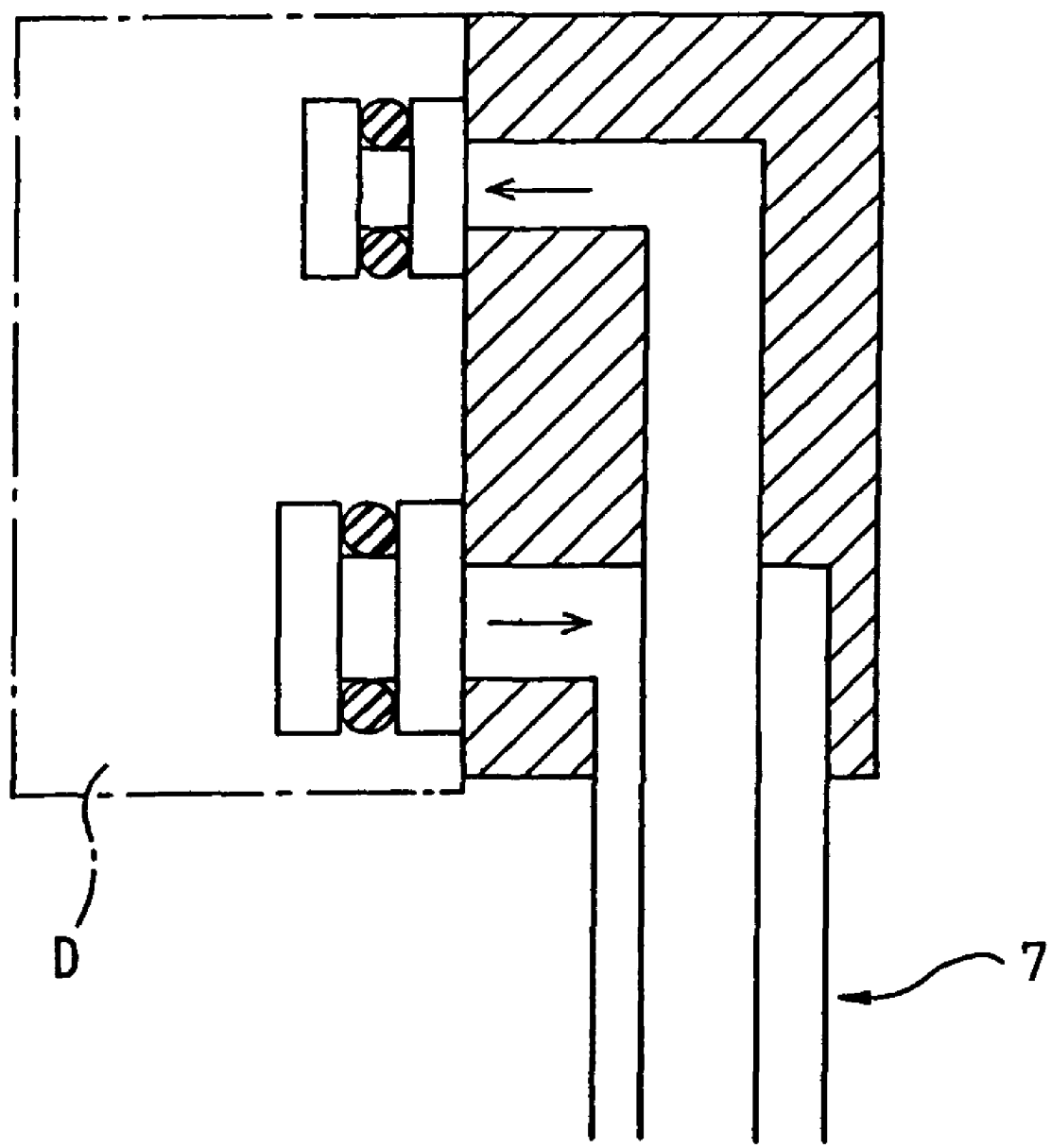
FIG. 4 is a schematic illustration showing a connecting portion of the refrigerant pipe of an embodiment of the present invention.

In this connection, in the compressor pipe 5, the inner cylinder side is connected with the discharge side of the compressor C, and the outer cylinder side is connected with the suction side of the compressor C. In the condenser pipe 6, as shown in FIG. 3, the inner cylinder side is connected with the outlet side of the condenser R, and the outer cylinder side is connected with the inlet side of the condenser R. In the decompressor pipe 7, as shown in FIG. 4, the inner cylinder side is connected with the inlet side of the decompressor D, and the outer cylinder side is connected with the outlet side of the temperature detecting portion.

Figure 5:
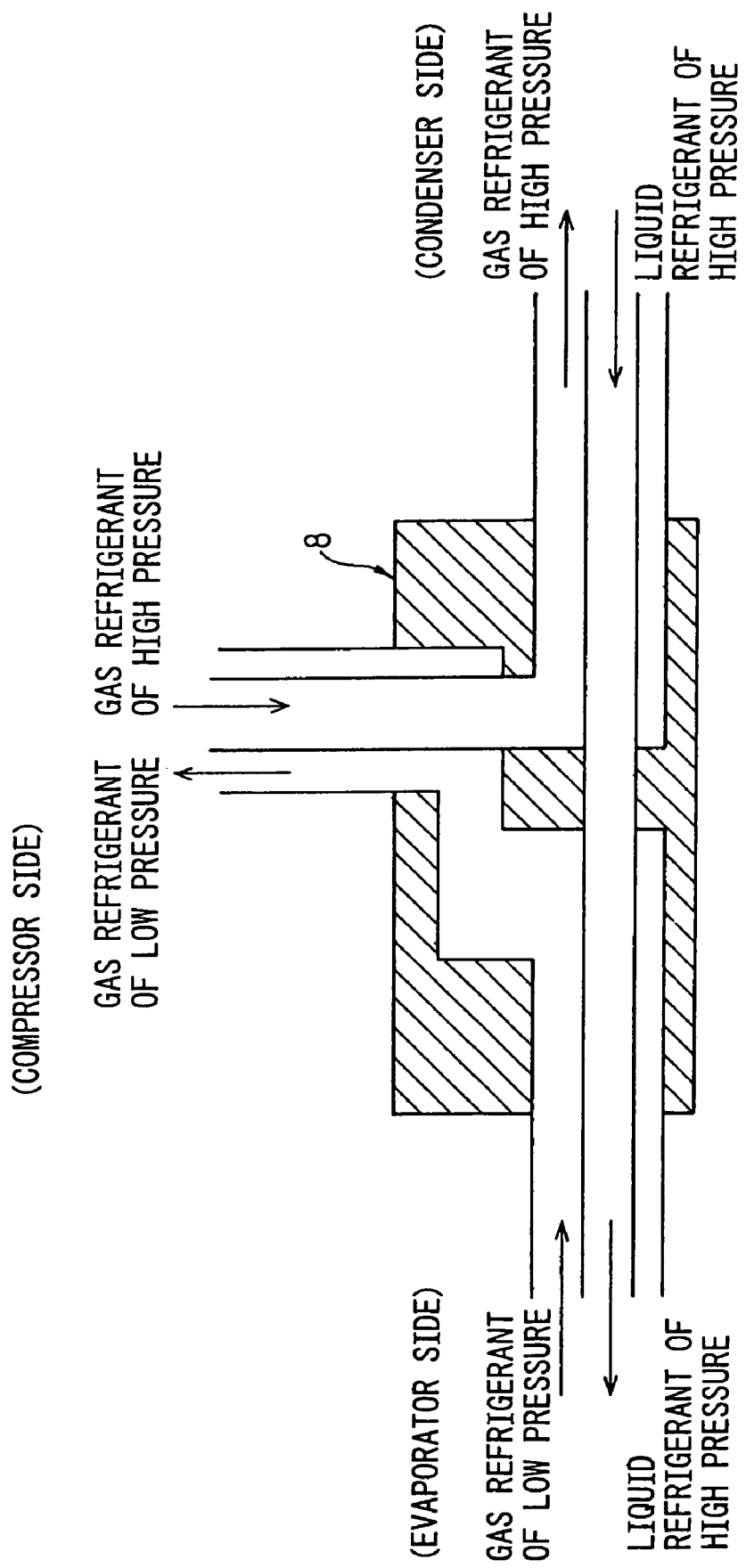
FIG. 5 is a schematic illustration showing an intermediate joint of an embodiment of the present invention.

When the compressor pipe 5, the condenser pipe 6 and the decompressor pipe 7 are connected with the intermediate joint 8 as shown in FIG. 5, the refrigerant pipe connected with the discharge side of the compressor C is connected with the refrigerant pipe connected with the inlet side of the condenser R, the refrigerant pipe connected with the outlet side of the condenser R is connected with the refrigerant pipe connected with the inlet side of the decompressor D, and the refrigerant pipe connected with the outlet side of the temperature detecting portion is connected with the refrigerant pipe connected with the suction side of the compressor C.

Next, the operational effect of the present embodiment will be described below.

In this connection, operation of the vapour-compression type refrigerating machine (air-conditioner) is the same as that of a well known vapour-compression type refrigerating machine (air-conditioner). Therefore, explanations of operation of the vapour-compression type refrigerating machine (air-conditioner) are omitted here.

In this embodiment, the refrigerant pipe connected with the suction side of the compressor C and the refrigerant pipe connected with the discharge side of the compressor C are integrated into one body. Further, the refrigerant pipe connected with the inlet side of the condenser R and the refrigerant pipe connected with the outlet side of the condenser R are integrated into one body. Furthermore, the refrigerant pipe connected with the inlet side of the decompressor D and the refrigerant pipe connected with the outlet side of the temperature detecting portion are integrated into one body. Therefore, the number of pipes and the number of joints to connect the pipes can be decreased compared with the structure described in Japanese Patent Publication No. 2595578.

Accordingly, it is possible to reduce the time necessary for assembling the refrigerant pipe. Further, an arrangement of the pipe can be made simple. Accordingly, the mounting property the vapour-compression type refrigerating machine in a vehicle can be enhanced.

Since the compressor pipe 5, the condenser pipe 6 and the decompressor pipe 7 are connected via the intermediate joint 8 in the present embodiment, refrigerant flowing out from the evaporator E returns to the compressor C without flowing in the condenser R, which is different from the conventional refrigerating machine. Accordingly, the length of the low pressure passage can be reduced compared with that of the conventional refrigerating machine. Therefore, it is possible to reduce the pressure loss of refrigerant. As a result, an increase in the power consumption of the compressor C can be prevented.

In this connection, since two types of pipes are integrated with each other into one body in the present embodiment, there is a possibility that heat is exchanged between the refrigerant flowing in these two types of pipes. In this case, even when heat is exchanged between refrigerant of low pressure and refrigerant of high pressure flowing in the compressor pipe 5 and the decompressor pipe 7, the operation is the same as that of a well known inner heat exchanger. Therefore, no problems are caused. However, when heat is exchanged in the condenser pipe 6 between the refrigerant flowing out from the condenser R and refrigerant flowing into the condenser R, there is a possibility that the enthalpy of the refrigerant flowing into the evaporator E is increased and the heat absorbing capacity of the evaporator E is deteriorated.

In the present embodiment, in order to solve the above problems, the length of the condenser pipe 6 from the intermediate joint 8 to the condenser R is reduced to less than the length of the decompressor pipe 7 from the intermediate joint 8 to the decompressor D, so that a quantity of heat exchanged between the refrigerant flowing out from the condenser R and the refrigerant flowing into the condenser R in the condenser pipe 6 can be suppressed.

Figure 6:
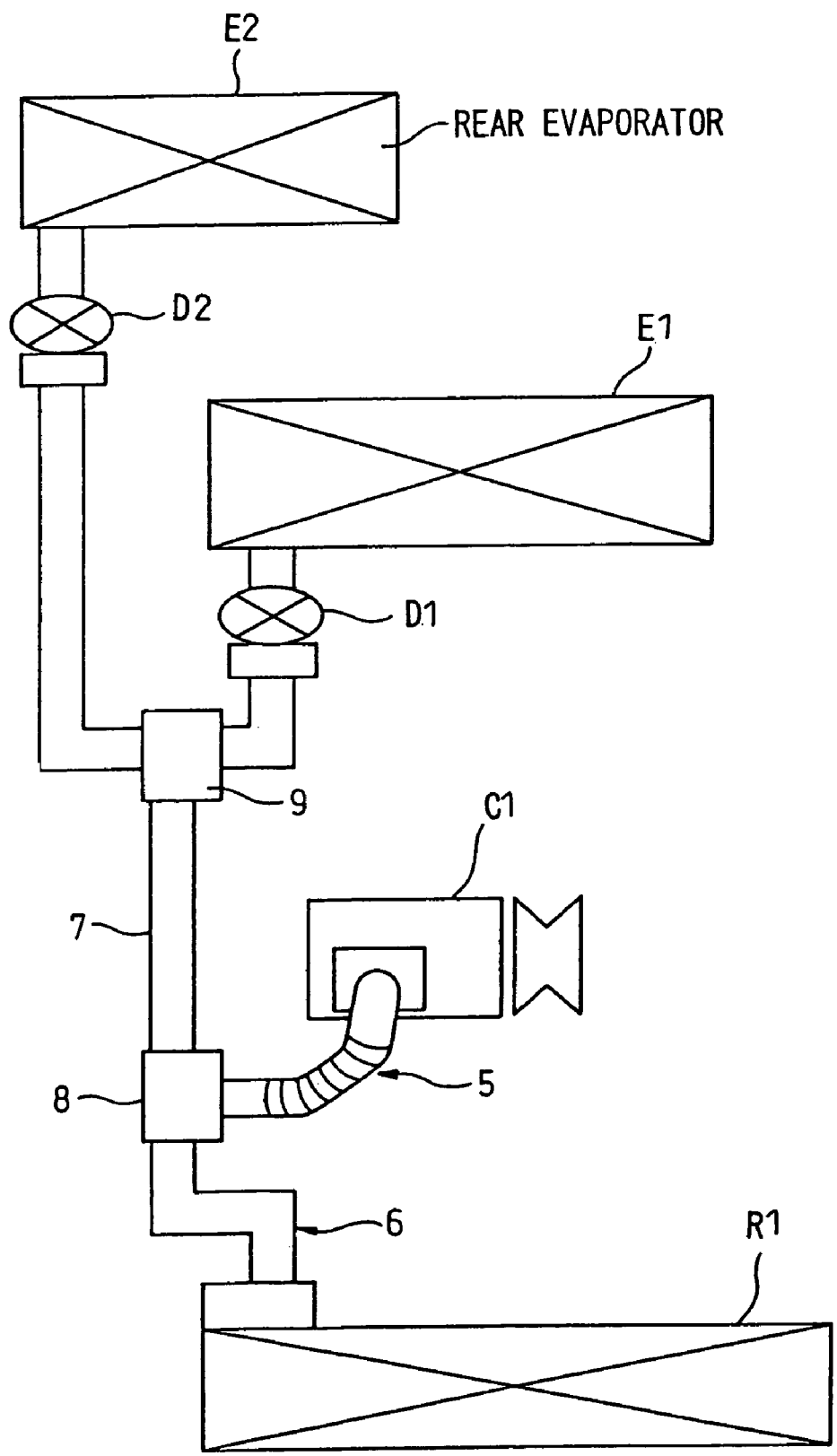
FIG. 6 is a view showing a model of the air-conditioner for vehicle use of another embodiment of the present invention.

In another embodiment of the present invention, the present invention is applied to an air-conditioner having two evaporators, that is, the evaporator E1 used for the front seat and the evaporator E2 used for the rear seat as shown in FIG. 6.

Figure 7:
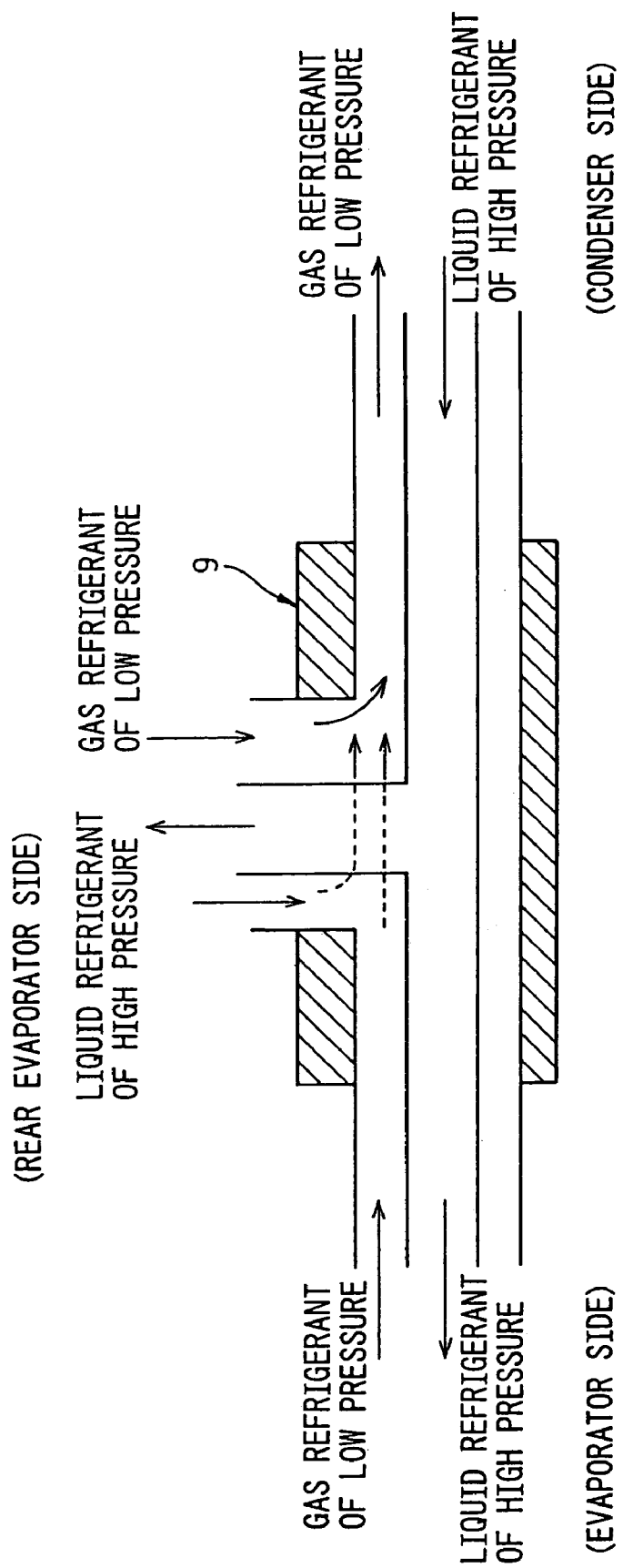
FIG. 7 is a schematic illustration showing an intermediate joint of another embodiment of the present invention.

In another embodiment of the present invention, the first decompressor D1 for the evaporator E1 used for the front seat and the second decompressor D2 for the evaporator E2 used for the rear seat are provided. Further, as shown in FIG. 7, the second intermediate joint 9 is provided which is connected as follows. The refrigerant pipe connected with the outlet side of the condenser R1 is connected with the refrigerant pipe connected with the inlet side of the first decompressing means D1 by the second intermediate joint 9; the refrigerant pipe connected with the outlet side of the condenser R1 is connected with the refrigerant pipe connected with the inlet side of the second decompressing means D2 by the second intermediate joint 9; the refrigerant pipe connected with the outlet side of the temperature detecting portion of the first decompressing means D1 is connected with the refrigerant pipe connected with the suction side of the compressor C1 by the second intermediate joint 9; and the refrigerant pipe connected with the outlet side of the temperature detecting portion of the second decompressor D2 is connected with the refrigerant pipe connected with the suction side of the compressor C1 by the second intermediate joint 9.

Figure 8:
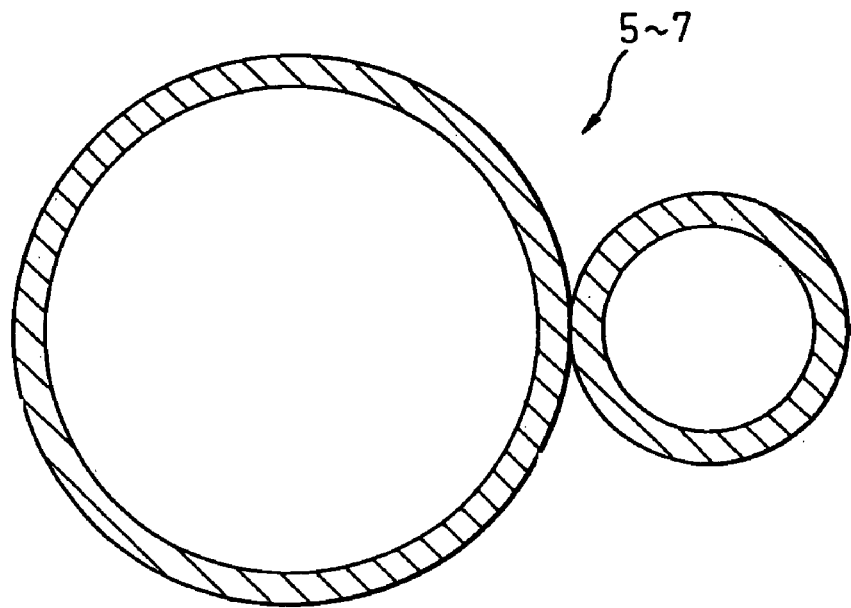
FIG. 8 is a sectional views of the refrigerant pipe of another embodiment of the present invention.

In the above embodiment, the compressor pipe 5, the condenser pipe 6 and the decompressor pipe 7 are respectively formed into a double cylindrical shape. In this embodiment, the compressor pipe 5, the condenser pipe 6 and the decompressor pipe 7 are respectively integrated into one body by arranging two pipes in parallel as shown in FIG. 8.

In this connection, in the case where two pipes are integrated with each other into one body, of course, the means of extrusion or drawing may be adopted. It is possible to adopt a method in which two pipes are manufactured differently from each other and then integrated into one body by means of welding or soldering or by the mechanical means of bundling the two pipes with bands.

In the above embodiment, the compressor pipe 5 is made of rubber, so that the flexibility of the pipe 5 can be exhibited. However, the present invention is not limited to the above specific embodiment. For example, the inner and the outer cylinder of the compressor pipe 5 may be composed of bellows so that the flexibility of the pipe 5 can be exhibited. In this case, the inner and the outer cylinder of the compressor pipe 5 may be made of metal.

In the above embodiment, the decompressor D is composed of a temperature-type expansion valve in which the variable throttling portion for adjusting the degree of throttling according to the degree of superheat of refrigerant on the outlet side of the evaporator E and the temperature detecting portion for detecting the degree of superheat of refrigerant are integrated with each other into one body. However, it should be noted that the present invention is not limited to the above specific embodiment.

Figure 9:
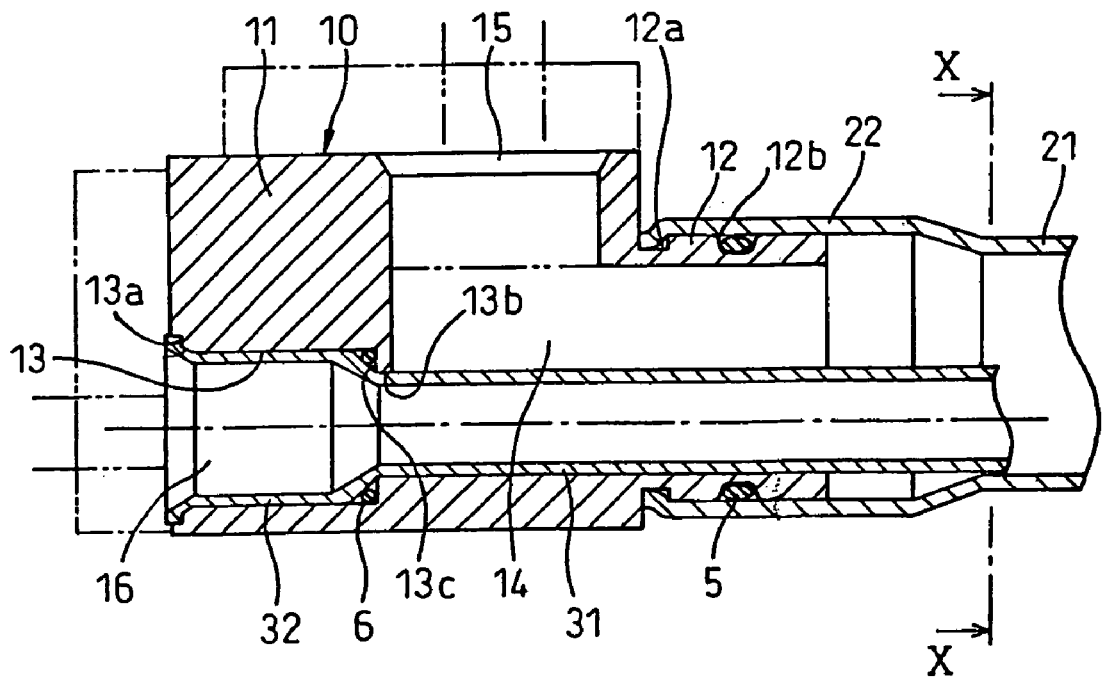
FIG. 9 is a partially sectional view showing a joint portion of the joint member of the double pipe structure of an embodiment of the present invention.
Figure 10:
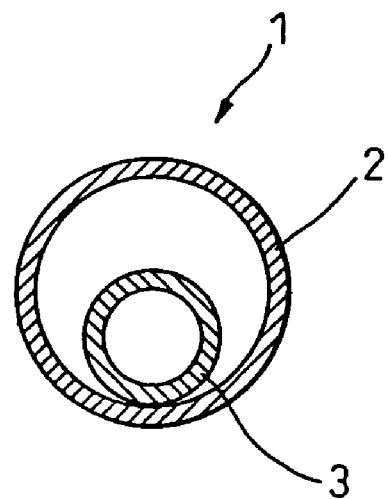
FIG. 10 is a sectional view taken along line X-X in FIG. 9.
Figure 11:
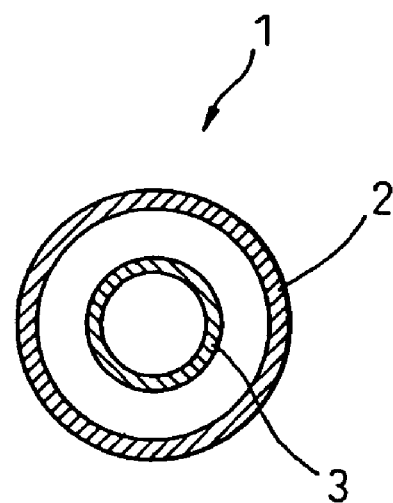
FIG. 11 is a sectional view showing a double pipe in which the inner pipe and the outer pipe are arranged on the same axis.

Next, in the double pipe structure of an embodiment of the present invention, as shown in FIGS. 9 and 10, the double pipe 1 includes: an outer pipe 2 in which the refrigerant of low pressure is circulating; and an inner pipe 3 in which the refrigerant of high pressure is circulating, the inner pipe being inserted into the outer pipe 2, wherein the outer pipe 2 and the inner pipe 3 are formed differently from each other and connected with and supported by the joint member 10 at both end portions. As shown in FIG. 10, in the double pipe 1 of the embodiment, the inner pipe 3 is inserted into the outer pipe 2 being arranged eccentric with respect to the outer pipe 2. Of course, as shown in FIG. 11, the inner pipe 3 may be arranged on the same axis as that of the outer pipe 2.

The outer pipe 2 includes an expanded diameter portion 22 which is expanded so that the diameter of the expanded diameter portion 22 is larger than the diameter of the common cylinder portion 21, and the inner pipe 3 includes an expanded end portion 32 which is expanded so that the diameter of the expanded diameter portion 32 is larger than the diameter of the common cylinder portion 31. This expanded end portion 32 protrudes from an end portion of the outer pipe 2. The expanded diameter portion 22 and the expanded diameter portion 32 are respectively attached to the joint member 10.

The joint member 10 includes: a body 11, the profile of which is formed into a prism-shape; and a cylindrical male portion 12 to which the outer pipe 2 is joined so that the body 11 can be connected with the outer pipe 2. The insertion hole 13, into which the inner pipe 3 is inserted, and the extending passage 14 extending from the outer pipe 2, which is communicated with the hollow portion of the cylindrical male portion 12, are formed inside the joint member 10. The extending passage 14 is bent by a right angle inside the body 11 and connected with the port 15 used for refrigerant of low pressure.

In the cylindrical male portion 12, at the connecting portion in which the cylindrical male portion 12 is connected with the body 11, the groove 12a, the diameter of which is smaller than the outer diameter of the cylindrical male portion 12, is formed, and at the intermediate portion of the cylindrical male portion 12, the seal groove 12b to which O-ring 5 is attached is formed.

When the expanded diameter portion 22 of the outer pipe 2 is externally engaged with the cylindrical male portion 12 of the joint member 10, a forward end portion of the expanded diameter portion 22 is subjected to drawing and bent into the groove 12a of the joint member 10, so that the expanded diameter portion 22 of the outer pipe 2 can be integrally joined to the cylindrical male portion 12.

On the other hand, the insertion hole 13, into which the inner pipe 3 is inserted, includes: a large diameter joining portion 13a, the diameter of which is larger than that of the insertion hole 13, formed at the forward end of the insertion hole 13; and a small diameter portion 13b, the diameter of which is approximately the same as the outer diameter of the common cylindrical portion 31 of the inner pipe 3, wherein the insertion hole 13 is formed step-like. In this structure, an inner wall face of the small diameter portion 13b is formed into a seal support face 13c for supporting O-ring 6. Inner diameters of the large diameter joining portion 13a and the insertion hole 13 are determined so that the large diameter joining portion 13a and the insertion hole 13 can be connected to the expanded diameter portion 32 of the inner pipe 3 with pressure. The inside of the expanded diameter portion 32 of the inner pipe 3, which is connected to the insertion hole 13 with pressure, is formed into the port 16 for refrigerant at high pressure.

When the expanded diameter portion 32 of the inner pipe 3 is inserted into the insertion hole 13 of the joint member 10, a forward end portion of the expanded diameter portion 32 is opened from the inside to the outside, so that the forward end portion of the expanded diameter portion 32 can be connected to the large diameter joining portion 13a of the joint member 10 with pressure and the inner pipe 3 can be integrally joined to the joint member 10.

Figure 12:
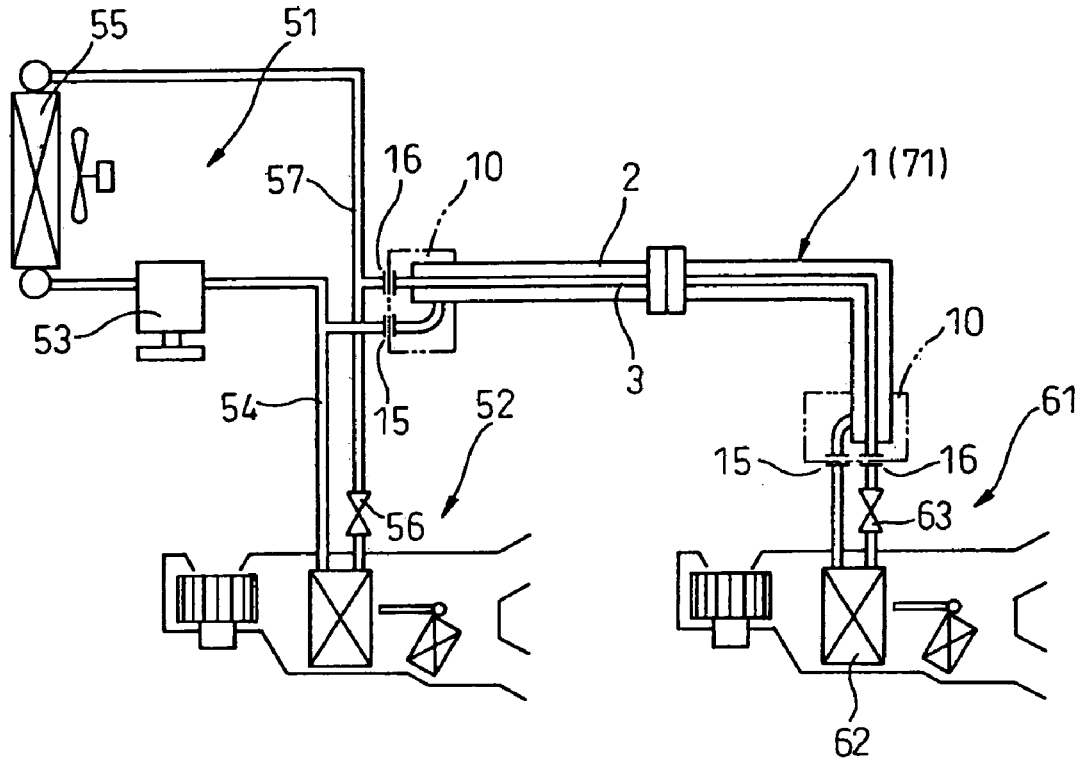
FIG. 12 is an arrangement view showing an air-conditioner for vehicle use to which the double pipe structure of the present invention is applied.

As shown in FIG. 12, one end of the double pipe 1 is connected to a portion of the pipe member connecting the air-conditioner unit 52 for the front seat with the air-conditioner 51 arranged on the engine compartment side of a vehicle, and the other end portion of the double pipe 1 is connected to the air-conditioner unit 61 for the rear seat arranged at the rear. The port 15 for refrigerant of low pressure in the joint member 10, which is arranged at one end of the double pipe 1, is connected to the pipe member 54 for connecting the air-conditioner unit 52 for the front seat to the compressor 53 via the joint member, and the port 16 for refrigerant of high pressure is connected to the pipe member 57 for connecting the condenser 55 with the expansion valve 56 via the joint member 10. The port 15 for refrigerant of low pressure in the joint member 10, which is arranged at the other end portion of the double pipe 1, is connected to the evaporator 62 on the air-conditioner unit 61 side for the rear seat via the joint member, and the port 16 for refrigerant of high pressure is connected to the expansion valve 63 on the air-conditioner unit 61 side for the rear seat via the joint member. Refrigerant of high pressure circulating from the condenser 55 of the air-conditioner 51 arranged outside the passenger's compartment flows from the port 16 for refrigerant of high pressure of the joint member 10 into the inner pipe 3. After the pressure of the refrigerant has been reduced by the expansion valve 63, the refrigerant flows into the evaporator 62 of the air-conditioner unit 61 for the rear seat. After the refrigerant of low pressure has circulated in the evaporator 62, it flows from the port 15 for refrigerant of low pressure into the outer pipe 2. Then, the refrigerant flows into the compressor 53 of the air-conditioner 51 arranged outside the passenger's compartment.

As described above, in the double pipe structure of the embodiment, after the forward end expanded portion 32 of the inner pipe 3 has been inserted into the insertion hole 13 of the joint member 10, a diameter of the expanded portion 32 of the inner pipe 3 is extended from the inside to the outside, so that the expanded portion 32 of the inner pipe 3 can be connected to the large diameter pressure-connecting portion 13a of the joint member 10 with pressure. In this way, the inner pipe 3 is plastically deformed and joined to the joint member 10. After the forward end expanded portion 22 of the outer pipe 2 has been externally engaged with the male portion 12 of the joint member 10, the forward end expanded portion 22 of the outer pipe 2 is plastically deformed by means of drawing and joined to the joint member 10 of the outer pipe 2.

Due to the foregoing, the inner pipe 3 and the outer pipe 2 can be separately joined to the joint member 10 and supported by the joint member 10 at both end portions. Therefore, it is possible to avoid a step in which the inner pipe 3 and the outer pipe 2 are joined to each other. Accordingly, the manufacturing cost can be reduced.

In this connection, the rigidity of the inner pipe 3 of the embodiment can be made lower than that of the outer pipe 2. When the inner pipe 3 is arranged inside the outer pipe 2 so that the inner pipe 3 and the outer pipe 2 can be formed into a double structure, as pressure in the outer pipe 2 is higher than the atmospheric pressure, a difference in pressure between the outside and the inside of the inner pipe 3 can be reduced. According to the reduction of the difference in pressure, the rigidity of the inner pipe 3 can be decreased to be lower than that of the outer pipe 2. Accordingly, the manufacturing cost can be reduced. For example, when the wall thickness of the inner pipe 3 is made to be smaller than that of the outer pipe 2 or when the modulus of longitudinal elasticity (Young's modulus) of the inner pipe 3 is lower than that of the outer pipe 2, the manufacturing cost can be reduced.

Next, explanations will be made into an embodiment in which the port of refrigerant at low pressure and the port of refrigerant at high pressure in the joint member are formed on the same plane.

Figure 13:
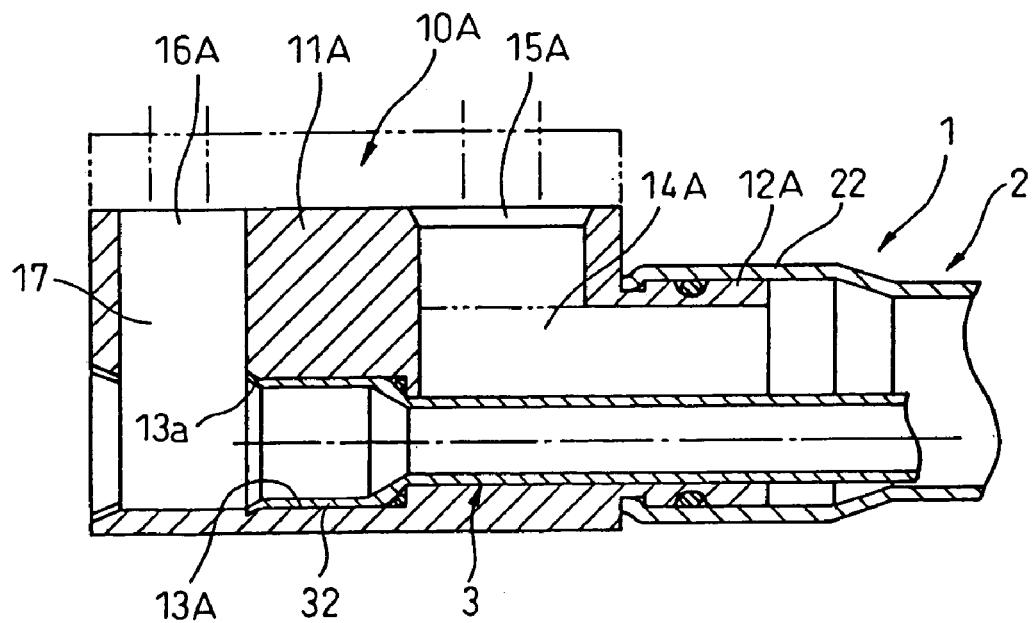
FIG. 13 is a partially sectional view showing a state of joining of another embodiment in which the double pipe and the joint member are joined.

As shown in FIG. 13, this joint member 10A is composed as follows. The passage 17 communicating with the inner pipe 13 is provided in the front portion of the joint member 10 shown in FIG. 9 in a direction perpendicular to the inner pipe 3 (a direction parallel with the extension passage 14A for low pressure), and the port 16A for refrigerant of high pressure is formed on the same plane as that of the port 15A for refrigerant of low pressure. A state of joining of the joint member 10A to the outer pipe 2 and the inner pipe 3 is the same as the state of joining shown in FIG. 9. Accordingly, the expanded diameter portion 22 of the outer pipe 2 is joined to the cylindrical male portion 12A, which protrudes from the body 11A of the joint member 10A, by means of drawing, and the diameter expanded portion 32 of the inner pipe 3, which is inserted into the insertion hole 13A of the joint member 10A, is joined with pressure to the large diameter joining portion 13a of the insertion hole 13A by means of extending the opening.

When this joint member 10A is used, in the opponent joint member connected with the double pipe 1, the port 15A for refrigerant of low pressure and the port 16A for refrigerant of high pressure can be formed on the same plane. Therefore, the opponent joint member can be formed into a simple profile and attached easily.

Figure 14:
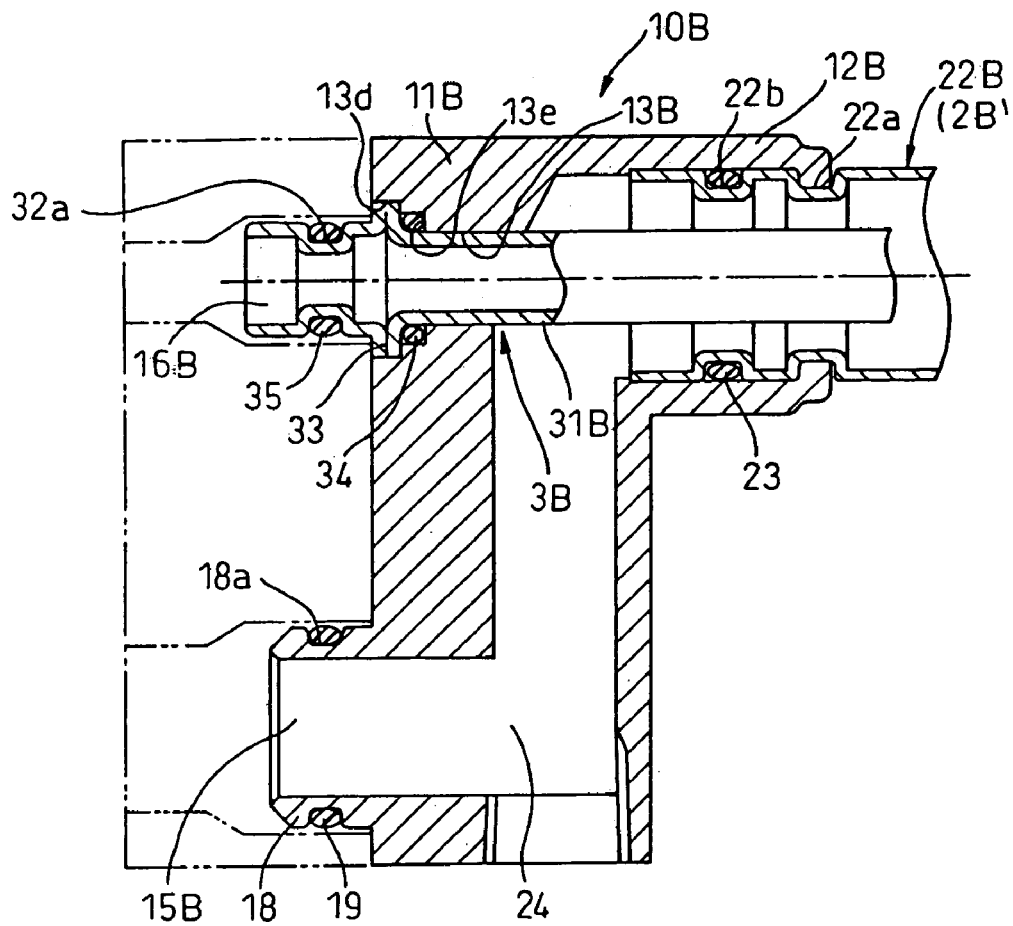
FIG. 14 is a partially sectional view showing a state of joining of still another embodiment in which the double pipe and the joint member are joined.

As shown in FIG. 14, the joint member 10B in the joining structure of another embodiment includes: a prism-shaped body 11B; a cylindrical female portion 12B protruding from the body 11B to the rear portion in the upper portion of the body 11B; an insertion hole 13B formed on the opposite side to the cylindrical female portion 12B in the body 11B; and a protruding portion 18 protruding from the body 11B to the front portion in the lower portion of the body 11B.

The expanded diameter portion 22B of the outer pipe 2B is internally engaged with the cylindrical female portion 12B, and a forward end portion of the cylindrical male portion 12B is subjected to drawing and connected with the groove 22a, which is formed in the expanded diameter portion 22B of the outer pipe 2B, with pressure. Due to the foregoing, the joint member 10B and the pipe 2B are joined to each other. In this connection, the seal groove 22b is formed in the expanded diameter portion 22B of the outer pipe 2B, and O-ring 23 is attached to this seal groove 22b so that air can be prevented from leaking outside from the outer pipe 2B.

On the other hand, the common cylinder portion 31B of the inner pipe 3B is inserted into the insertion hole 13B formed in the front portion of the body 11B, and the large diameter joining portion 13d is formed in a forward end portion of the insertion hole 13B, so that the inner pipe 3B inserted into the inserting portion 13B can be joined to the large diameter joining portion 13d. Concerning the inner pipe 3B in this embodiment, the forward end portion is formed into the male side joint portion 32B, the diameter of which is expanded from the diameter of the common cylinder portion 31B, and protruded from a front end face of the body 11B. Between the male side joint portion 32B and the common cylindrical portion 31B, the bead portion 33 is formed which is expanded from the common cylinder portion 31B and the male side joint portion 32B, and the outer diameter of the bead portion 33 is engaged with the large diameter joining portion 13d of the insertion hole 13B. When the outer diameter of the bead portion 33 is formed to be a little larger than the outer diameter of the large diameter joining portion 13d, the bead portion 33 is press-fitted into the large diameter joining portion 13d so that the inner pipe 3B and the joint member 10B can be joined to each other.

In this connection, the seal groove 13e is formed at the rear of the large diameter joining portion 13d so that O-ring 34 can be attached to the seal groove 13e, and the inside of the male side joint portion 32B of the inner pipe 3B is formed so that it can be used as the port 16B for refrigerant of high pressure.

The protruding portion 18 formed at a lower portion of the body 11B composes a male side joint portion. The inside of the protruding portion 18 is communicated with the extension passage 24, which extends from the cylindrical female portion 12B, and the protruding portion 18 is formed into the port 15B for refrigerant of low pressure. Accordingly, the port 15B for refrigerant at low pressure and the port 16B for refrigerant at high pressure are formed on the same face. Further, both the port 15B for refrigerant at low pressure and the port 16B for refrigerant at high pressure are formed on the male side. Therefore, both the opponent joint members, which are arranged being opposed to the port 15B for refrigerant at low pressure and the port 16B for refrigerant at high pressure, can be formed on the female side. Therefore, the profiles of the opponent joint members can be made simple and connected easily.

In this connection, the seal grooves 32a, 18a are respectively formed in the protruding portions 18 of the male side joint portion 32B of the inner pipe 3B and the protruding portion 18 of the body 10B so that O-rings 35, 19 can be attached to the seal grooves 32a, 18a.

Next, explanations will be made into another embodiment in which the inner pipe and the outer pipe are differently formed and respectively joined to the joint member at both end portions.

Figure 15:
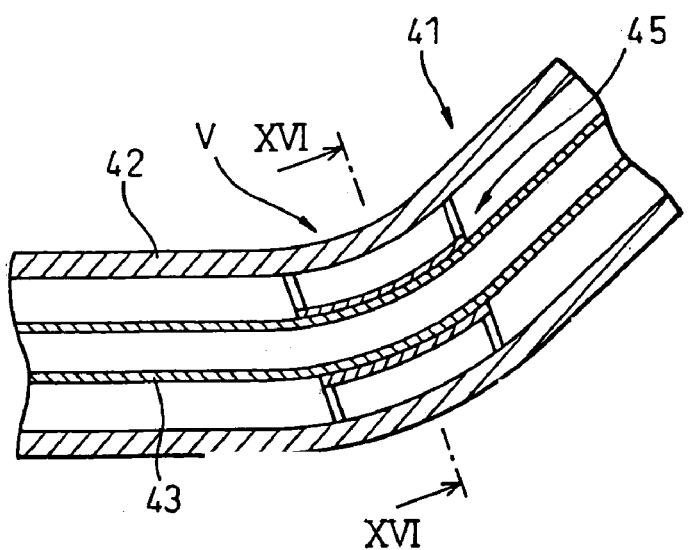
FIG. 15 is a partially sectional view showing an inserting state of the support member in the bent portion of a double pipe structure.

In this embodiment, the double pipe is bent according to a state of piping. Therefore, as shown in FIG. 15, bent portion V is formed in a portion of the double pipe 41 in the longitudinal direction. In bent portion V, the support member 45 is inserted between the outer pipe 42 and the inner pipe 43. Bent portion V is formed in such a manner that after the linear inner pipe 43 has been inserted into the linear outer pipe 42, bending is conducted in a predetermined portion. Accordingly, there is a possibility that the outer pipe 42 and the inner pipe 43 interfere with each other in the process of bending. In order to solve the above problems, after the linear inner pipe 43 has been inserted into the linear outer pipe 42, the support member 45 is inserted between the linear inner pipe 43 and the linear outer pipe 42. Alternatively, after the support member 45 has been previously assembled and fixed to the inner pipe 43, the inner pipe 43 is inserted into the outer pipe 42.

Figure 16:
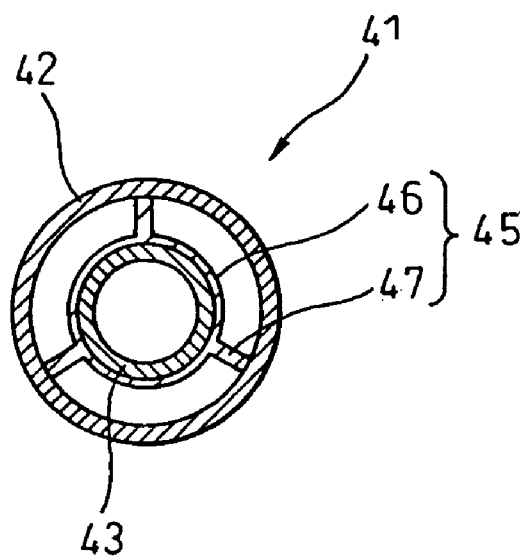
FIG. 16 is a sectional view of a support member taken along line XVI-XVI in FIG. 15.

As shown in FIG. 16, according to an embodiment of the support member 45, the support member 45 includes: an annular portion 46, the profile of which is formed into a ring shape; and a plurality of fins 47 (Three fins are shown in the example illustrated in the drawing.) radially extended from the annular portion 46 to the outside. These fins 47 are made of resin. In the same manner as that of the double pipe 1 shown in FIG. 11, in the double pipe 41 into which the support member 45 is inserted, the inner pipe 43 is arranged on the same axis as that of the outer pipe 42. The inner diameter of the annular portion 46 is formed a little larger than the outer diameter of the inner pipe 43, and the outer diameter of the fin portion 47 is formed a little smaller than the inner diameter of the outer pipe 42, so that the support member 45 can be easily inserted into the outer pipe 42 and the inner pipe 43.

It is preferable that the support members 45 are arranged at at least two positions of the bent portion. Due to this structure, it is possible to prevent the outer pipe 42 and the inner pipe 43 from interfering with each other in the process of bending.

Figure 17:
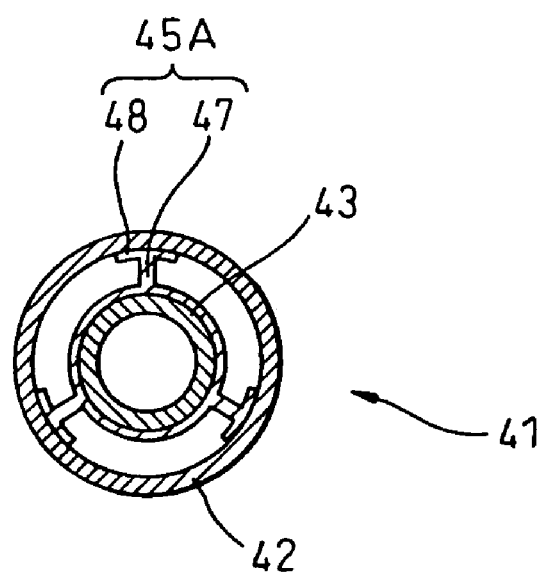
FIG. 17 is a sectional view showing a support member of another embodiment in FIG. 15.
Figure 18:
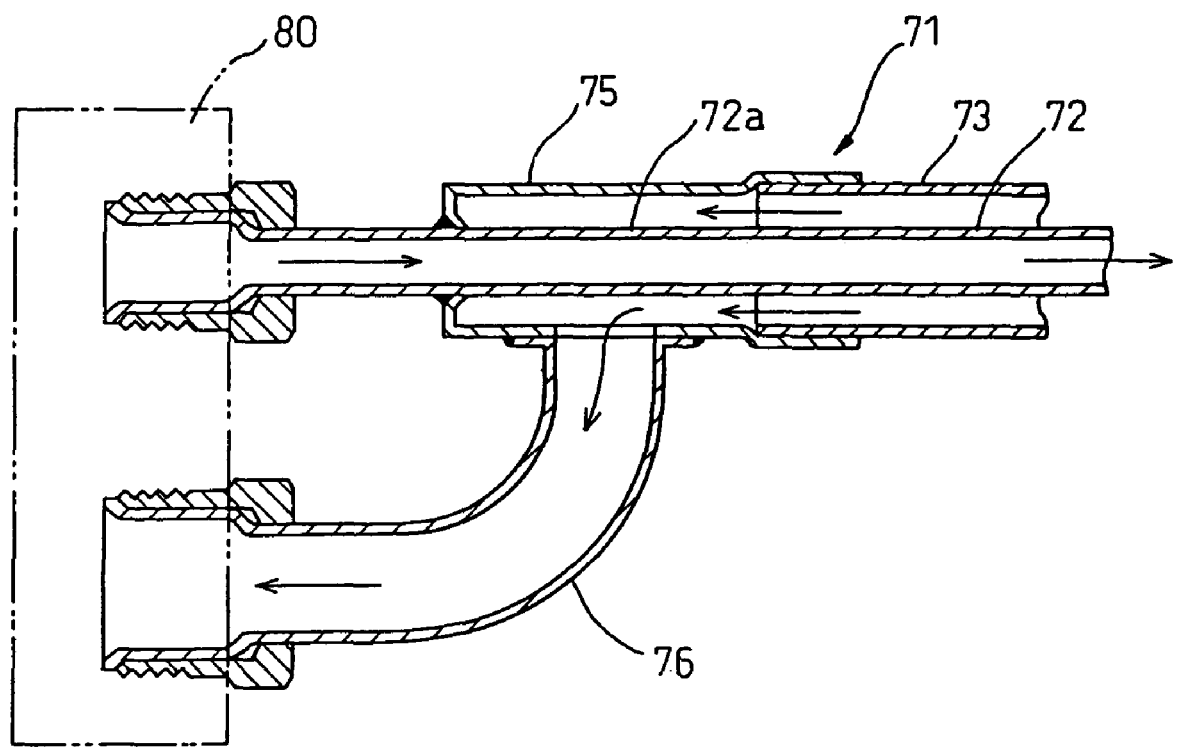
FIG. 18 is a partially sectional view showing a joining portion of the joint member in the conventional double pipe structure.
Figure 19:
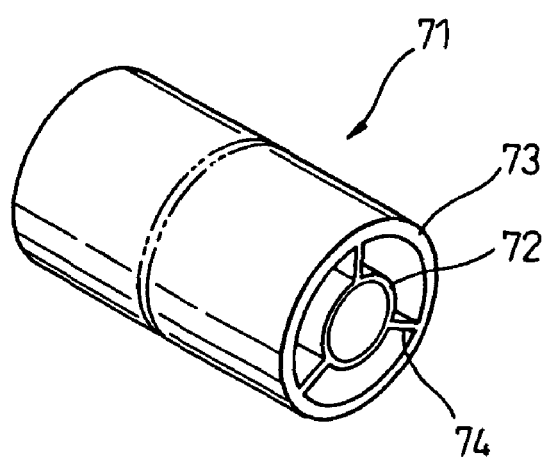
FIG. 19 is a perspective view showing a cross section of the double pipe shown in FIG. 18.

In this connection, the support member 45 is not limited to the above specific one. As shown in FIG. 17, it is possible to use the support member 45A having a flange portion 48, the radius of which is approximately the same as the radius of the inner circumference of the outer pipe 2, arranged on the outer circumference of the fin portion 47. Due to the above structure of the fin portion 47, the outer pipe 42 can be more stably supported.

As described above, according to the double pipe structure of the embodiment, the following effects can be provided. That is, the inner pipe 3 and the outer pipe 2 are differently formed and respectively joined to the joint member 10 by the plastic deforming means to form the double pipe 1. For example, after a forward end portion of the inner pipe 3 has been inserted into the joint member 10, the end portion of the inner pipe 3 is expanded from the inside to the outside so that the inner pipe 3 can be jointed to the joint member 10. Then, after a forward end portion of the outer pipe 2 has been externally engaged with the male portion 12 of the joint member 10, the forward end portion of the outer pipe 2 is plastically deformed by means of drawing, so that the outer pipe 2 can be joined to the joint member 10. Due to the foregoing, the inner pipe 3 and the outer pipe 2 can be supported by the joint member 10 at both end portions, and a step in which the inner pipe 3 and the outer pipe 2 are joined to each other can be avoided and the manufacturing cost can be reduced.

Further, the same effect can be provided in the following manner. In the case of joining the inner pipe 3 to the joint member 10B, the male side joint portion 32B is formed at the forward end portion of the inner pipe 3. After bead machining has been conducted on the male side joint portion 32B so as to form an expanded portion, an outer circumferential face of the bead portion 33 is press-fitted to the inner pipe 3 under the condition that the diameter of the outer circumferential face of the bead portion 33 is large than the diameter of the inner circumferential face of the joint member 10B. Due to the foregoing, the inner pipe 3 is plastically deformed and joined to the joint member 10B.

In the case of joining the outer pipe 2 to the joint member 10B, it is possible to adopt a structure in which the cylindrical female portion 12B is formed in the joint member 10B, and the outer pipe 2B is formed so that it can be used as a male portion. After a male portion of the outer pipe 2B has been internally engaged with the cylindrical female portion 12B of the joint member 10B, a forward end portion of the cylindrical female portion 12B of the joint member 10B is plastically deformed by means of drawing and joined to the outer pipe 2B.

Due to the foregoing, the inner pipe 3B and the outer pipe 2B can be respectively differently joined to the joint member 10B and supported by the joint member 10B at both end portions, and a step in which the inner pipe 3 and the outer pipe 2 are joined to each other can be avoided and the manufacturing cost can be reduced.

When O-rings 5, 6 are provided in the joint portions between the outer pipe 2 and the joint member 10 and between the inner pipe 3 and the joint member 10, refrigerant circulating in the outer pip 2 or inner pipe 3 can be prevented from leaking outside, so that the property of airtightness can be enhanced.

When the ring-shaped support member 45 (or the teeth 45A) having a plurality of fin portions 47 is inserted between the outer pipe 42 and the inner pipe 43 in bent portion V of the double pipe 41, it is possible to avoid the occurrence of interference of the outer pipe 42 with the inner pipe 43 in the case of bending the double pipe 41. Therefore, for example, it is possible to prevent the abrasion of the outer pipe 42 or the inner pipe 43 caused by vibration when a vehicle is running.

In this connection, the double pipe structure of the present invention is not limited to the above specific embodiment. For example, the double pipe structure of the present invention can be applied to not only an air-conditioner mounted on a vehicle but also an air-conditioner arranged in a building.

Referring to the drawings, explanations will be made into an embodiment of the joint structure of the present invention including two double pipes or one double pipe having an inner and an outer pipe in which the inner and the outer pipe are made to branch and connected.

Embodiment 1 of Double Pipe Joint Structure

Figure 20:
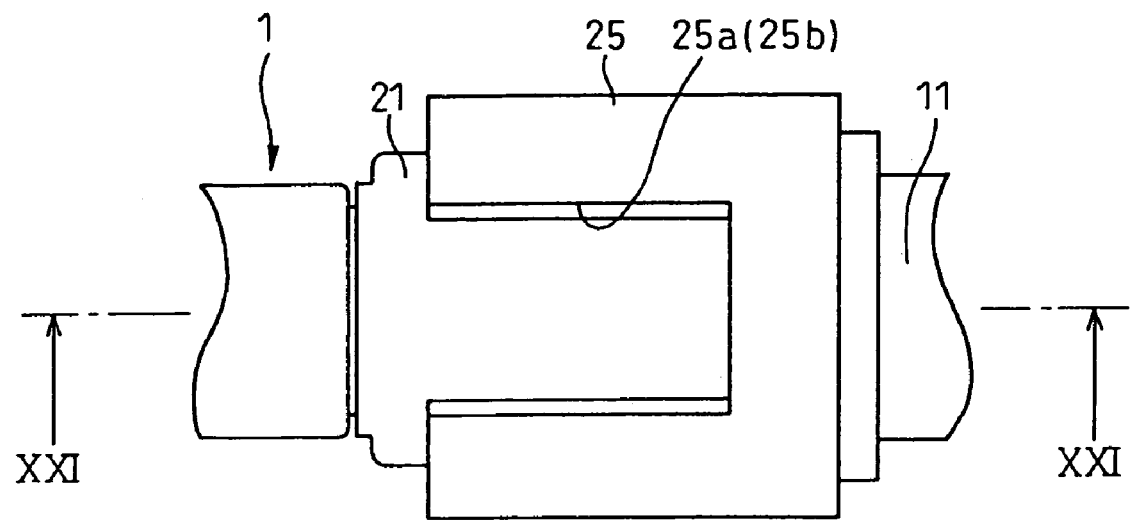
FIG. 20 is a partially sectional view showing a double pipe joint structure of the first embodiment of the present invention.
Figure 21:
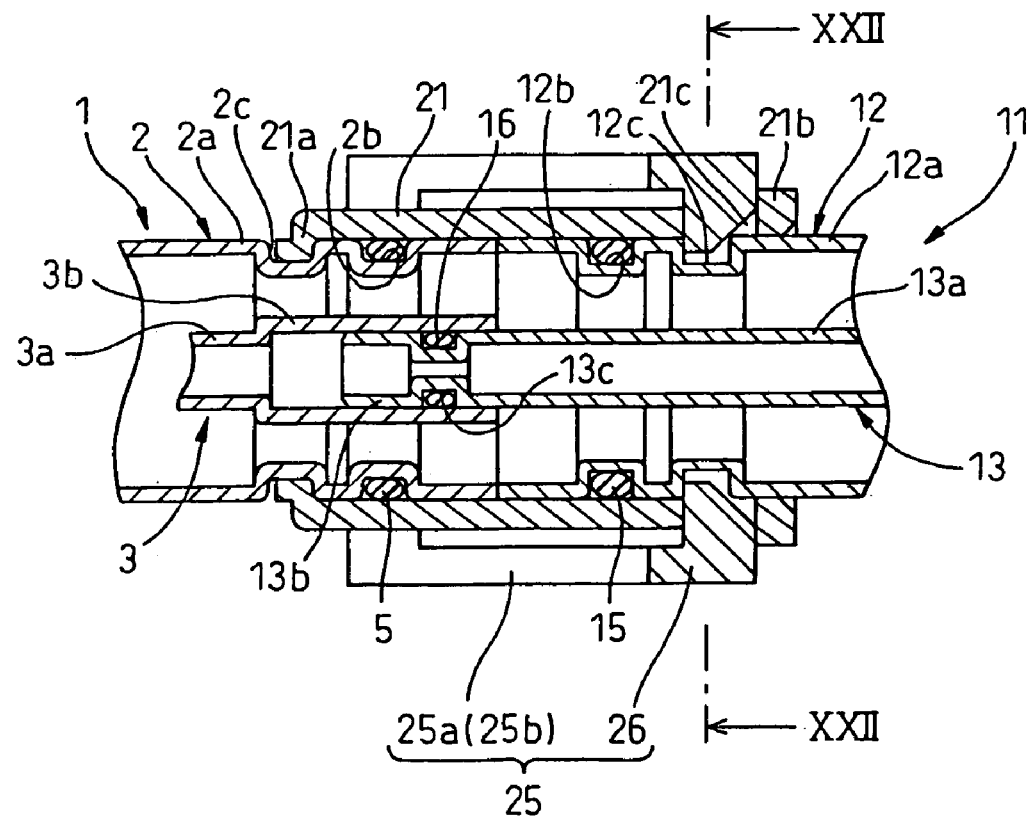
FIG. 21 is a sectional view taken along line XXI-XXI in FIG. 20.
Figure 22:
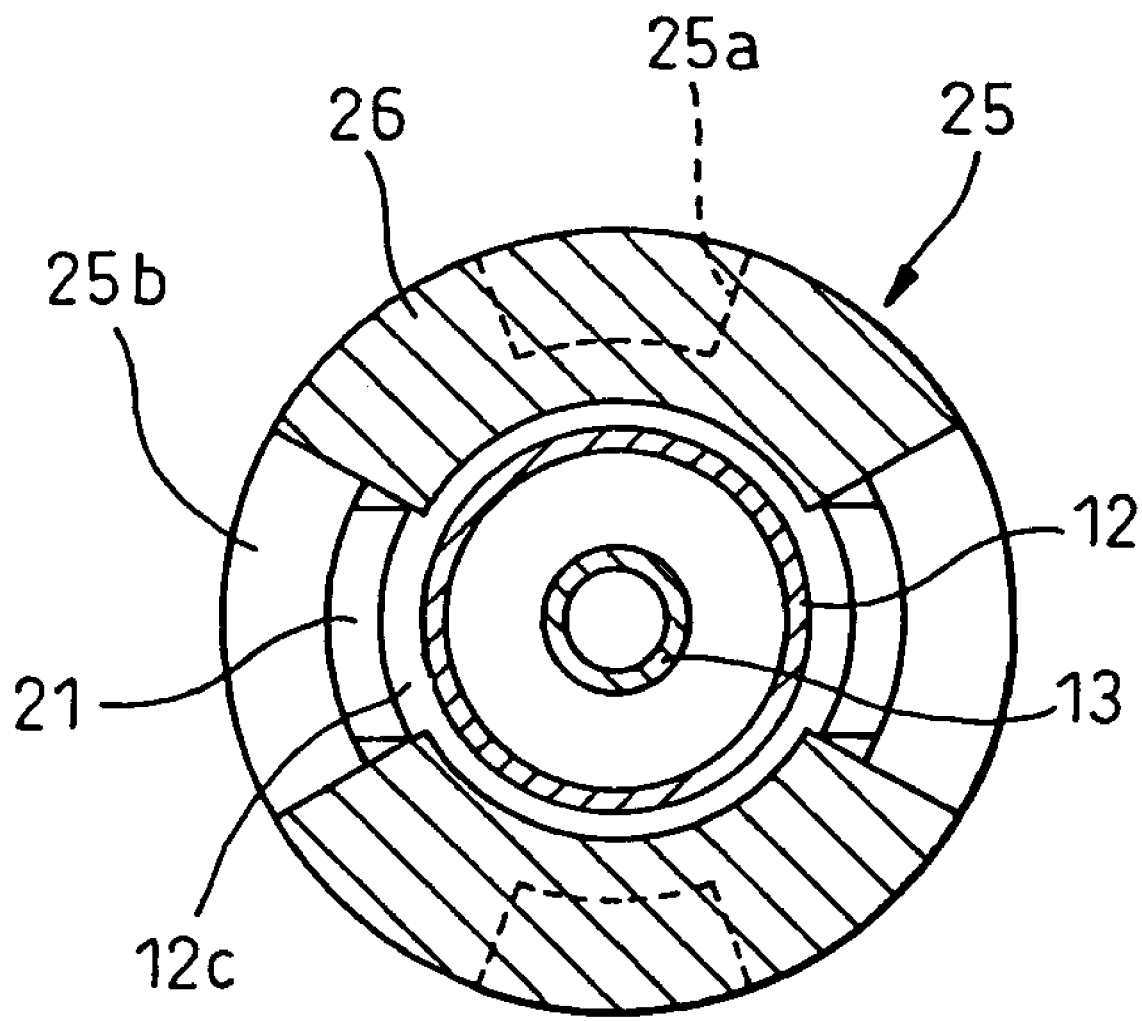
FIG. 22 is a sectional view taken along line XXII-XXII in FIG. 21.

As shown in FIGS. 20 to 22, the double pipe joint structure of the first embodiment includes: a first double pipe 1 composed of the outer pipe 2, in which refrigerant for low pressure circulates, and the inner pipe 3, in which refrigerant for high pressure circulates, inserted into the outer pipe 2; a second double pipe 11 composed of the outer pipe 12, in which refrigerant of low pressure circulates, and the inner pipe 13, in which refrigerant for high pressure circulates, inserted into the outer pipe 12; a joint member 21, the profile of which is formed into a cylindrical shape, which is joined to one end of the outer pipe 2 of the first double pipe 1 and internally engaged with the outer pipe 12 of the second double pipe 11; and an engaging member 25 engaged with the insertion groove 21c described later formed into an ellipse in the circumferential direction on the other end side of the joint member 21, the engaging member 25 being formed into a cylindrical shape so that it can cover the periphery of the joint member 21.

Figure 23A:
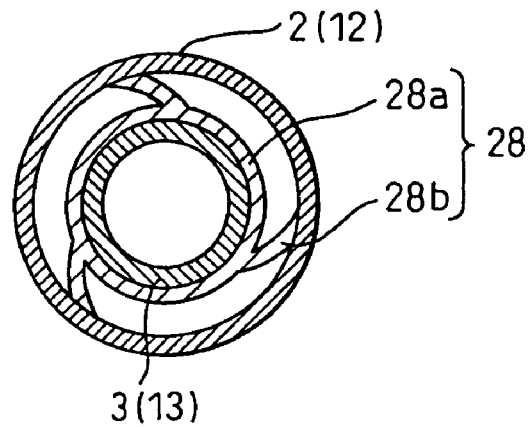
FIGS. 23A, 23B and 23C are sectional view showing a support member connecting an inner pipe with an outer pipe.

The inner pipe 3, which is formed in the outer pipe 2 differently from the outer pipe 2, is inserted into the first double pipe 1. As shown in FIG. 23A, in the double pipe 1, the outer pipe 2 and the inner pipe 3 are connected to each other by the support member 28 which includes an annular portion 28a and fin portions 28b which are arrange at regular intervals and spirally extended outward from the outer circumferential face of the annular portion 28a, the support member 28 being inserted and arranged between the inner pipe 3 and the outer pipe 2.

Figure 23B:
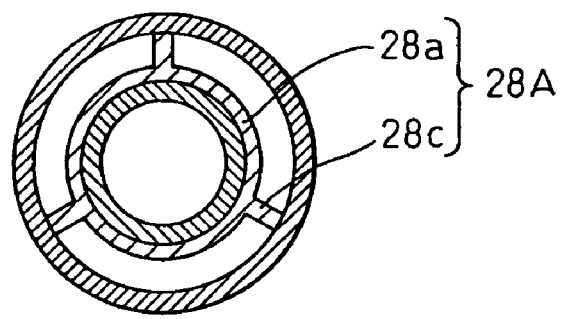
Figure 23C:
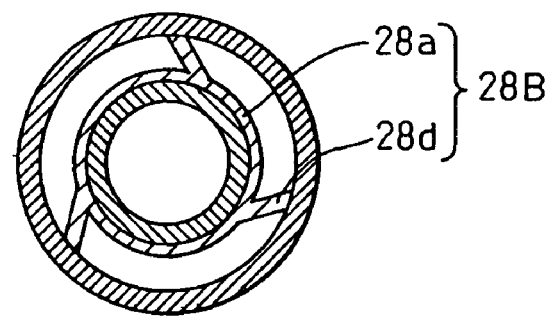

In this connection, concerning the support member 28, the fin portions protruding from the annular portion 28a may not be formed spirally as, for example, shown in FIG. 23B, and it is possible to use the support member 28A having a plurality of fin portions 28c protruding from the annular portion 28 in the perpendicular direction. As shown in FIG. 23C, it is possible to use the support member 28B having a plurality of fin portions 28d protruding from the annular portion 28a being linearly inclined.

In the neighborhood of both end portions of the outer pipe 2, the seal groove 2b and the engaging groove 2c, the diameters of which are smaller than the outer diameter of the common cylindrical portion 2a, are formed in the circumferential direction in this order from the end side. O-ring 5 is attached to the seal groove 2b, and one end of the joint member 21 is joined to the engaging groove 2c in the neighborhood of one end face of the end portions of the outer pipe 2 by means of drawing for reducing a diameter of the end portion. In the engaging groove not shown in the neighborhood of the other end face, the elastic engaging portion 26 of the engaging member 25 described later is engaged.

Concerning both end portions of the inner pipe 3 of the first double pipe 1, one end portion is formed as a female side joint portion 3b extending from the common cylindrical portion 3a, and the other end portion is formed as a male side joint portion. The female side joint portion 3b of the inner pipe 3 in the first double pipe 1 and the male side joint portion 13b in the second double pipe 11 can be engaged with each other. In the male side joint portion not shown, the profile of which is the same as that of the male side joint 13b showing the inner pipe 13 of the second double pipe 11 described later, a seal groove, the diameter of which is smaller than that of the common cylindrical portion 13a, is formed and contains an O-ring.

Concerning the second double pipe 11, the inner pipe 13 formed differently from the outer pipe 12 is inserted into the outer pipe 12. AS shown in FIG. 23A, in the double pipe 11, the outer pipe 12 and the inner 13 are connected to each other by the support member 28 which includes an annular portion 28a and fin portions 28b which are arrange at regular intervals and spirally extended outward from the outer circumferential face of the annular portion 28a, the support member 28 being inserted and arranged between the inner pipe 13 and the outer pipe 12.

Further, in the neighborhood of both end portions of the outer pipe 12, the seal groove 12b and the engaging groove 12c, the diameters of which are smaller than th outer diameter of the common cylindrical portion 12a, are respectively formed in the circumferential direction in this order from the end face side. The seal groove 12b is attached with O-ring 15. One end of the joint member not shown, the profile of which is the same as that of the joint member 31 joined to the first double pipe 1, is joined to the engaging groove close to one end face by means of reducing the diameter by drawing, and the elastic engaging portion 26 of the engaging member 25 is engaged with the engaging groove 12c close to the other end face.

Both end portions of the inner pipe 13 of the second double pipe 11 is formed in such a manner that one end portion is a female side joint portion not shown and the other end portion is a male side joint portion 13b extending from the common cylindrical portion 13a. Both joint portions are respectively engaged with the female side joint portion 3b of the first double pipe 1 and the male side joint portion 13b of the second double pipe 11. The seal groove 13c, the diameter of which is smaller than that of the common cylindrical portion 13a, is formed in the male side joint portion 13b and attached with O-ring 16.

One end portion of the joint member 21, the profile of which is formed into a cylindrical shape, is internally engaged with the outer pipe 2 of the first double pipe 1. Then, in one end portion of the joint member 21, the joining portion 21a joined to the outer pipe 2 is formed toward the engaging groove 2c, which is formed in the outer pipe 2, by reducing the diameter by means of drawing. In the other end portion, the end edge portion 21b, the diameter of which is larger than the diameter of the common portion, is provided, and a plurality of insertion groove portions 21c, the profile of which is an ellipse, are formed in the circumferential direction being adjacent to the end edge portion 21b.

The engaging member 25 is formed into a cylindrical shape and includes a first horizontal window portion 25a extending from one end face in the axial direction and a second horizontal window portion 25b extending from the other end face.

The first horizontal window portion 25a and the second horizontal window portion 25b are alternately arranged in the circumferential direction. The elastic engaging portion 26 described before is arranged protruding inward in one thick wall portion in which the first horizontal window portion 25a or the second horizontal window portion 25b is not formed.

Figure 24:
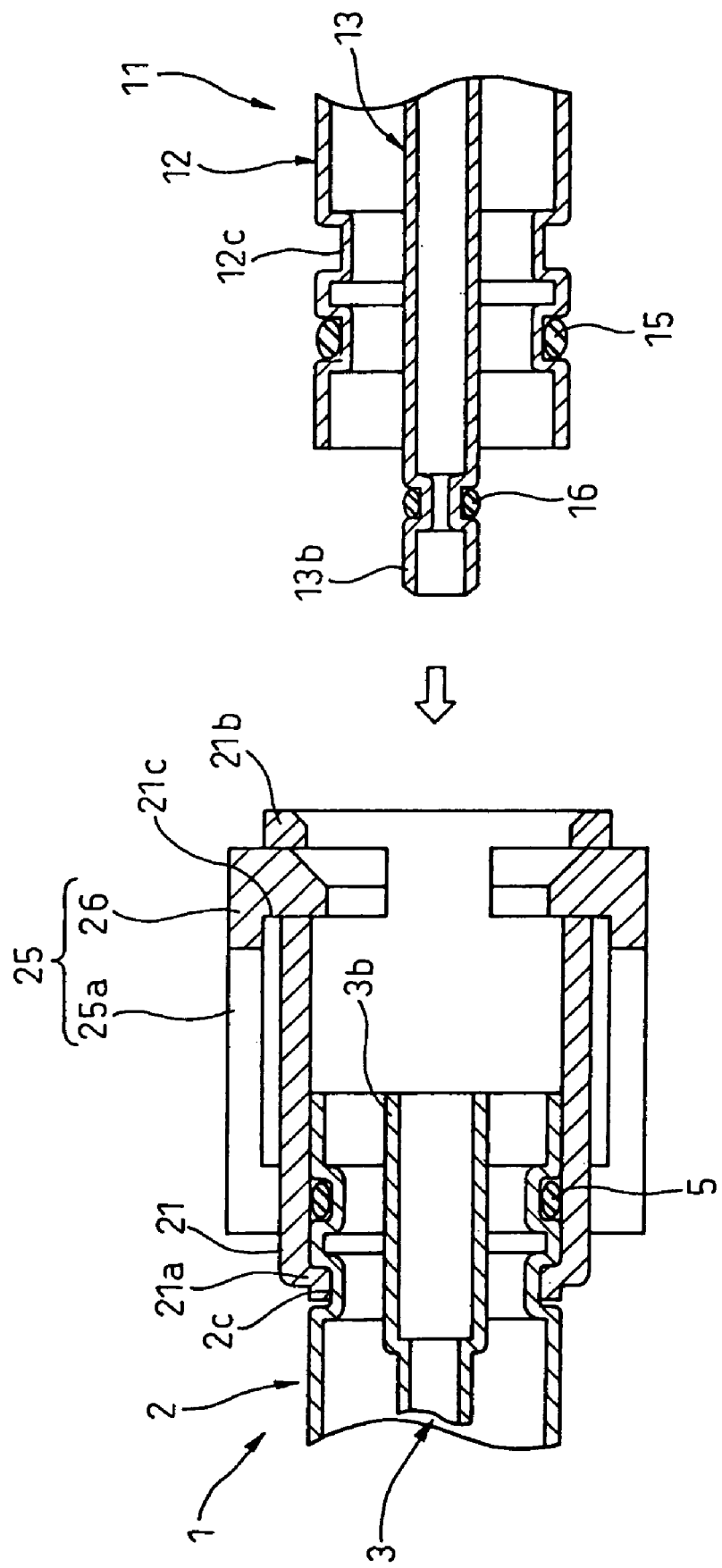
FIG. 24 is a partially sectional view showing a connecting action of the first double pipe with the second double pipe.

Next, referring to FIG. 24, the mode of operation of the double pipe joint structure in this embodiment will be explained below.

In the first double pipe 1, the joint member 21, one end portion of which is joined by reducing the diameter by drawing, is attached to the engaging groove 2c formed close to the end portion of the outer pipe 2. Further, the engaging member 25, which has been inserted into the elastic engaging portion 26, is attached to the inserting groove portion 21c of the joint member 21. On the other hand, one end of the second double pipe 11 is arranged at a position opposed to the opening of the joint member 21 under the condition that the male side joint portion 13b protrudes from the forward end portion of the outer pipe 12.

When the second double pipe 11 is moved toward the first double pipe 1, the male side joint portion 13b of the inner pipe 13 proceeds into the opening of the joint member 21, and the forward end portion of the outer pipe 12 is moved toward the end edge portion 21b of the joint member 21 and contacted with the elastic engaging portion 26 of the engaging member 25. Then, the elastic engaging portion 26 is pushed by the forward end portion of the outer pipe 12 of the second double pipe 11 and expanded in the inserting groove portion 21c of the joint member 21. In this case, when a contact face with the outer pipe 12 of the elastic engaging portion 26 is formed into an inclined face, the elastic engaging portion 26 can be easily expanded when the outer pipe 12 is moved.

When the second double pipe 11 moves further into the joint member 21, the male side joint portion 13b of the inner pipe 13 in the second double pipe 11 moves into the female side joint portion 3b of the inner pipe 3 of the first double pipe 1, and a connection of the inner pipe 3 of the first double pipe 1 with the inner pipe 13 of the second double pipe 11 is started. On the other hand, when the outer pipe 12 of the second double pipe 11 moves into the joint member 21 exceeding the elastic engaging portion 26, it engages with the inner circumferential face of the joint member 21.

When the outer pipe 12 is moved and the forward end portion of the outer pipe 12 of the second double pipe 11 is moved to a position where it comes into contact with the forward end portion of the outer pipe 2 of the first double pipe 1, the engaging groove 12c of the outer pipe 12 reaches a position of the elastic engaging portion 26. As the diameter of the engaging groove 12c is small, the diameter of the elastic engaging portion 26, the diameter of which has been expanded by the outer pipe 12 of the second double pipe 11, is contracted by an elastic force and engaged with the engaging groove 12c. Due to the foregoing, the outer pipe 2 of the first double pipe 1 and the outer pipe 12 of the second double pipe 11 are connected to each other, and the first double pipe 1 and the second double pipe 11 are connected to each other and put into the state shown in FIG. 21.

In this case, the outer pipe 2 of the first double pipe 1 and the joint member 21 are sealed from each other by O-ring 5, and the outer pipe 12 of the second double pipe 11 and the joint member 21 are sealed from each other by O-ring 15. Therefore, refrigerant of low pressure flowing in the outer pipe 2 in the first double pipe 1 flows in the outer pipe 12 of the second double pipe 11 without leaking outside under the condition that the property of airtightness is enhanced. The inner pipe 3 of the first double pipe 1 and the inner pipe 13 of the second double pipe 11 are sealed from each other by O-ring 16. Therefore, refrigerant flowing in the inner pipe 3 in the first double pipe 1 flows in the inner pipe 13 of the second double pipe 11 without leaking outside under the condition that the property of airtightness is enhanced.

Consequently, according to the double pipe structure of the embodiment, it is possible to connect the second double pipe 11 to the first double pipe 1 through one operation. Therefore, the working property can be greatly enhanced and the manufacturing cost can be reduced. Further, the joint structure for connecting a pair of double pipes 1, 11 includes: a cylindrical member 21 for covering the outer pipe 2 of the first double pipe 1; and a cylindrical engaging portion 25 covering the joint member 21 and engaging with the inserting groove portion 21c of the joint member 21. Therefore, it is possible to compose an inexpensive and compact structure.

Figure 25:
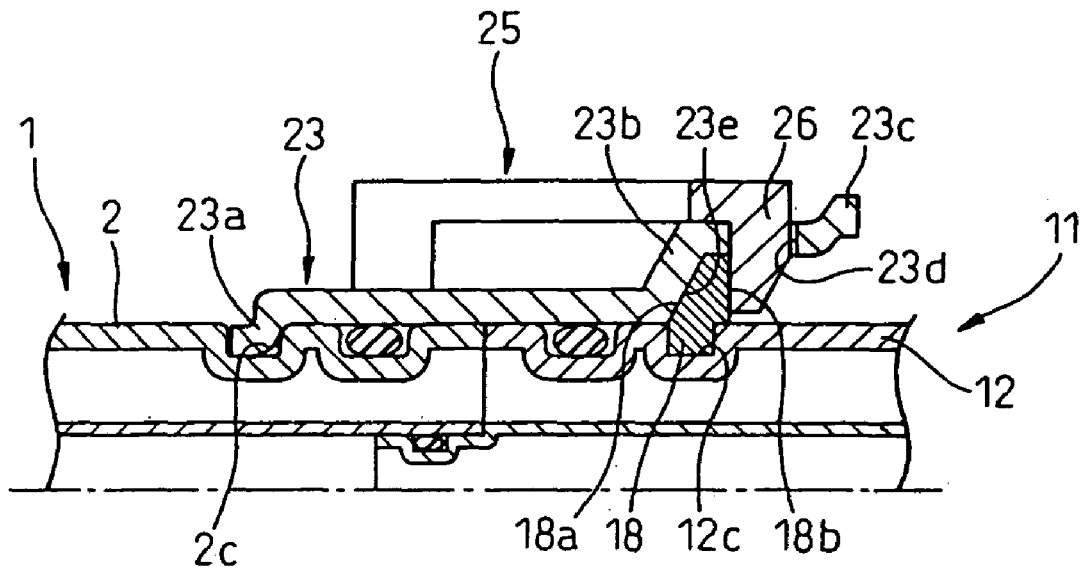
FIG. 25 is a partially sectional view showing another embodiment of the connection of the first double pipe with the second double pipe.

In this embodiment, as shown in FIG. 25, a connection may be conducted when the end edge portion 23c of the joint member 23 is raised by the tapered portion 23b, the diameter of which is expanded like a tapered shape. That is, the joint portion 23 includes: a joining portion 23a, one end portion of which is joined to the engaging groove 2c of the outer pipe 2 of the first double pipe 1 by reducing the diameter by means of drawing; a tapered portion 23b rising from the common portion outer diameter; and an end edge portion 23c, the profile of which is expanded, connected with an upper end portion of the tapered portion 23b. In the connecting portion of the tapered portion 23b with the end edge portion 23c, a plurality of inserting groove portions 23d, into which the elastic engaging portion 26 of the engaging member 25 is inserted, are formed in the circumferential direction. An inner wall face of the tapered portion 23b is formed as the tapered inner face 23e.

On the other hand, the ring member 18, made of resin or metal, is attached to the engaging groove 12c of the outer pipe 12 in the second double pipe 11 by means of outsert-forming. The ring member 18 includes: a tapered outer face 18a engaging with the tapered inner face 23e of the joint member 23; and an engaging face 18b engaging with the elastic engaging portion 26.

In the double pipe joint structure of this embodiment, when the second double pipe 11 is moved toward the first double pipe 1, the ring member 18 attached to the outer pipe 12 of the second double pipe 11 pushes the elastic engaging portion 26. Then, the ring member 18 proceeds into the joint member 23 while the elastic engaging portion 26 is being expanded. Then, the tapered outer face 18a of the ring member 18 is engaged with the tapered inner face 23e of the joint member 23 at a position where the forward end face of the outer face 12 of the second double pipe 11 comes into contact with the end face of the outer pipe 2 of the first double pipe 1. At the same time, the diameter of the elastic engaging portion 26 is contracted and engaged with the engaging face 18b of the ring member 18.

Accordingly, the first double pipe 1 and the second double pipe 11 are connected to each other through one-touch operation and the working property can be enhanced. Further, as the tapered faces of the ring member 18 and the joint member 23 are contacted to each other, the property of airtightness can be enhanced. Accordingly, there is no possibility that refrigerant of low pressure flowing in the outer pipe leaks outside.

Figure 26:
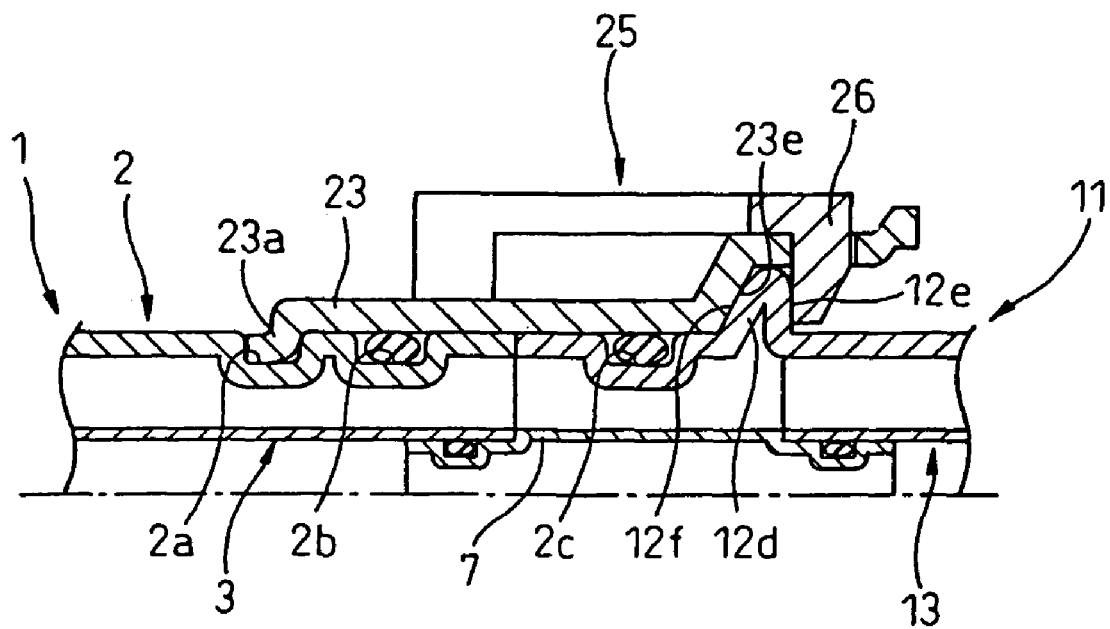
FIG. 26 is a partially sectional view showing another embodiment of the double pipe joint structure of the first embodiment.

As shown in FIG. 26, instead of the engaging groove 12c and the ring member 18 of the outer pipe 12 of the second double pipe 11 in the double pipe joint structure shown in FIG. 25, bead machining is conducted on the outer pipe 12 of the second double pipe 11 so as to form the expanded portion 12d. In the expanded portion 12d, the engaging face 12e capable of engaging with the elastic engaging portion 26 of the engaging member 25 and the tapered outer face 12f capable of engaging with the tapered inner face 23e of the joint member 23 are formed.

When the second double pipe 11 is moved toward the first double pipe 1, the expanded portion 12d formed in the outer pipe 12 of the second double pipe 11 pushes the elastic engaging portion 26. Then, the expanded portion 12d proceeds into the joint member 23 while the elastic engaging portion 26 is being expanded. Then, at the position where the forward end face of the outer pipe 12 in the second double pipe 11 comes into contact with the end face of the outer pipe 2 in the first double pipe 1, the tapered outer face 12f of the expanded portion 12d engages with the tapered inner face 23e of the joint member 23. At the same time, the diameter of the elastic engaging portion 26 is contracted, so that it can be engaged with the engaging face 12e of the expanded portion 12d.

In order to form the expanded portion 12d in the outer pipe 12 of the second double pipe 11 by means of bead machining, the inner pipe 13 of the second double pipe cannot protrude from the outer pipe 12 of the double pipe 12 between the inner pipe 3 of the first double pipe 1 and the inner pipe 13 of the second double pipe 11. Therefore, the bypass inner pipe 7 is inserted so that the respective inner pipes 3, 13 can be connected with each other.

Concerning the first double pipe 1 and the second double pipe 11, only the second double pipe 11 is made to move toward the first double pipe 1. Therefore, a connection can be conducted through one operation. Therefore, the working property can be enhanced. Further, the tapered face of the expanded portion 12d of the outer pipe 12 of the second double pipe 11 and the tapered face of the joint member 23 are contacted with each other. Therefore, the property of airtightness can be enhanced, and there is no possibility that the refrigerant of low pressure flowing in the outer pipe leaks outside.

Embodiment 2 of Double Pipe Joint Structure

Figure 27:
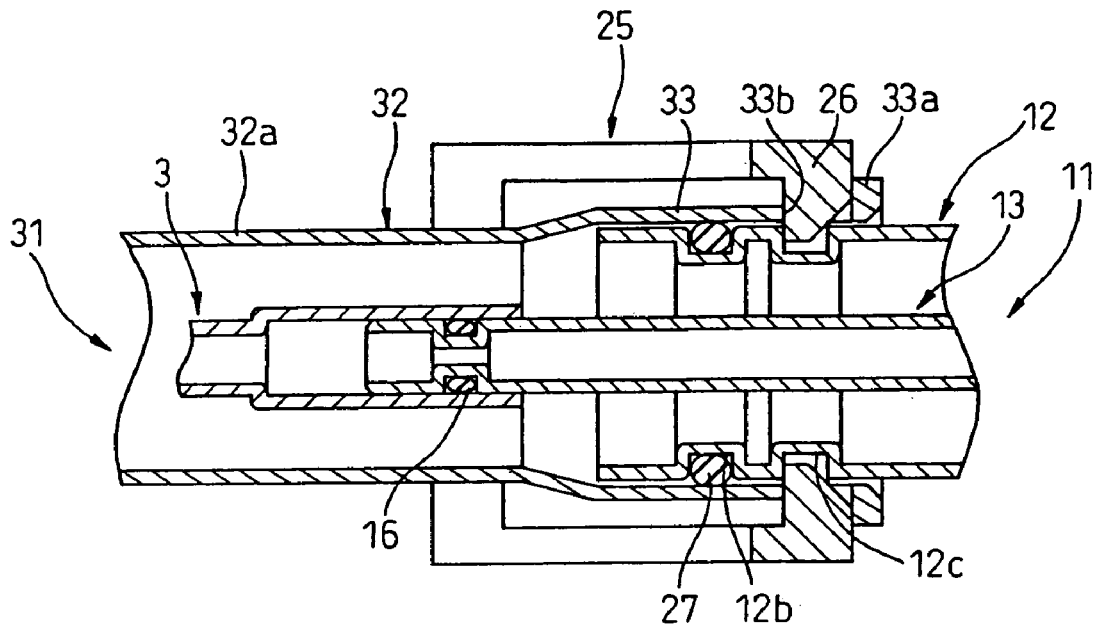
FIG. 27 is a partially sectional view showing a double pipe joint structure of the second embodiment.

Next, the double pipe joint structure of the second embodiment will be explained below. In this embodiment, the joint member 21 in the first embodiment is deleted and the engaging member 25 is directly attached to the outer pipe 32 of the first double pipe 31 as shown in FIG. 27. In this connection, the inner pipe 3 of the first double pipe 31, the outer pipe 12 of the second double pipe 11, the inner pipe 13 of the second double pipe 11 and the engaging member 25 are the same as those of the first embodiment. Therefore, explanations of the constitution are omitted here. When it is necessary to explain those components, the same reference numerals as those of the first embodiment are attached.

The female side joint portion 33, the diameter of which is expanded larger than the diameter of the common cylindrical portion 32a, is formed in one end portion of the outer pipe 32 of the first double pipe 31, so that the female side joint portion 33 can be internally engaged with the outer pipe 12 of the second double pipe 11. The female side joint portion 33 has an end edge portion 33a, the diameter of which is larger than the outer diameter of the common portion of the female side joint portion 33. Further, the female side joint portion 33 has a plurality of inserting groove portions 33b in the circumferential direction, into which the elastic engaging portion 26 of the engaging member 25 can be inserted, adjacent to the end edge portion 33a.

The engaging member 25 is attached to the outer pipe 32 when the elastic engaging portion 26 at the forward end portion is inserted into the inserting groove portion 33b formed in the female side joint portion 33 of the outer pipe 32. When the diameter of the elastic engaging portion 26 is elastically expanded and contracted, the elastic engaging portion 26 can be engaged with the engaging groove 12c of the second double pipe 11.

Accordingly, in the double pipe structure of this embodiment, when the outer pipe 12 pushes and expands the elastic engaging portion 26 of the engaging member 25 by the movement of the second double pipe 11 to the first double pipe 31 side, the second double pipe 11 can be made to proceed into the female side joint portion 33 of the outer pipe 32 of the first double pipe 31. When the inner pipe 13 of the second double pipe 11 is internally engaged with the inner pipe 3 of the first double pipe 31 and moved to a predetermined position, the elastic engaging portion 26 can be engaged with the engaging groove 12c of the outer pipe 12. Due to the foregoing, only the second double pipe 11 is made to proceed into the first double pipe 31. Therefore, the first double pipe 31 and the second double pipe 11 can be connected with each other through one operation.

In this connection, the outer pipe 32 of the first double pipe 31 and the outer pipe 12 of the second double pipe 11 are sealed from each other by O-ring 27 attached to the seal groove 12b of the outer pipe 12. Therefore, refrigerant of low pressure flowing in the outer pipe 32 of the first double pipe 31 flows in the outer pipe 12 of the second double pipe 11 without leaking outside under the condition that the property of airtightness is enhanced. The inner pipe 3 of the first double pipe 1 and the inner pipe 13 of the second double pipe 11 are sealed from each other by O-ring 16 in the same manner as that of the double pipe joint structure of the first embodiment. Therefore, refrigerant of high pressure flowing in the inner pipe 3 of the first double pipe 1 can be supplied into the outer pipe 13 of the second double pipe 11 without leaking outside under the condition that the property of airtightness is enhanced.

Embodiment 3 of Double Pipe Joint Structure

Next, the double pipe joint structure of the third embodiment will be explained below.

Figure 28:
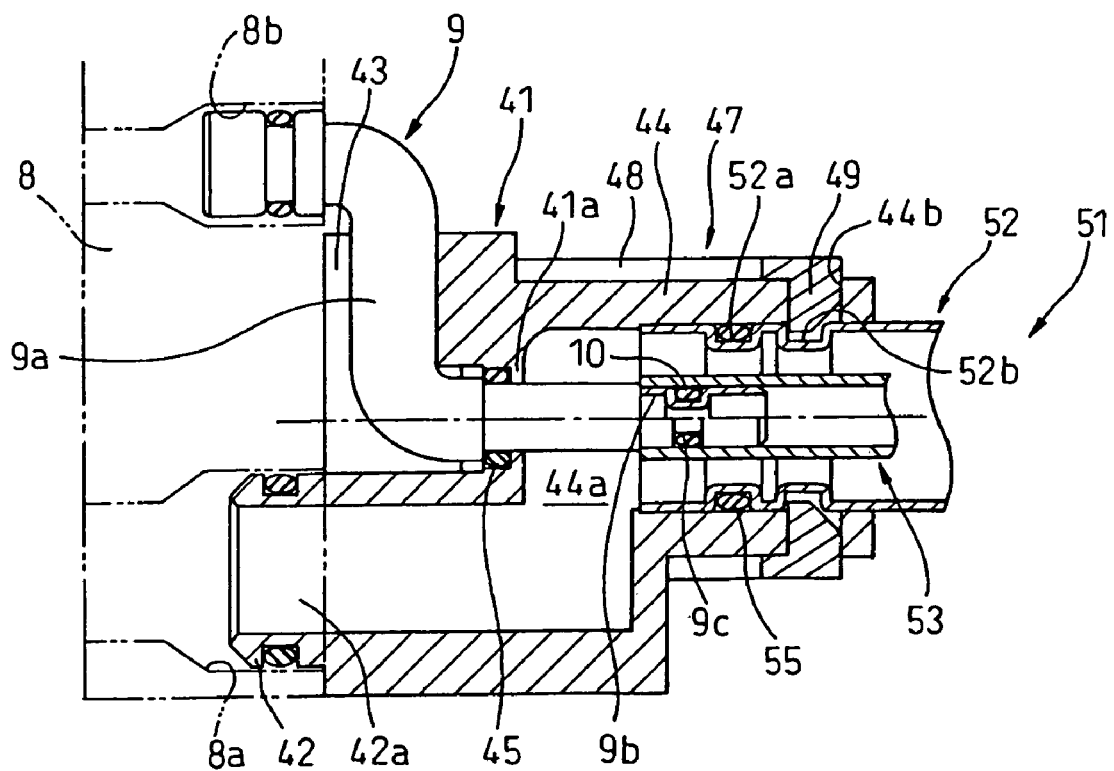
FIG. 28 is a partially sectional view showing a double pipe joint structure of the third embodiment.
Figure 29:
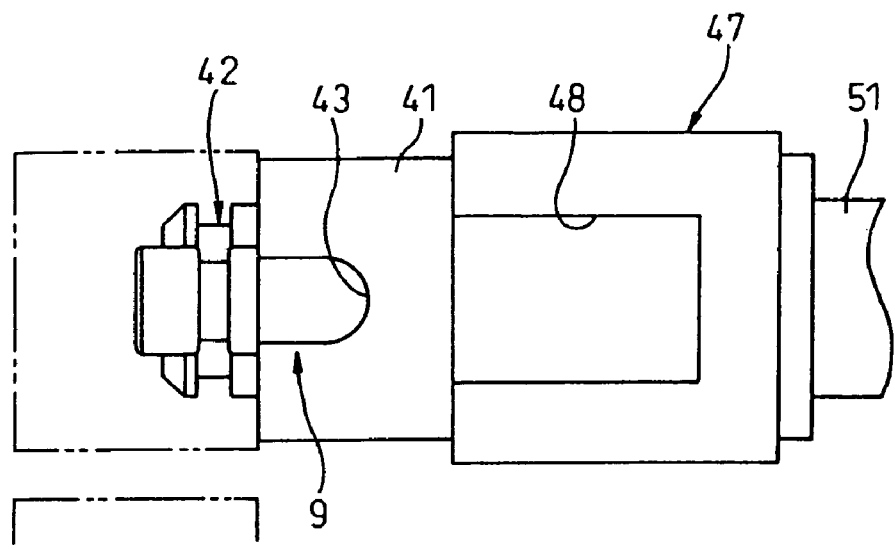
FIG. 29 is a plan view in FIG. 28.

In the double pipe structure of this embodiment, as shown in FIGS. 28 and 29, either the first double pipe or the second double pipe is a functional member. For example, while the deformed-cylinder-shaped connector member 41, which is a two-way-branch joint, is being interposed, the expansion valve 8 in which the outer pipe and the inner pipe branch to a different axis is joined to the second double pipe 11 from one side.

As shown in FIG. 28, the connector member 41 adjacent to the expansion valve 8 includes: a male side joint portion 42 cylindrically protruding so that it can be inserted into the port 8a for refrigerant of low pressure of the expansion valve 8; an opening portion 43 into which the connecting pipe 9 for connecting the high pressure refrigerant port 8b of the expansion valve 8 with the connector member 41 is inserted; and a female side joint portion 44 having the hollow portion 44a into which the second double pipe 51 is inserted, wherein the male side joint portion 42 and the opening portion 43 are provided on one side and the female side joint portion 44 is provided on the other side.

The low pressure refrigerant passage 42a in the male side joint portion 42 is bent in the vertical direction and connected with the hollow portion 44a of the female side joint portion 44. The connecting pipe 9 is inserted into the opening 43. The opening 43 is connected to a hollow portion of the female side joint portion 44 via the wall portion 41a of the connector member 41. The bent portion 9a of the connecting pipe 9 is inserted into the opening 43 of the connector member 41, and the linear portion of the connecting pipe 9, which is horizontally extended from the bent portion 9a, is inserted into the wall portion 41a and the hollow portion 44a of the female side joint portion 44, so that the male side joint portion 9b is formed. The seal groove 9c is formed in the neighborhood of the forward end portion of the male side joint portion 9b, and O-ring 10 is attached to the seal groove 9c, and O-ring 45 is attached between the connecting pipe 9 and the wall portion 41a of the connector member 41.

On the other hand, the engaging member 47 is attached to the outer circumferential face of the connector member 41. The engaging member 47 is formed into a cylindrical shape. The engaging member 47 includes: first horizontal window portions 48 extending in the axial direction from one end face at regular intervals; and second horizontal window portions not shown extending from the other end face, wherein the first horizontal window portions 48 and the second horizontal window portions are alternately arranged in the circumferential direction. In one of the thick wall portions in which the first horizontal window portions 48 or the second horizontal window portions is not formed, the elastic engaging portion 49 is arranged protruding inward. When the elastic engaging portion 49 is inserted into a plurality of inserting groove portions 44b formed in the neighborhood of one end portion (on the female connector portion 44 side) of the connector member 41 in the circumferential direction, the elastic engaging portion 49 is attached to the connector member 41. Further, the elastic engaging portion 49 can be engaged with the engaging groove 52b formed in the outer pipe 52 of the second double pipe.

The connector member 41 side end portion of the outer pipe 52 of the second double pipe 51 forms a male side joint portion. The connector member 41 side end portion of the outer pipe 52 of the second double pipe 51 can be inserted into the female side joint portion 44 of the connector member 41. The seal groove 52a and the engaging groove 52b are formed in the connector member 41 side end portion in this order from the end portion. O-ring 55 is attached to the seal groove 52a, and the elastic engaging portion 49 is engaged with the engaging face 52b. The inner pipe 53 of the second double pipe 51 forms a female side joint portion 44 and can be inserted into the male side joint portion 9b of the connecting pipe 9.

In the double pipe joint structure composed as described above, when the second double pipe 51 is moved toward the female joint portion 44 of the connector member 41, a forward end portion of the outer pipe 52 of the second double pipe 51 pushes the elastic engaging portion 49 of the engaging member 47. Then, the forward end portion of the outer pipe 52 of the second double pipe 51 proceeds into the female side joint portion 44 of the connector member 41 while the elastic engaging portion 49 is being expanded. At the position where the forward end face of the outer pipe 52 of the second double pipe 51 reaches a step face in the female side joint portion 44, the diameter of the elastic engaging portion 49 of the engaging member 47 is contracted and the engaging member 47 is engaged with the engaging groove 52b of the outer pipe 52, and the male side joint portion 9b of the connecting pipe 9 is inserted into the inner pipe 53.

In this case, the female side joint portion 44 of the connector member 41 and the outer pipe 52 of the second double pipe 51 are sealed from each other by O-ring 55, and the male side joint portion 9b of the connecting pipe 9 and the inner pipe 53 of the second double pipe 51 are sealed from each other by O-ring 10. Therefore, the property of airtightness can be positively ensured.

Accordingly, only when the second double pipe 51 is made to move toward the female side joint portion 44 of the connector member 41, the connector member 41 and the second double pipe 51 are connected to each other. Therefore, the connection can be conducted through one operation and the working property can be enhanced.

As described above, according to the double pipe joint structure of the first to the third embodiment, the first double pipe 1 (or 31) or the connector member 41 and the second double pipe 11 (or 51) can be connected to each other through one operation for the following reasons. The engaging member 25 (or 47) having the elastic engaging portion 26 (or 49) is attached to the first double pipe 11 (or 51) or the joint member 21 or the connector member 41. When the second double pipe 11 (or 51) is made to move into the first double pipe 1 (or 31) or the joint member 21 or the connector member 41, the diameter of the elastic engaging member 26 (or 49) is expanded or contracted, so that the second double pipe 11 (or 51) is engaged with the outer pipe 12 (or 52). Only when the second double pipe 11 (or 51) is made to move toward the first double pipe 1 (or 31) or the joint member 21 or the connector member 41, the first double pipe 1 (or 31) and the second double pipe 11 (or 51) or the connector member 41 and the second double pipe 51 can be connected to each other through one operation, so that the working property can be enhanced and the manufacturing cost can be reduced.

Embodiment 4 of Double Pipe Joint Structure

Figure 30:
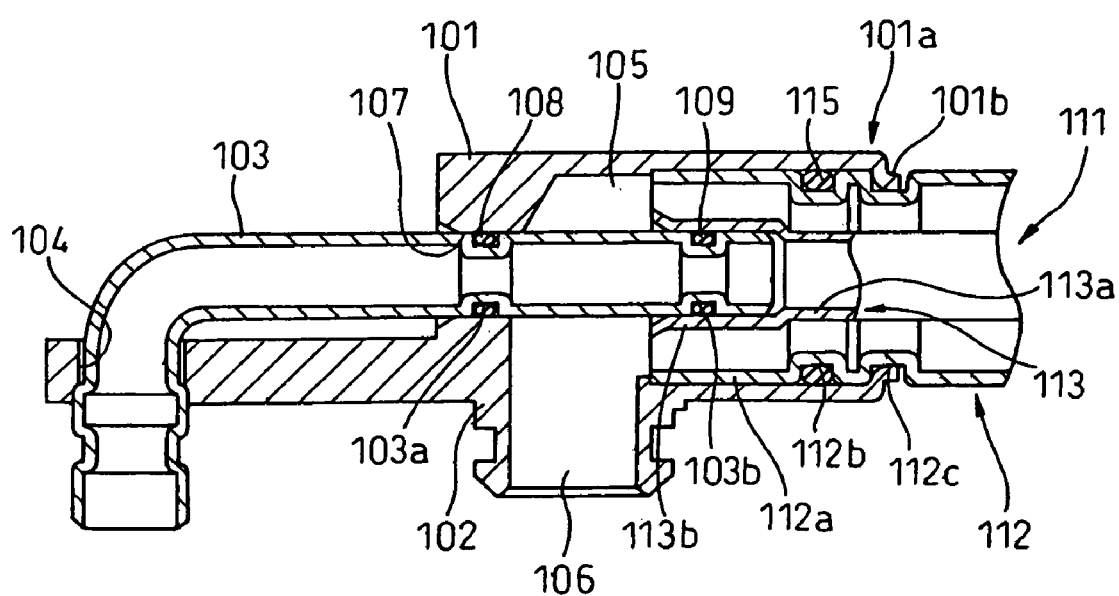
FIG. 30 is a partially sectional view showing a double pipe joint structure of the fourth embodiment.

Next, explanations will be made into the fourth embodiment in which double pipes composed of an inner pipe and an outer pipe, which are differently formed, are inexpensively connected to each other without using the means of soldering or welding. The double pipe structure of this embodiment does not include an engaging portion provided with an elastic engaging portion. In the double pipe structure of this embodiment, the first double pipe and the second double pipe, which are arranged at a joining position, are connected to each other by plastically deforming the joint member. As shown in FIG. 30, the joint structure includes: a connector member 101 which is a joint member to join the inner and the outer pipe of the first double pipe, the end portions of the inner and the outer pipe branching to two-ways from each other; and a second double pipe 111 which can be internally engaged with the female side joint member 101a of the connector member 101, wherein the connector member 101 and the second double pipe 111 are connected to each other.

The connector member 101 includes: a male side joint member 102 connected to a pipe member for low pressure; an insertion hole 104 connected to a pipe member for high pressure, one end of the bypass inner pipe 103 being inserted into the insertion hole; and a hollow portion 105 in which the outer pipe 112 of the double pipe 111 is accommodated.

The hollow portion 105 is communicated with the refrigerant passage 106 for low pressure of the male side joint portion 102, and the other end side of the bypass inner pipe 103 extending from the pipe insertion hole 107 formed in the entrance side wall portion of the connector member 101 is inserted into the hollow portion 105. The bypass inner pipe 103, which is inserted into the hollow portion 105, forms a sealing structure with the connector member 101 when the seal groove 103a is formed in a portion supported by the pipe insertion hole 107 of the connector member 101 and O-ring 108 is attached to the seal groove 103a. The end portion of the bypass inner pipe 103 is internally engaged with the inner pipe 113 of the double pipe 111 when the seal groove 103b is formed and O-ring 109 is attached to it.

The end portion of the outer pipe 112 of the double pipe 111 on the connector member 101 side is formed into the male side joint member 112a, and the seal groove 112b and the joint groove 112c are formed in this order from the end side. The seal groove 112b is attached with O-ring 115, so that a seal structure is composed with the connector member 101. The end edge portion 101b of the female side joint portion 101a of the connector member 101 is joined to the joining groove 112 by means of drawing for reducing the diameter.

On the other hand, in the inner pipe 113 of the double pipe 111, the connector member side end portion forms the female side joint portion 113b, the diameter of which is expanded to be larger than the diameter of the common cylindrical portion 113a. An end portion of the bypass inner pipe 103 is internally engaged with this female side joint portion 113b. A forward end portion of the female side joint portion 113b is expanded by means of expansion, so that an end portion of the bypass inner pipe 103 can be easily inserted into the female side joint portion 113b.

In the above double pipe joint structure, the operation is conducted as follows. In the connector member 101, one end side of the bent bypass inner pipe 103 is inserted into the insertion groove 104 of the connector member 101. The other end side attached with O-rings 108, 109 is inserted into the pipe insertion hole 107 of the connector member 101. Then, the bypass inner pipe 103 and the insertion groove 104 of the connector member 101 are connected to each other by means of calking. After that, the double pipe 111 is made to move into the female side joint portion 101a of the connector member 101, and the outer pipe of the double pipe 111 is internally engaged with the female side joint portion 101a, and an end portion of the bypass inner pipe 103 is internally engaged with the female side joint portion 113b of the inner pipe 113. The end edge portion 101b of the connector member 101 is calked and joined to the joining groove 112c of the outer pipe 112 by means of drawing for reducing the diameter.

In the double pipe joint structure of this embodiment, when the second double pipe 111 is connected to the connector member 101 to join the outer pipe 112 and the inner pipe 113, which are formed differently from each other, the connector member 101 is joined to the outer pipe 112 by plastically deforming the end edge portion 101b of the connector member 101. Therefore, the double pipe 111 and the connector member 101 can be joined to each other without using the means of soldering or welding. Therefore, the working property can be enhanced and the manufacturing cost can be reduced.

Embodiment 5 of Double Pipe Joint Structure

Next, the double pipe joint structure of the fifth embodiment will be explained as follows.

Figure 31:
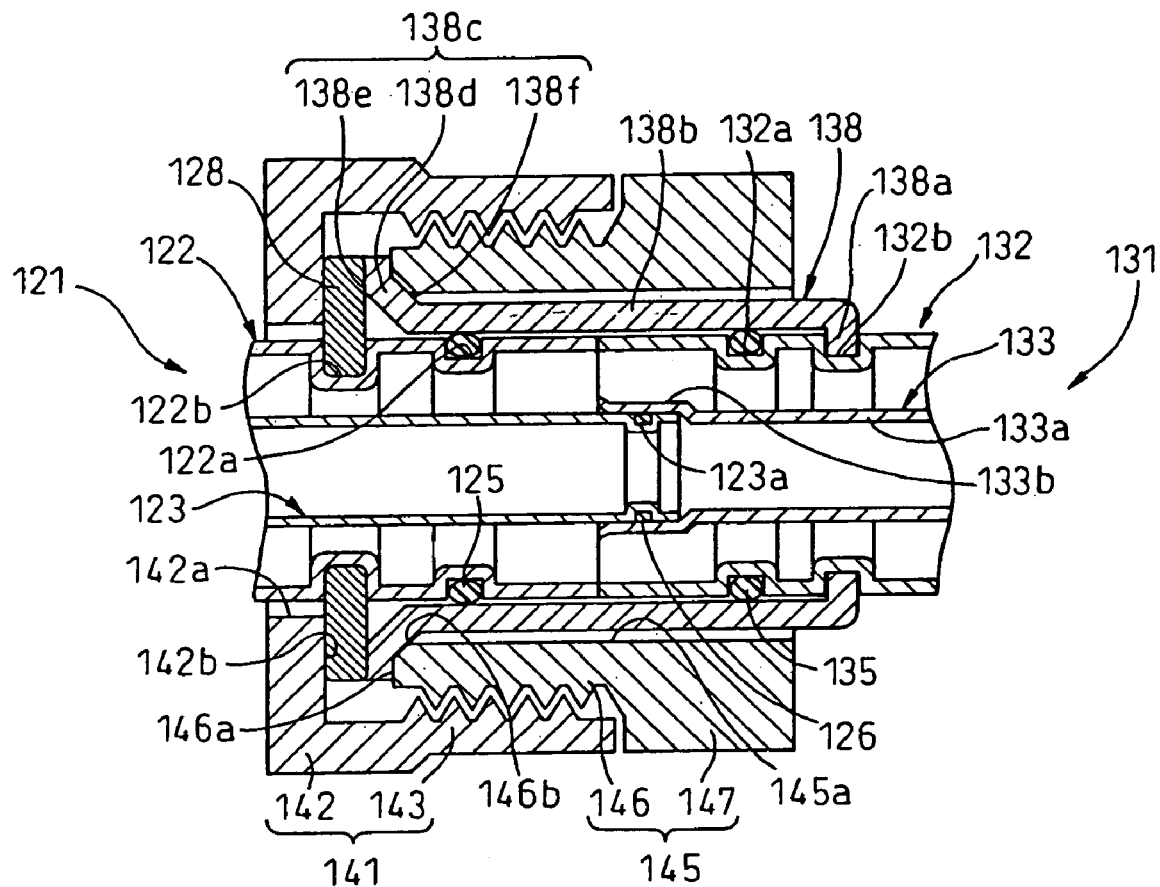
FIG. 31 is a partially sectional view showing a double pipe joint structure of the fifth embodiment.

In this embodiment, when the first double pipe and the second double pipe are fastened to each other by a screw member, both double pipes are connected to each other under pressure. As shown in FIG. 31, on one end side of the outer pipe 122 of the first double pipe 121, the seal groove 122a and the engaging groove 122b are formed in this order from the end side. O-ring 125 is attached to the seal groove 122a, and the ring member 128 made of resin is attached to the engaging groove 122b. On one end side of the inner pipe 123 of the first double pipe 121, the seal groove 123a is formed close to the end portion, and O-ring 126 is attached to the seal groove 123a.

On the other hand, on one end side of the outer pipe 132 of the second double pipe 131, the seal groove 132a and the engaging groove 132b are formed in this order from the end side. O-ring 135 is attached to the seal groove 132a, and one end of the cylindrical engaging ring 138 is engaged with the engaging groove 132b. An end face of the outer pipe 122 of the first double pipe 121 and an end face of the outer pipe 132 of the second double pipe 131, which is opposed to the end face of the outer pipe 122 of the first double pipe 121, are formed so that both end faces can be contacted with each other. A forward end portion of the inner pipe 133 of the second double pipe 131 is formed into the female side joint portion 133b, the diameter of which is expanded larger than the diameter of the common cylindrical portion 133a. Therefore, an end portion of the inner pipe 123 of the first double pipe 121 can be inserted into the forward end portion of the inner pipe 123 of the second double pipe 131.

The engaging ring 138 engaging with the engaging groove 132b of the outer pipe 132 of the second double pipe 131 includes: an engaging portion 138a engaging with the engaging groove 132b; a ring portion 138b extending from the engaging portion 138a to the first double pipe 121 side; and an expanded portion 138c formed on the forward end side of the ring portion 138b. The expanded portion 138c is composed of a tapered portion 138d extending to the forward end side and a an engaging face 138e coming into contact with the side of the ring member 128. An outer face of the tapered portion 138d is formed into the tapered outer face 138f.

On the outer circumferential faces of the ring member 128 and the engaging ring 138, the union nut 141 and the union male portion 145 are arranged so that the ring member 128 and the engaging ring 138 can be interposed between them.

The union nut 141 includes a flange portion 142 having the insertion groove portion 142a, which is formed at one end, into which the outer pipe 122 of the first double pipe 121 is inserted. A body portion of the union nut 141 is formed into a cylindrical shape, and the female screw portion 143 screwing to the union male portion 145 is formed on the inner wall face of the union nut 141. An inner wall face of the flange portion 142 forms the engaging face 142b capable of engaging with the side of the ring member 128.

The union male portion 145 has an inserting groove portion 145a into which the engaging ring 138 is inserted, and the profile of the union male portion 145 is formed into a cylindrical shape. On the outer circumferential face, the male portion 146 and the rotary operating portion 147, the diameter of which is larger than that of the male screw portion 146, are provided, so that the male portion 146 can be screwed to the female screw portion 143. A forward end portion of the male screw portion 146 includes: an engaging face 146a capable of engaging with the tapered portion 138d of the engaging ring 138; and a tapered inner face 146b.

The ring member 128 is attached to the engaging groove 122b of the second double pipe, and the engaging ring 138 is attached to the engaging groove 132b of the outer pipe 132 of the second double pipe 131. Then the outer pipe 122 of the first double pipe 121 is inserted into the union nut 141. Then the union male portion 145 is inserted into the outer circumferential face of the engaging ring 138 attached to the second double pipe 131, and the end face of the outer pipe 122 of the first double pipe 121 and the end face of the outer pipe 132 of the second double pipe 131, which is opposed to the end face of the outer pipe 122 of the first double pipe 121, are made to come into contact with each other. The inner pipe 123 of the first double pipe 121 is inserted into the female side joint portion 133 formed in the inner pipe 133 of the second double pipe 131.

When the rotary operating portion 147 of the union male portion 145 is rotated clockwise in the above condition, the union male portion 145 is screwed to the union nut 141. When the union male portion 145 is fastened, the union male portion 145 is moved to the union nut 141 side, and the engaging face 146a and the tapered inner face 146b are engaged with the tapered portion 138d of the engaging ring 138, so that the tapered portion 138d can be contacted to the ring member 128 with pressure. On the other hand, the engaging face 142b of the union nut 141 is engaged with the outer wall face of the ring member 128, so that the ring member 128 can be contacted to the engaging ring 138 with pressure.

Due to the foregoing, the first double pipe 121 and the second double pipe 131 are tightly connected to each other.

Accordingly, in the double pipe joint structure of this embodiment, when the first double pipe 121 is connected to the second double pipe 131, the union male portion 145 is fastened to the union nut 141. Therefore, the first double pipe 121 and the second double pipe 131 are connected without using the means of soldering or welding. Accordingly, the working property can be enhanced and the manufacturing cost can be reduced.

As described above, the double pipe joint structure of the present invention is composed as follows. For example, as shown in the first to the third embodiment, the double pipe joint structure includes a joint means having an engaging member provided with an elastic engaging portion, and when the second double pipe is made to proceed into the first double pipe, the elastic engaging portion is elastically deformed and the pipes are connected through one-touch operation. As shown in the fourth embodiment, after the first double pipe and the second double pipe have been arranged at the joining position, the joint member is arranged so that it can cover end portions of the first and the second double pipe, and then plastic deformation is conducted to connect the first and the second double pipe. As shown in the fifth embodiment, after the first double pipe and the second double pipe have been arranged at the joining position, both pipes are fastened to each other by a screw means, so that the first and the second double pipe can be connected to each other. Therefore, it is unnecessary to use the means of soldering or welding, and the working property can be enhanced and the manufacturing cost can be reduced.

In either double pipe, the inner pipe and the outer pipe are formed differently from each other and connected by the connecting means. Therefore, when the inner pipe is inserted into the outer pipe, the inner pipe can be easily protruded from the outer pipe. Accordingly, it is unnecessary to shave a forward end portion of the outer pipe. As a result, the manufacturing cost can be greatly reduced.

Figure 32:
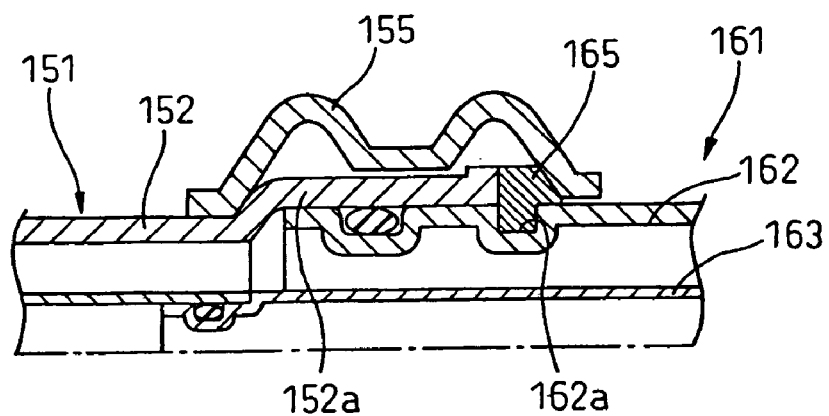
FIG. 32 is a partially sectional view showing a double pipe joint structure of another embodiment.
Figure 33:
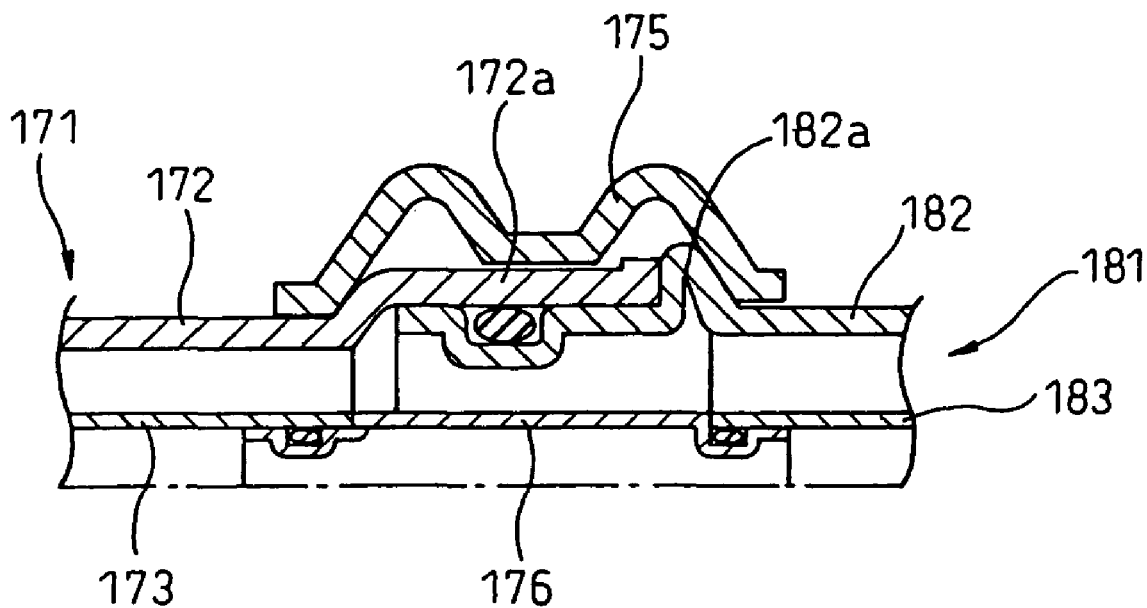
FIG. 33 is a partially sectional view showing a double pipe joint structure of still another embodiment.

In this connection, it should be noted that the double pipe structure of the present invention is not limited to the above specific embodiments. For example, as shown in FIG. 32 or 33, after an end portion of the second double pipe 161 has been inserted into an end portion of the first double pipe 151, both double pipes may be fastened to each other by the fastening member 155 composed of two divided part, the cross section of which is substantially a W-shape, which can be jointed by a hinge means and can be opened and closed. In this way, the first double pipe and the second double pipe may be connected to each other.

In this case, as shown in FIG. 32, one end of the fastening member 155 is engaged with a step face of the female side joint portion 152a, which is formed into an expanded shape, provided at an end portion of the outer pipe 152 of the first double pipe 151, and the other end of the fastening member 155 is engaged with the ring member 165 made of resin, which is integrally formed by outserting in the engaging groove 162a formed on the outer pipe 162 of the second double pipe 161. In this connection, it is preferable that the engaging faces of both end portions of the fastening member 145 are tapered.

As shown in FIG. 33, in the outer pipe 182 of the second double pipe 181, instead of the ring member 165 shown in FIG. 32, the expanded portion 182a may be formed by bead machining and fastened by the fastening member 175, the cross section of which is substantially a W-shape, which is composed of two divided parts jointed by a hinge. In this connection, between the inner pipe 173 of the first double pipe 171 and the inner pipe 183 of the second double pipe 181, the inner pipe 173 of the first double pipe 171 and the inner pipe 183 of the second double pipe 181 cannot protrude from the respective outer pipes 172, 182 so as to form the female side joint portion 172a, which is formed being expanded in the outer pipe 172 of the first double pipe 171, and to form the expanded portion 182a by conducting bead machining on the outer pipe 182 of the second double pipe 181. Therefore, the bypass inner pipe 176 is inserted so that the respective inner pipes 173, 183 can be connected to each other through the bypass inner pipe 176.

Figure 34:
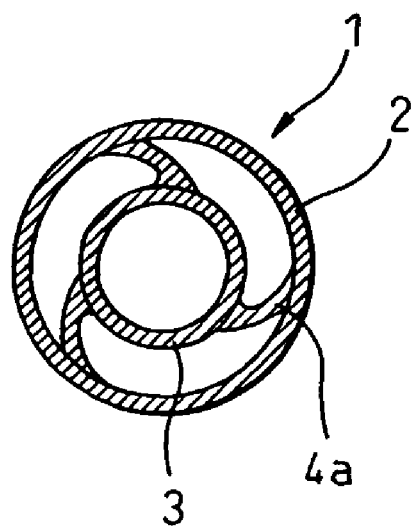
FIG. 34 is a sectional view showing a double pipe integrally formed.

In this connection, in each double pipe in the double pipe joint structure of the above embodiment, the outer pipe and the inner pipe are formed differently from each other of course, the outer pipe and the inner pipe may be formed being integrated with each other into one body. In this case, as shown in FIG. 34, the outer pipe 2 and the inner pipe 3 are connected by the curved fins 4a provided between the outer pipe 2 and the inner pipe 3. Alternatively, the outer pipe 2 and the inner pipe 3 may be connected by bent supports not shown, the shape of which is curved.

Figure 35:
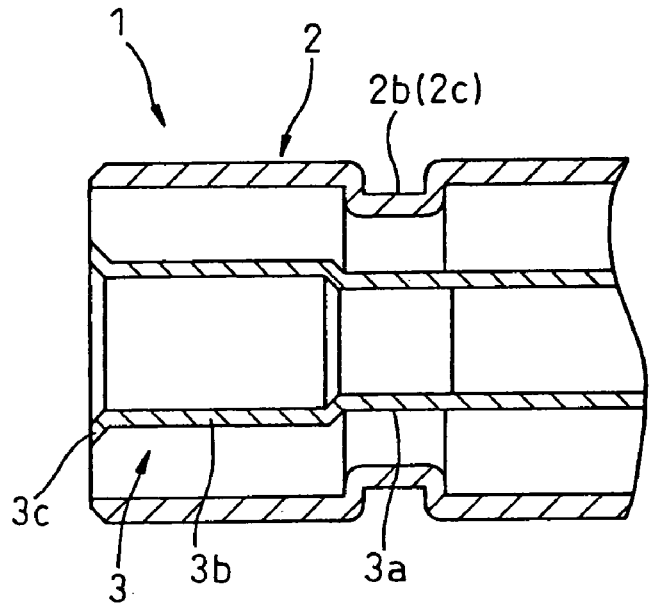
FIG. 35 is a partially sectional view showing a state of machining an end portion of the double pipe.
Figure 36:
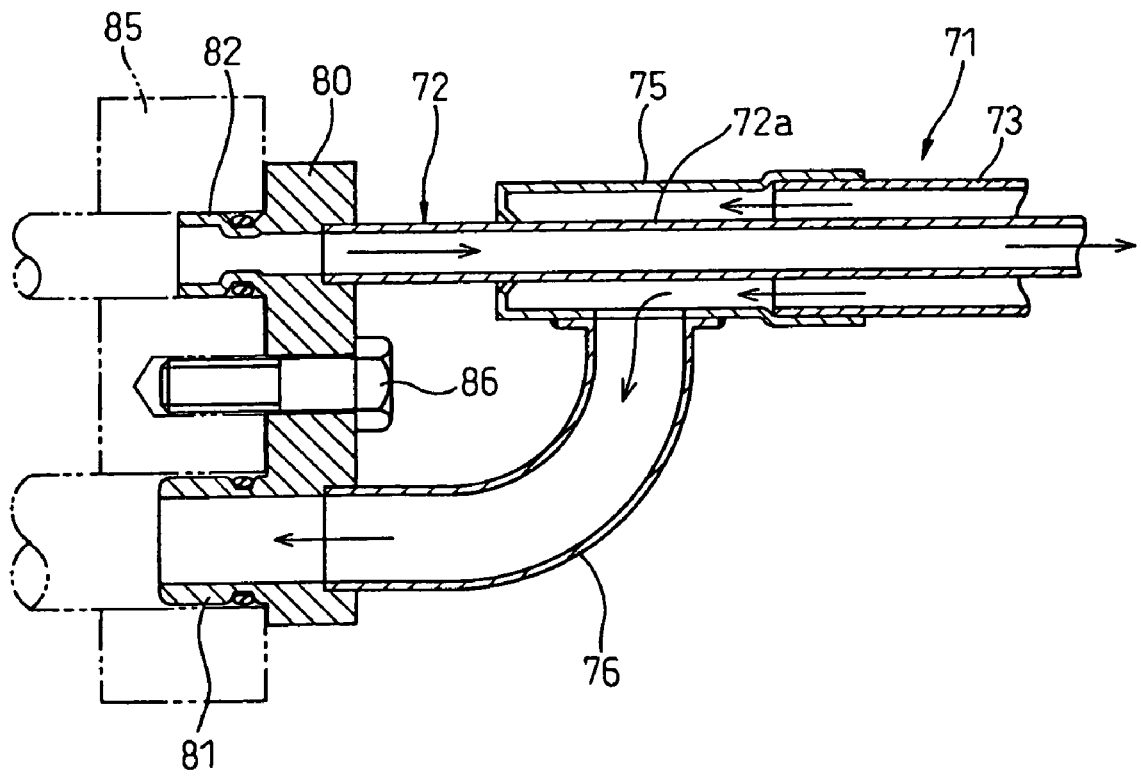
FIG. 36 is a partially sectional view showing a conventional double pipe joint structure.

Further, as shown in FIG. 35, in the end portion of the double pipe 1, in which the outer pipe 2 and the inner pipe 3 are integrally formed, the seal groove 2b or the engaging groove 2c of the outer pipe 2 is formed by means of drawing for contracting the end portion, and the end portion of the inner pipe 3 is formed by means of drawing for extending the end portion, so that the expanded female side joint portion 3b, the diameter of which is larger than that of the common cylindrical portion 3a, and the tapered portion 3c are formed. In either case, the outer pipe 2 and the inner pipe 3 are formed by means of plastic deformation. Therefore, the manufacturing cost can be reduced.

Further, the double pipe joint structure of the present invention can be applied to not only an air conditioner mounted on a vehicle but also an air conditioner installed in a building.

Embodiment 6 of Double Pipe Joint Structure

In the case where the double pipes are connected to each other or the double pipes are connected to a two-way branch joint and the bypass inner pipe is interposed between the pipes, the inner pipes of the double pipes are subjected to machining for expanding the diameter of the end portion. Therefore, explanations will be made into each embodiment in which the diameter of the end portion of the inner pipe can be easily expanded.

In the sixth embodiment, in order to insert the bypass inner pipe into the inner pipe of the double pipe, one end portion of the inner pipe is subjected to the machining of expanding. The end portion of the inner pipe is formed into a shape by which the end portion can be easily expanded in this case.

Figure 37:
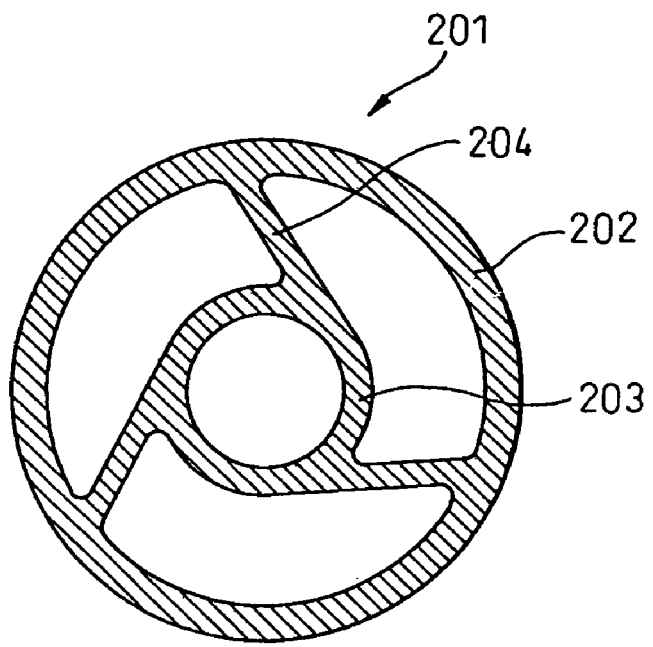
FIG. 37 is a sectional view showing a double pipe of the sixth embodiment.

For example, in the case where the inner pipe and the outer pipe are formed being integrated into one body, as shown in FIG. 34, the inner pipe 3 and the outer pipe 2 are connected by the support 4, which will be referred to as a fin portion hereinafter, and the inner pipe 3 and the outer pipe 2 are formed by means of extrusion. In this case, when the forward end portion of the double pipe is expanded, if the mechanical strength of the support is too strong, it is difficult to expand the forward end portion of the pipe. Therefore, as shown in FIG. 37, in the double pipe 201, the fin portion 204, which is formed integrally with the outer pipe 202 and the inner pipe 203, is formed in such a manner that the fin is directed from the position on the inner circumferential face of the outer pipe, at which the inner circumferential face of the outer pipe is equally divided into three, to the tangential direction of the inner pipe. According to the above structure, in the case of expanding the forward end portion of the inner pipe, a reaction force with respect to the expanding force to expand the inner pipe can become lower than the case in which the fin portion 204 is formed in such a manner that the fin portion 204 is directed to the axial center of the inner pipe 203, due to the occurrence of a componet force of the reaction force. Therefore, the forward end portion of the pipe can be more easily expanded.

Figure 38:
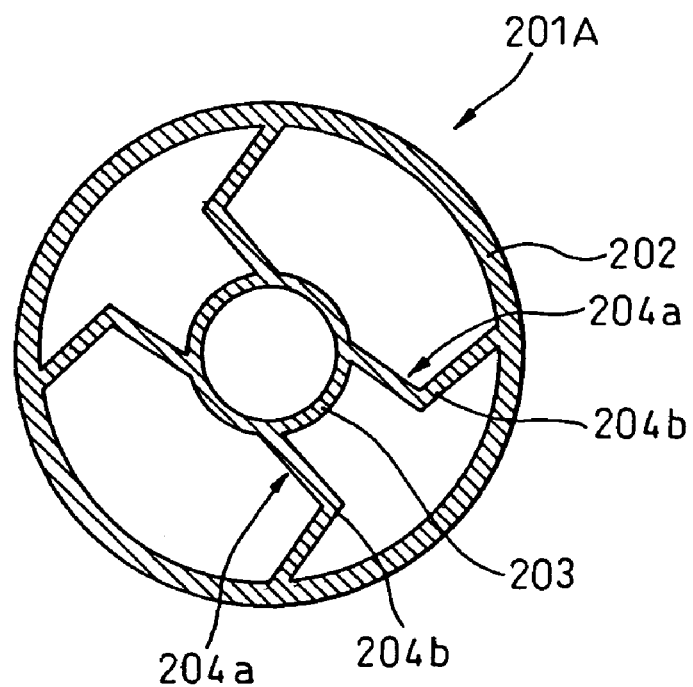
FIG. 38 is a sectional view showing a double pipe of another embodiment.

In the double pipe 201A shown in FIG. 38, the fin portion 204a is contacted with the inner pipe 203 in the tangential direction, and the bent portion 204b is provided in the fin portion 204a between the inner pipe 203 and the outer pipe 202. Due to this structure, it is possible for the bent portion 204b to absorb a reaction force in the case of expanding the forward end portion of the pipe.

Figure 39A:
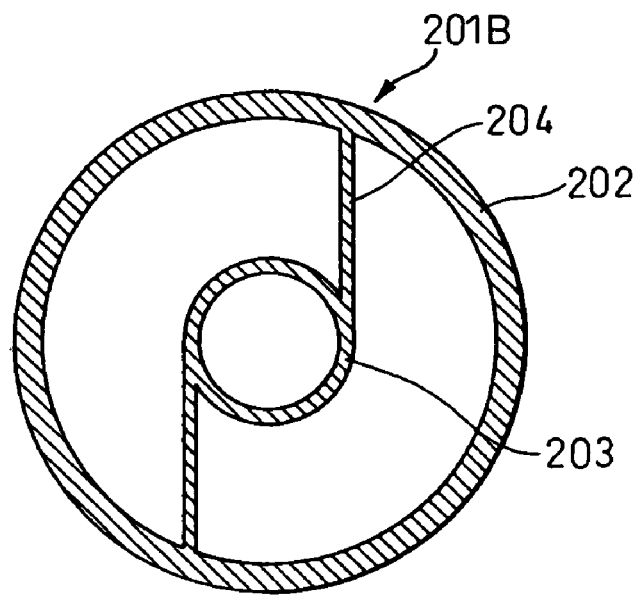
FIG. 39A is a sectional view showing a double pipe of still another embodiment.
Figure 39B:
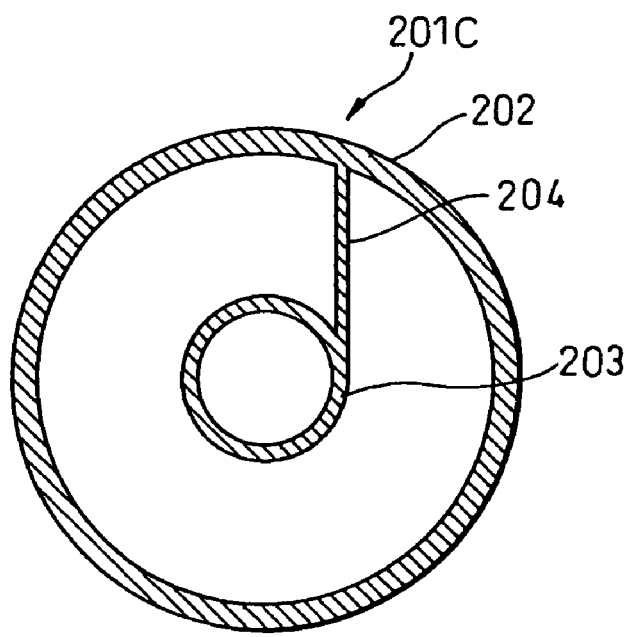
FIG. 39B is a sectional view showing a double pipe of still another embodiment.

Further, in the double pipe 201B shown in FIG. 39A, two fin portions are symmetrically formed so that one end of the fin portion 204 extending from the outer pipe 202 can be directed in the tangential direction of the inner pipe 203. In the double pipe 202C shown in FIG. 39B, one fin portion is formed so that one end of the fin portion 204 extending from the outer pipe 202 can be directed in the tangential direction of the inner pipe 203.

Figure 40A:
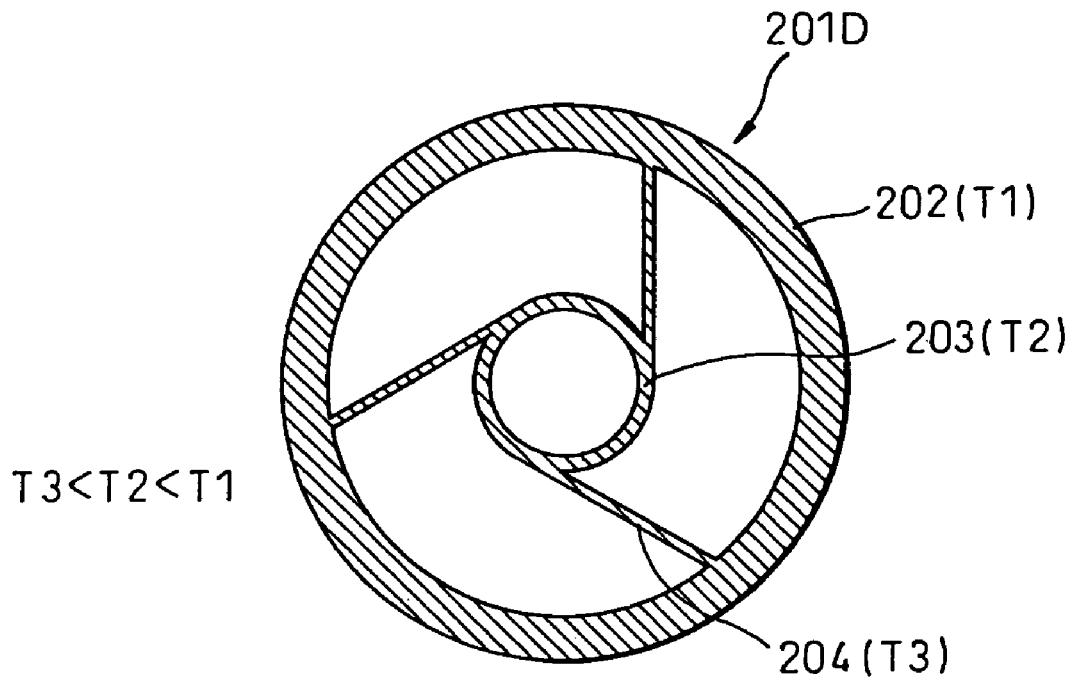
FIGS. 40A and 40b are sectional views showing a double pipe in which a difference in the wall thickness of each portion is illustrated.
Figure 40B:
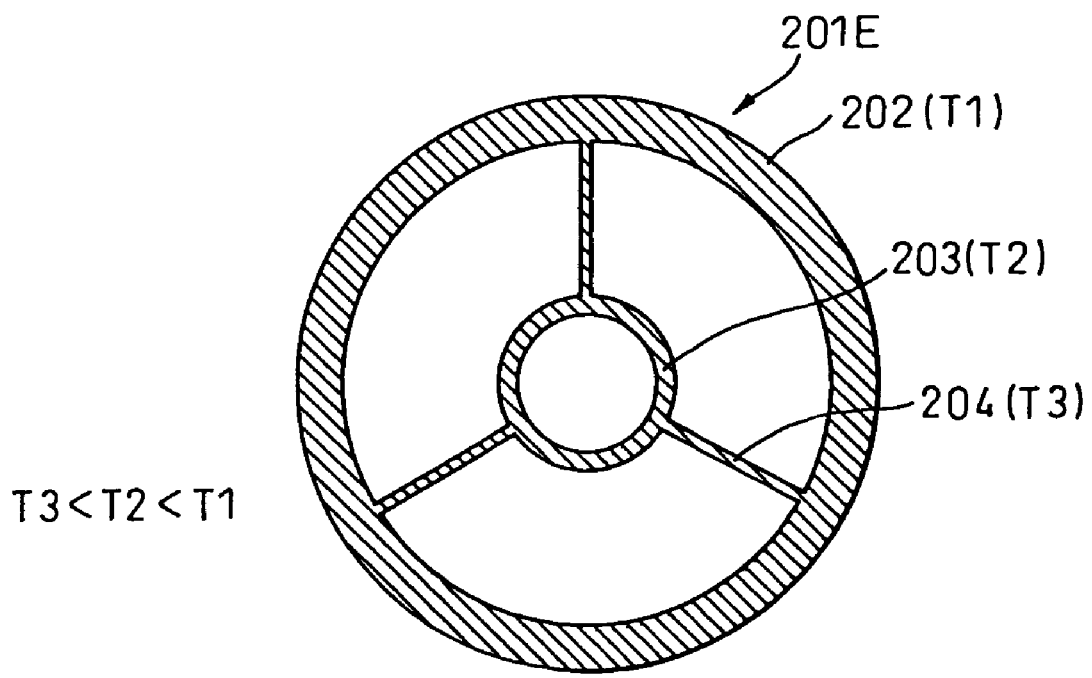

In the structure shown in FIGS. 40a, 40B, thickness of the fin portion is restricted. In the double pipe 201D shown in FIG. 40A, each fin portion 204 is extended from the position, at which the inner circumferential face of the outer pipe 202 is equally divided into three, in the tangential direction of the inner pipe 203, and wall thickness T3 of the fin portion 204 is smaller than wall thickness T2 of the inner pipe 203, and wall thickness T2 of the inner pipe 203 is smaller than wall thickness T1 of the outer pipe 202. In the double pipe 201E shown in FIG. 40B, each fin portion 204 is formed being directed from the position, at which the inner circumferential face of the outer pipe 202 is divided into three, toward the axial center, and wall thickness T3 of the fin portion 204 is smaller than wall thickness T2 of the inner pipe 203, and wall thickness T2 of the inner pipe 203 is smaller than wall thickness T1 of the outer pipe 202.

As described above, when the profile of the fin portion 204 is changed, a force from the inner pipe 203 to the fin portion 204, in the process of expansion, is reduced. Alternatively, consideration is given to wall thickness T so that a force from the inner pipe 203 can be reduced. Due to the foregoing, expansion of the forward end portion of the inner pipe 203 of the double pipe 201 can be easily conducted.

Embodiment 7 of Double Pipe Joint Structure

Figure 41:
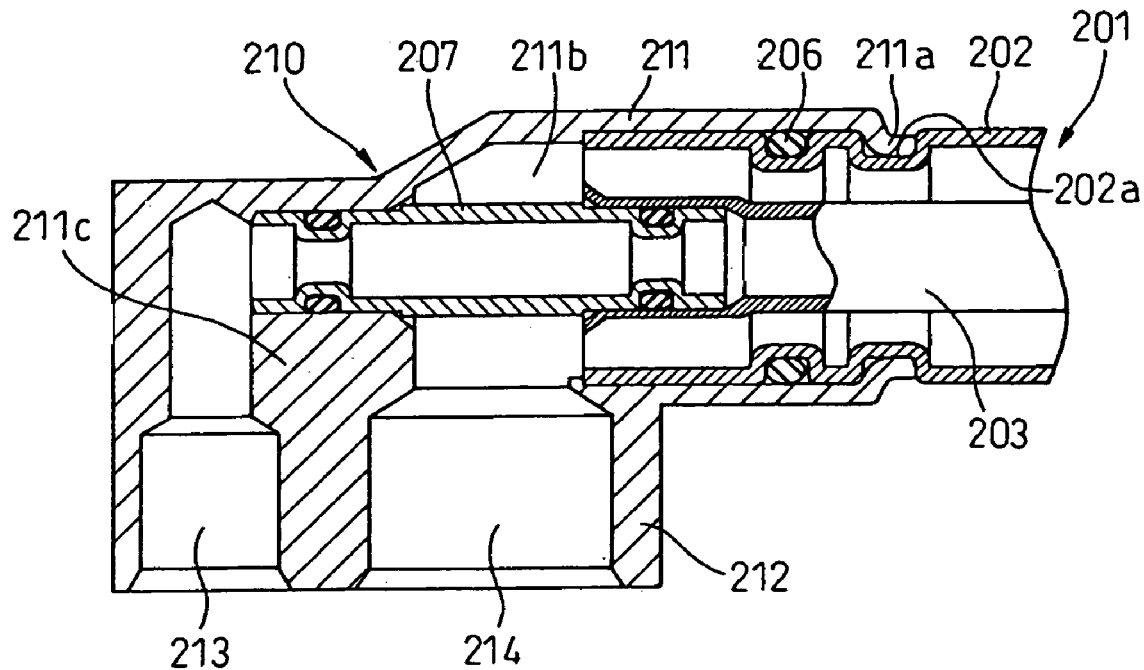
FIG. 41 is a sectional view showing a structure of connecting a double pipe with a two-way branch joint.

In the seventh embodiment, two-way branch joint is attached to one end of the double pipe, and the double pipe is connected to a pair of pipe members (a pipe for high pressure and a pipe for low pressure) which are laid differently from each other. In this embodiment, as shown in FIG. 41, the bypass inner pipe 207 is laid in the double pipe 201. This bypass inner pipe 207 is attached to the forward end portion of the inner pipe 203 and extended from the inner pipe 203. In this structure, end faces of the outer pipe 202 and the inner pipe 203 are formed on the substantially same face, and the bypass inner pipe 207 is extended from the inner pipe 203 on the same axis.

On the other hand, the two-way branch joint 210 is attached to the outer pipe 202 so that the two-way branch joint 210 can cover the forward end portion of the outer pipe 202. The two-way branch joint 210 includes: a main body 211 extending like a pipe along the axis of the double pipe 201; and a branch protruding portion 212 having a small hole 213 and a large hole 214 which are arranged in parallel with each other in the direction perpendicular to the axis of the main body 211.

On the inner circumferential face at one end of the main body 211, the outer pipe 202 of the double pipe 201 is internally engaged via O-ring 206. The forward end portion of the main body 201, that is, the insertion hole 211a into which the double pipe 201 is inserted is located in the recessed groove 202a which are formed in the circumferential direction of the outer pipe 202. The main body central portion 211b is formed into a hollow portion and connected to the forward end portion of the outer pipe 202 and also connected to the large diameter portion 214 perpendicular to the axis of the main body portion 211.

The other end of the main body 211 is formed into the thick portion 211c adjoining the main body central portion 211b. In the thick portion 211c, the small diameter hole 213 is formed which is extended from an end face of the branch protruding portion 212 formed being perpendicular to the axis of the main body 211. When the other end portion of the bypass inner pipe 207, one end portion of which is engaged with the inner pipe 202, is engaged in the thick portion 211c, the small diameter hole 213 and the inner pipe 202 are communicated with each other.

Due to the above structure, the inner pipe 203 and the outer pipe 303 of the double pipe 201 can be respectively communicated with the small diameter hole 213 and the large diameter hole 214 of the two-way branch joint. When the pipe for high pressure is connected to the small diameter hole 213 and the pipe for low pressure is connected to the large diameter 214, the branch pipe and the double pipe can be connected with each other by one action.

For example, this two-way branch joint 210 is arranged in a joint portion of a double pipe which is laid from one portion of the pipe in the refrigerating cycle arranged in the engine compartment to the evaporator for the rear seat. Due to the above structure, when piping is laid a long distance, from the engine compartment to the rear portion of the vehicle body, it is possible to use the double pipe 201, so that piping can be economized. Therefore, the piping material can be economized and the piping space can be reduced.

Figure 42:
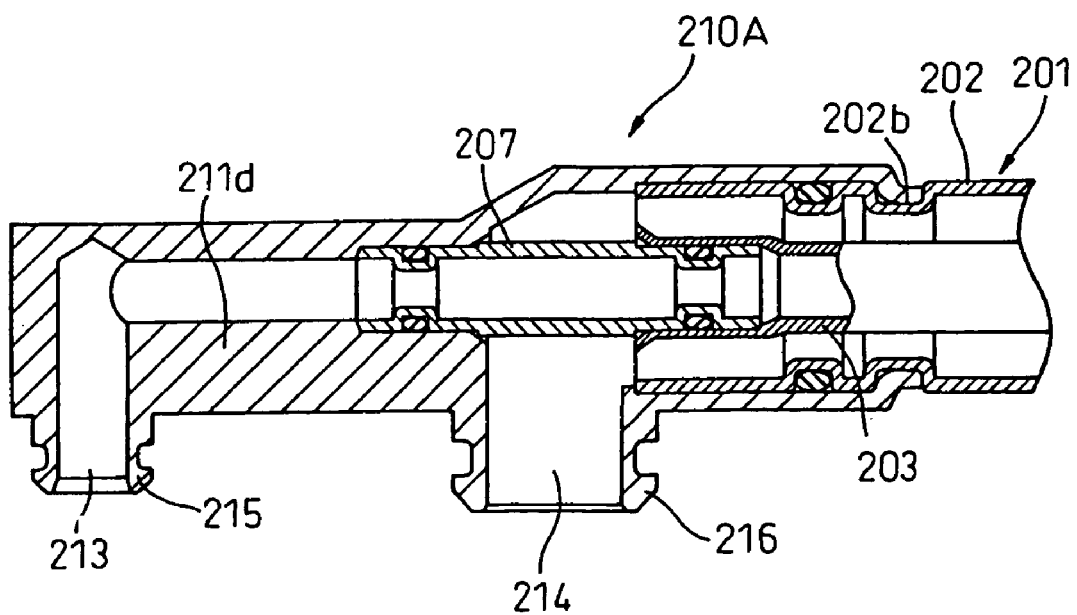
FIG. 42 is a sectional view showing a structure of connecting a double pipe with a two-way branch joint of another embodiment.

In the structure shown in FIG. 42, in the two-way branch joint 210A, the small diameter hole 213 and the large diameter hole 214 shown in FIG. 41 are respectively formed in the male side joint portions 215, 216. A distance between the small diameter hole 213 and the large diameter hole 214 is longer than the distance in the case of the two-way branch joint 210 shown in FIG. 41. In this embodiment, the bypass inner pipe 207 is also arranged in the forward end portion of the inner pipe 203 and engaged in the thick portion 211d of the two-way branch joint 210A. The forward end portion of the two-way branch joint 210A on the double pipe 201 side is contracted to the recessed groove 202b, which is formed in the outer pipe 202, by drawing for reducing the end portion, so that the forward end portion of the double pipe 201 can be joined to the outer pipe 202.

Accordingly, in the double pipe joint structure in which the double pipe is connected to the two-way branch joint shown in FIG. 41 or 42, in the same manner as that of the embodiments shown in FIGS. 28 and 30, when the two-way branch joint is plastically deformed, the double pipe and the two-way branch joint can be easily joined to each other without using the means of soldering or welding.

Embodiment 8 of Double Pipe Joint Structure

Figure 43:
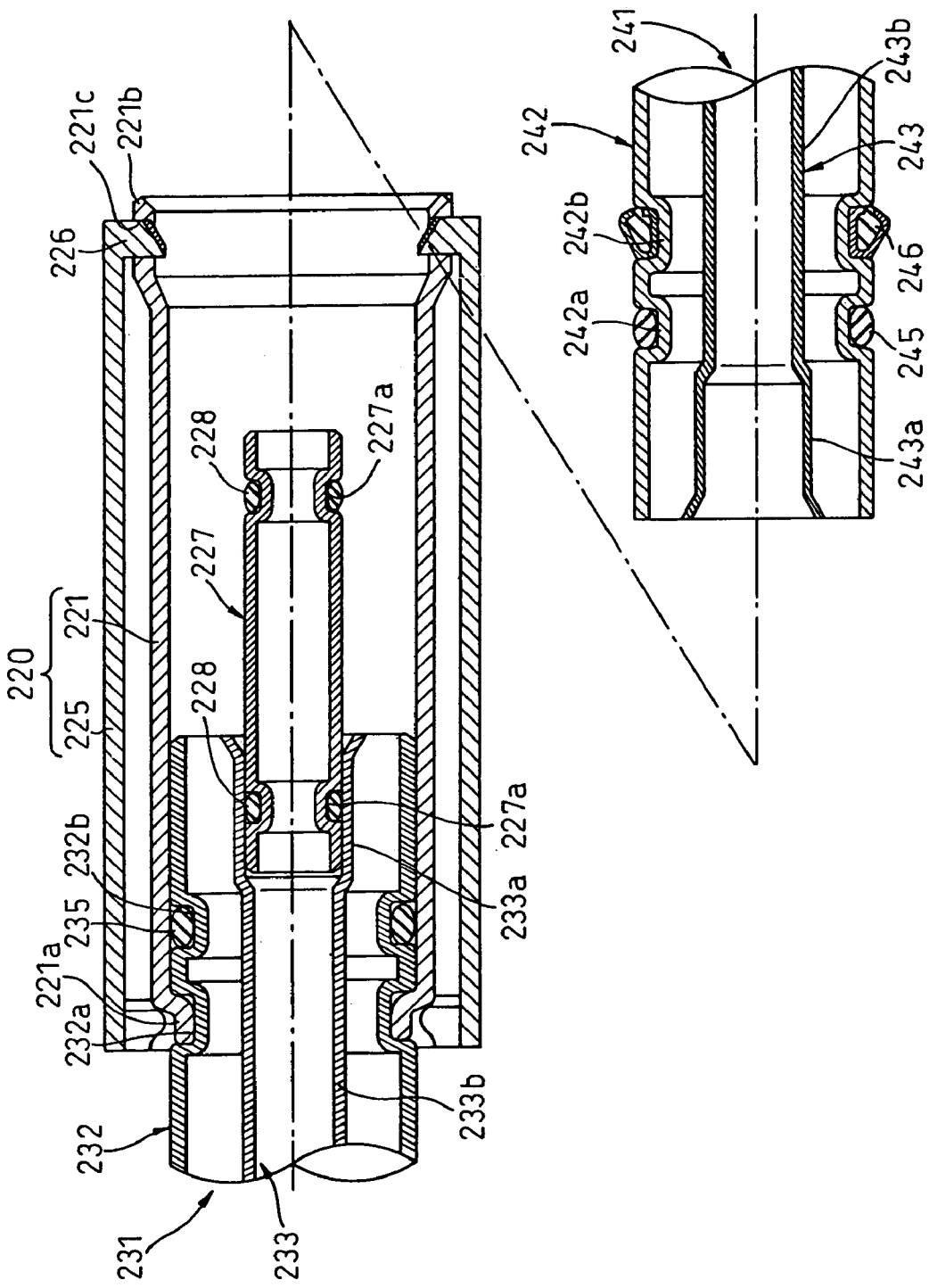
FIG. 43 is a sectional view showing an embodiment of a connection in which two double pipes are connected with each other while a bypass inner pipe are being interposed between them.

In the eighth embodiment, the inner pipes of two double pipes are connected to each other by the bypass inner pipes, and outer pipes are connected by the quick joint. As shown in FIG. 43, the quick joint 220 includes: a joint member 221, the structure of which is the same as that of the joint member 21 shown in FIGS. 20 and 21; and an engaging member 225, the structure of which is the same as that of the engaging member 25 shown in FIGS. 20 and 21. As the inner pipe 233 of the first double pipe 231 and the inner pipe 243 of the second double pipe 241 are connected with each other by the bypass inner pipe 227, these joint member 221 and engaging member 225 are longer than those shown in FIGS. 20 and 21.

In the neighborhood of the forward end portion of the outer pipe 232 of the double pipe 231, which is one of the two double pipes 231 and 241, the two recessed grooves 232a, 232b are formed on the entire circumference in the circumferential direction. One recessed groove 232b, which is located in the forward end side of joining, is a seal groove and O-ring 235 is attached to this recessed groove 232b. One end of the cylindrical joint member 221 is attached to the other recessed groove 232a when the diameter of the end portion is contracted by drawing.

Concerning the inner pipe 233 of the first double pipe 231 and the inner pipe 243 of the second double pipe 241, the diameters of the respective end portions 233a, 243a are expanded to be larger than the diameters of the common cylindrical portions 233b, 243b by means of expansion for opening the end portion. Both end portions of the bypass inner pipe 227 are internally engaged with the end portions 233a, 243a, the diameters of which are expanded, so that the inner pipe 233 of the first double pipe 231 is connected with the inner pipe 243 of the second double pipe 241.

The bypass inner pipe 227 is formed into a cylindrical shape. The recessed grooves 227a are formed on the entire circumference of portions, which are respectively inserted into the inner pipes 233, 243. When O-rings 228, 228 are respectively attached to the recessed grooves 227a, the property of airtightness with the inner pipes 233, 243 can be enhanced.

The outer pipe 232 of the first double pipe 231 is internally engaged with one end portion of the joint member 221 which is formed into a cylindrical shape, and then the joining portion 221a to be joined to the outer pipe 232 is formed by means of drawing for reducing the end portion of the pipe which is conducted toward the recessed groove 232a formed in the outer pipe 232. In the other end portion, the end edge portion 221b, the diameter of which is larger than the outer diameter of the common portion, is provided, and a plurality of elliptical insertion groove portion 221c are formed in the end edge portion 221b.

The engaging member 225 is formed into a cylindrical shape. The engaging member 225 includes: a first horizontal window portion not shown extending from one end face at regular intervals in the axial direction; and a second horizontal window portion not shown extending from the other end face, wherein the first horizontal window portion and the second horizontal window portion are alternately arranged in the circumferential direction. In one of the thick portions in which the first horizontal window portion or the second horizontal window portion is not formed, the elastic engaging portion 226 is arranged protruding inward.

On the other hand, on the outer pipe 242 of the second double pipe 241, two recessed grooves 242a, 242b are formed on all the circumference in the portion inserted into the joint member 221. O-ring 245 is attached to the recessed groove 242a on the forward end side, and C-ring 246 capable of engaging with the elastic engaging portion 226 of the engaging member 225 is attached to the other recessed groove 242b. An outer circumferential face of C-ring 246 is formed into a tapered face extending from the front face side (the first double pipe 231 side) to the rear face side (the side opposite to the first double pipe 231). In this connection, an engaging face of the elastic engaging portion 226 of C-ring 246 is a rear face.

Next, referring to FIGS. 43 and 45, an action of connecting the second double pipe 241 of the double pipe joint structure with the first double pipe 231 via the quick joint 220 will be explained below.

With respect to the first double pipe 231 in which the quick joint 220 is attached to the outer pipe 232 and the bypass inner pipe 227 is attached to the inner pipe 233, a forward end portion of the second double pipe 241, which is arranged at a distant position from the first double pipe 231, is made to come close to the quick joint 220, and the forward end portion of the second double pipe 241 is inserted into the joint member 221.

When the second double pipe 241 further proceeds into the joint member 221, as shown in FIG. 25, C-ring 246 attached to the outer pipe 242 of the second double pipe 241 comes into contact with the elastic engaging portion 226 of the engaging member 225 inserted into the insertion groove portion 221c of the joint member 221, and the elastic engaging portion 226 is pushed by the outer circumferential tapered face of C-ring 246 and bent in the direction of expansion.

Figure 45:
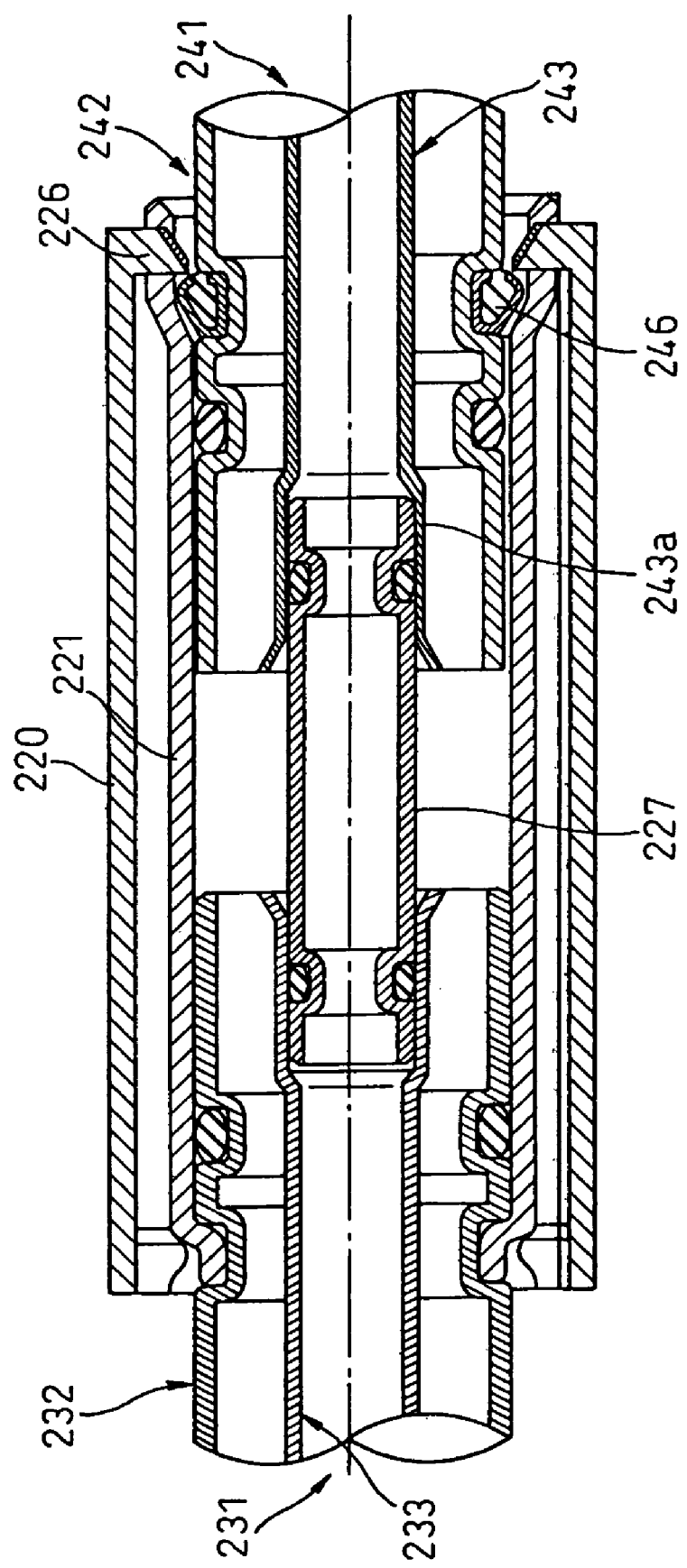
FIG. 45 is a view showing an action in FIG. 43.

When the second double pipe 241 further proceeds into the joint member 221 toward the first double pipe 231, as shown in FIG. 45, C-ring 246 exceeds the elastic engaging portion 226, and the elastic engaging portion 226 is not pushed by C-ring 246. Therefore, the diameter of the elastic engaging portion 226 is contracted by an elastic force, and the elastic engaging portion 226 is engaged with a rear face of C-ring 246. At this position, the end portion 243a of the inner pipe 242 of the second double pipe 241 is restricted by the forward end portion (the second double pipe 241 side) of the bypass inner pipe 227 so that the movement of the second double pipe 241 is stopped, and the first double pipe 231 and the second double pipe 241 are joined to each other.

As described above, when the first double pipe 231 and the second double pipe 241 are joined to each other, the two pipes are engaged via the quick joint 220. Therefore, joining can be conducted through one operation. Further, in either the double pipe 231 or the double pipe 241, both the inner pipes 233, 243 are connected with each other by the bypass inner pipe 227. Therefore, the end faces of the outer pipes 232, 242 and the end faces of the inner pipes 233, 243 can be made to be on the same face. Accordingly, it is possible to avoid a redundant work of cutting out the forward end portions of the outer pipes 232, 242. Therefore, the manufacturing cost can be reduced.

Embodiment 9 of Double Pipe Joint Structure

In the ninth embodiment, instead of the quick joint 220 used for the eighth embodiment, a nut member is arranged around the outer pipe of the first double pipe.

Figure 46:
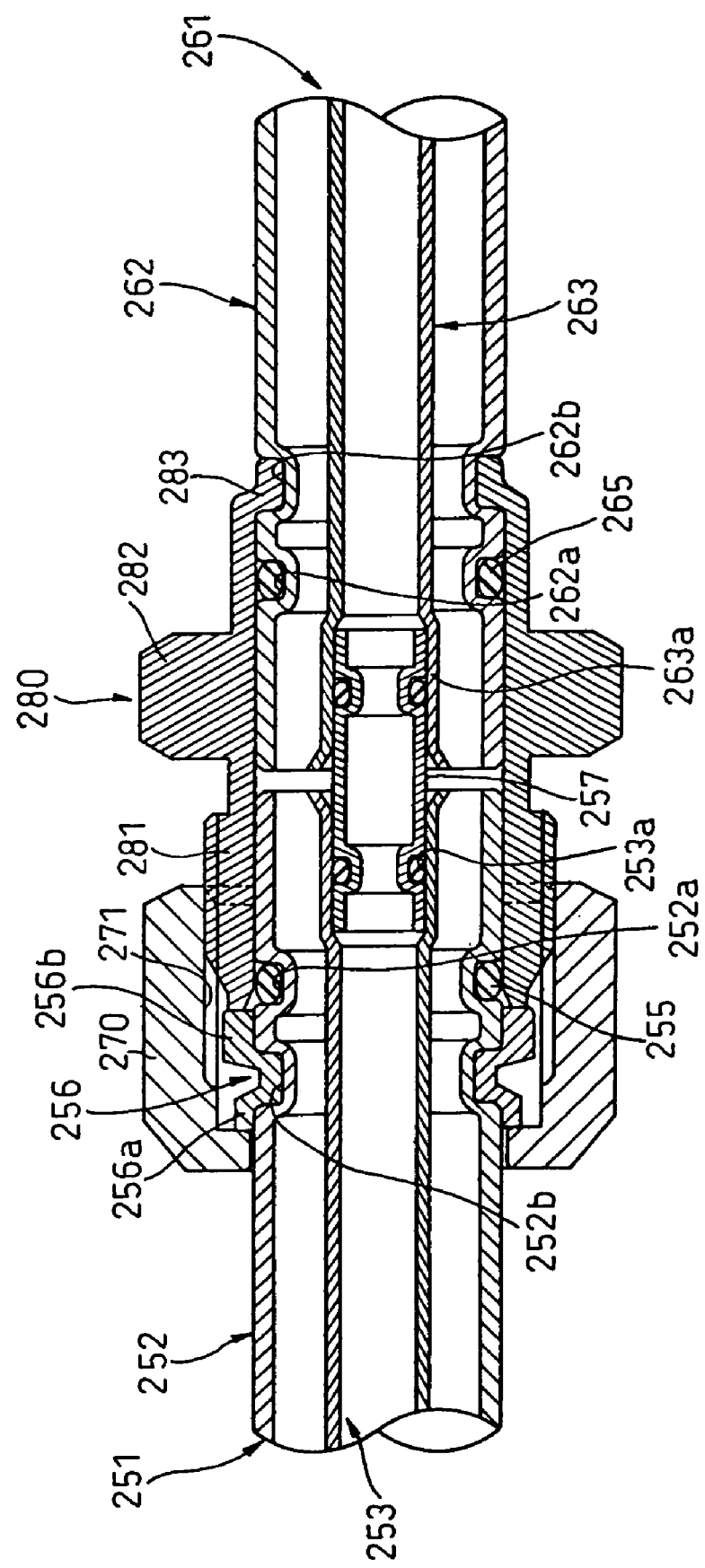
FIG. 46 is a sectional view showing an embodiment in which two double pipes are connected with each other by a screw means.

As shown in FIG. 46, on the outer pipe 252 of the first double pipe 252, the seal groove 252a and the recessed groove 252b are formed in a portion close to th joining portion to the outer pipe 262 of the second double pipe 261 in this order from the end face side. An o-ring 255 is attached to the seal groove 252a, and the cylindrical member 256 having a step portion is attached to the recessed groove 252a by means of spinning machining. The cylindrical member 256 having a step portion has a small diameter portion 256a and a large diameter portion 256b. The large diameter portion 256b is arranged close to the forward end side, and the small diameter portion 256a is arranged at the rear of the large diameter portion 256b.

The nut member 270 capable of coming into contact with the end face of the small diameter portion 256a is arranged at the rear end of the cylindrical member 256 having a step portion attached to the outer pipe 252 of the first double pipe 251. When the union member 280 attached to the second double pipe 261 is engaged with the nut member 270, the first double pipe 251 and the second double pipe 261 are connected with each other.

The union member 280 attached to the second double pipe 261 is formed into a cylindrical shape having a step portion. In the union member 280, the male screw portion 281 screwed to the female screw portion 271 of the nut member 270 is formed at the forward end portion on the first double pipe 251 side, and the forward end face is formed so that it can be contacted with the end face of the large diameter portion 256b of the cylindrical member 256 attached to the first double pipe 251. Further, the union member 280 has a hexagonal union portion 282 at the center, and the thin small diameter portion 283 is formed at the rear end of the union portion 282. After the small diameter portion 283 has been externally engaged with the outer pipe 262 of the second double pipe 261, the diameter of the small diameter portion 283 is contracted by drawing for reducing the end portion. In this way, the union member 280 can be integrally attached to the outer pipe 262 of the second double pipe 261.

In this connection, the seal groove 262a and the recessed groove 262b are formed on the outer pipe 262 of the second double pipe 261. O-ring 265 is attached to the seal groove 262a so that the property of airtightness can be enhanced. The small diameter portion 283 of the above union member 280 is joined into the recessed groove 262b by means of drawing for reducing the diameter of the end portion.

When the forward end portion of the inner pipe 253 of the first double pipe 251 and the forward end portion of the inner pipe 263 of the second double pipe 261 are expanded so as to extend the diameter by means of drawing, the bypass inner pipe 257 is inserted into the expanded portions 253a, 263a of both the inner pipes 252, 263 so as to connect the inner pipe 253 with the inner pipe 263.

Figure 47:
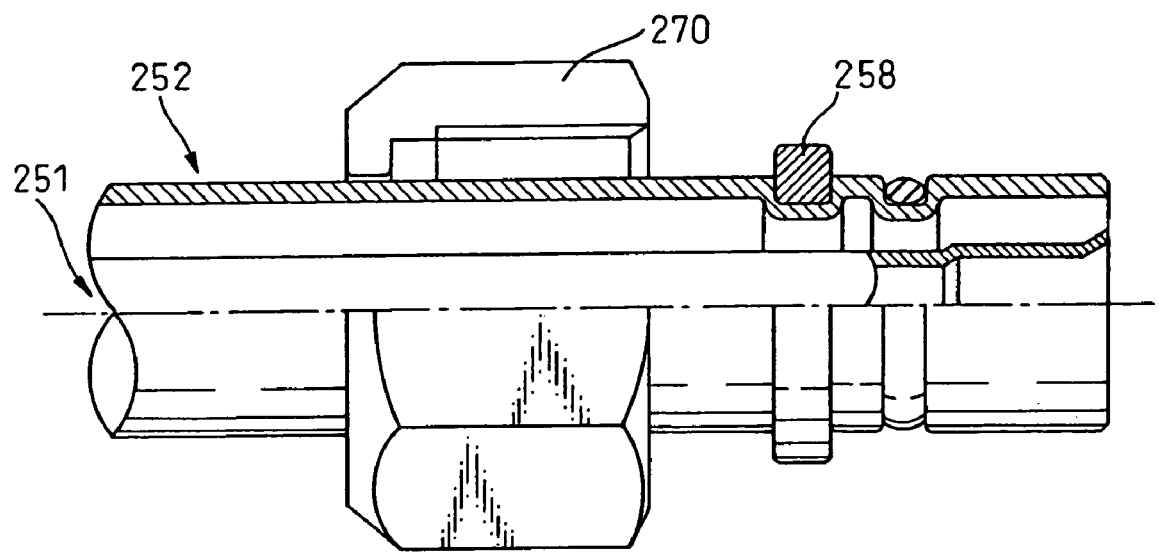
FIG. 47 is a sectional view in which a portion of FIG. 46 is shown by another embodiment.
Figure 48:
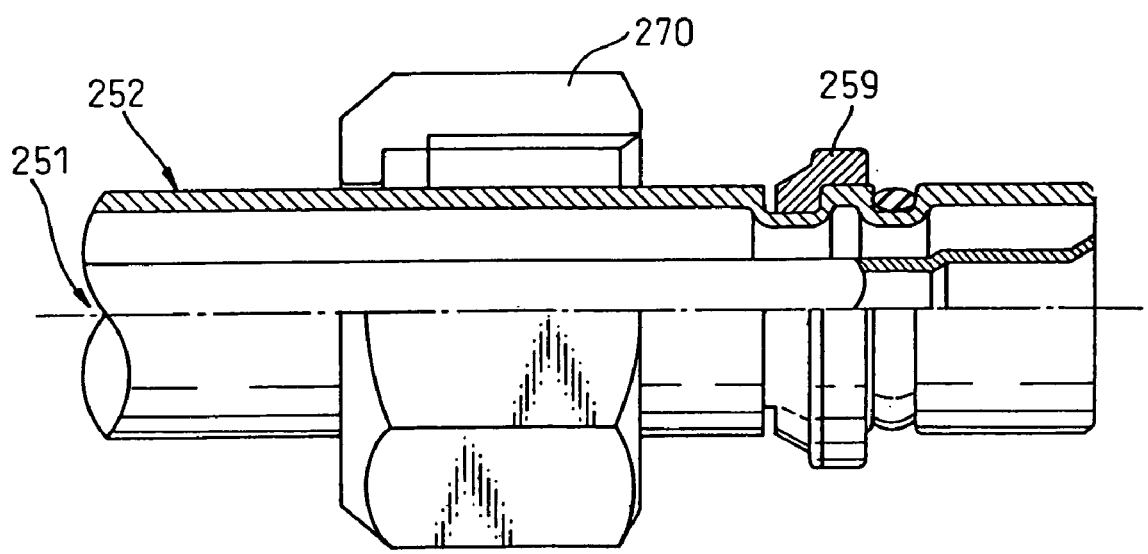
FIG. 48 is a sectional view in which a portion of FIG. 46 is shown by still another embodiment.

In FIG. 46, the cylindrical member 256 having a step portion, which is attached to the first double pipe 251 by means of spinning, may be a C-ring 258, one end portion of which is open as shown in FIG. 47. Alternatively, as shown in FIG. 48, it may be a cylindrical member 259 attached by means of drawing for reducing the diameter of the end portion.

Figure 44:
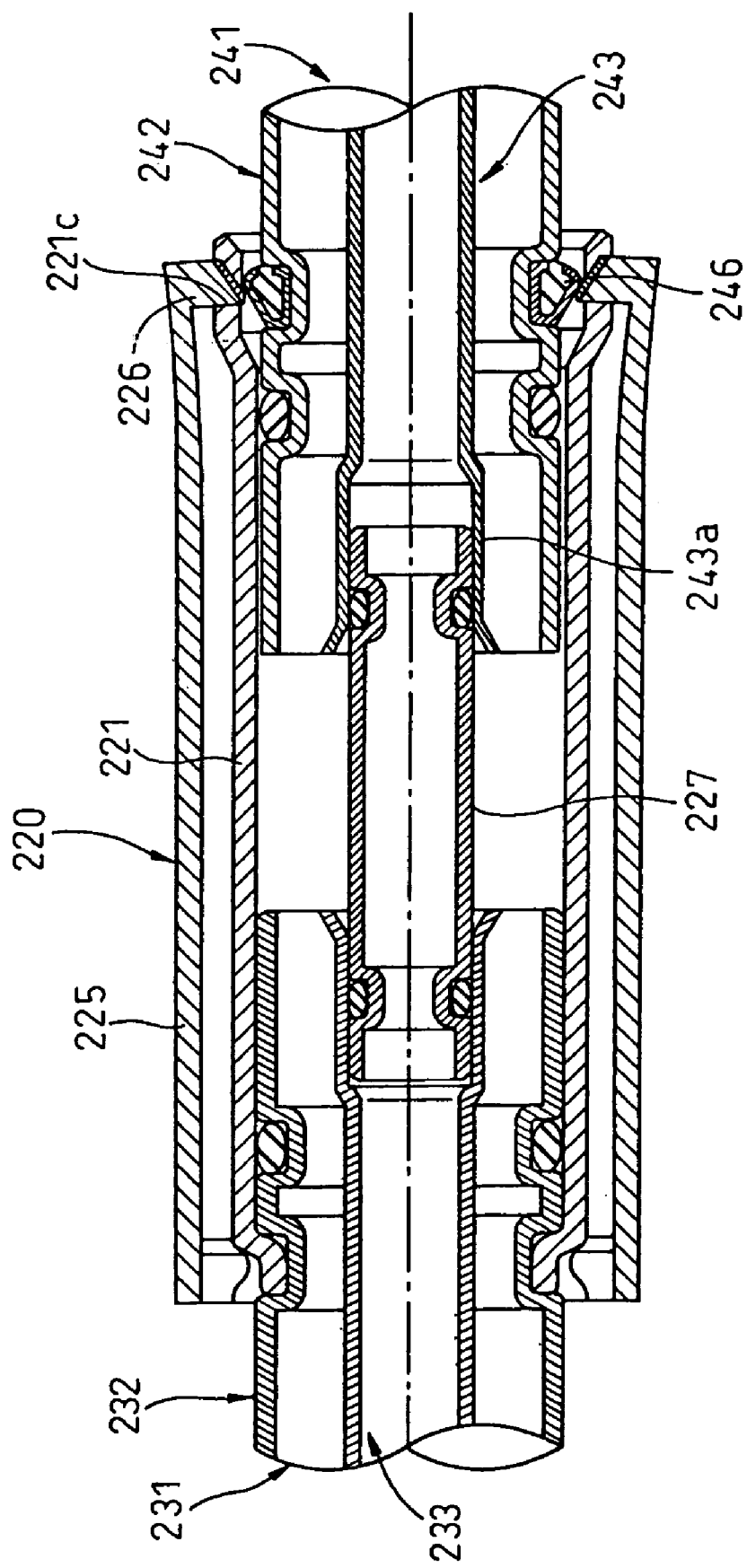
FIG. 44 is a view showing an action in FIG. 43.
Figure 49A:
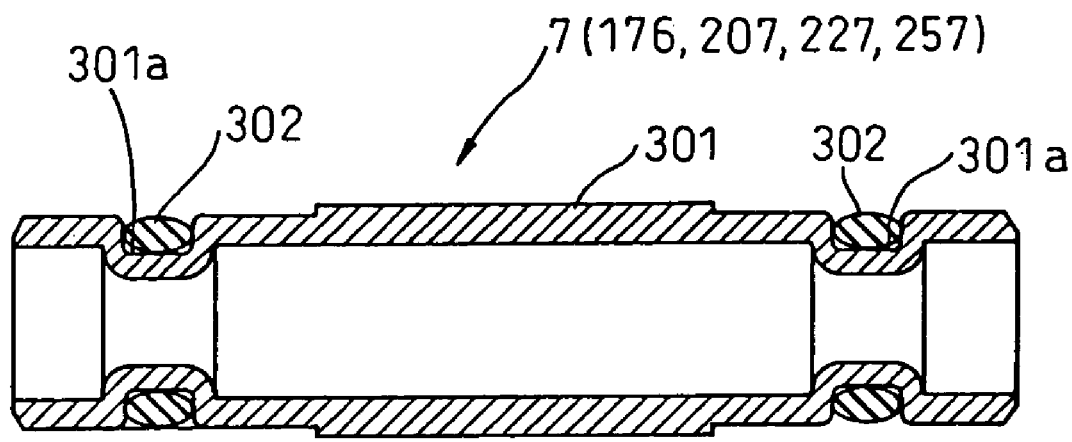
FIGS. 49A and 49B are sectional views showing a bypass inner pipe.
Figure 49B:
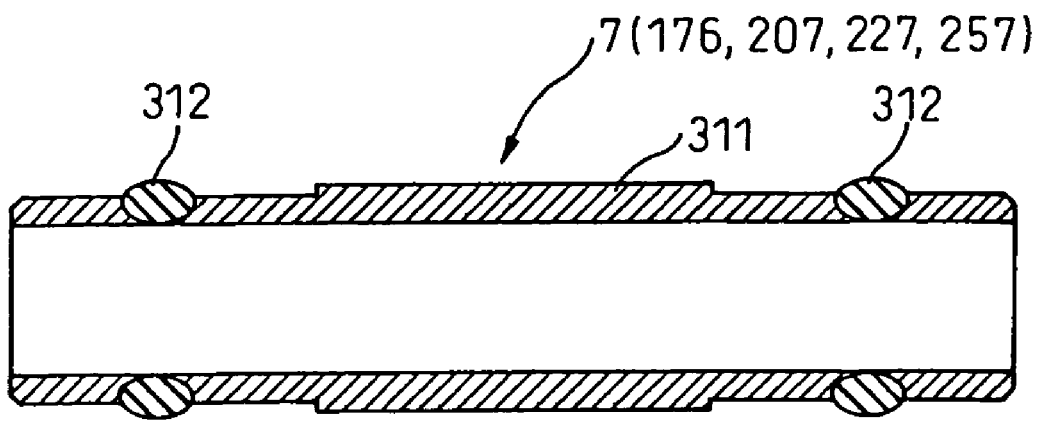

In this connection, the bypass inner pipe 7 used for Embodiment 1 (shown in FIG. 26), the bypass inner pipe 103 used for Embodiment 4 (shown in FIG. 30), the bypass inner pipe 176 (shown in FIG. 33), the bypass inner pipe 207 used for Embodiment 7 (shown in FIGS. 41 and 42), the bypass inner pipe 227 used for Embodiment 8 (shown in FIG. 43), and the bypass inner pipe 257 used for Embodiment 9 (shown in FIG. 44) may be formed as follows. As shown in FIG. 49A, the seal grooves 301a, 310a are formed in both end portions by means of drawing for reducing the diameter, and O-rings 302, 302 are attached to the respective seal grooves 301a, 301a. Alternatively, as shown in FIG. 49B, the rubber members 312, 312 are arranged at both end portions of the cylindrical member 311 made of resin and bicolor forming is conducted. Either method described above is adopted, however, it should be noted that the present invention is not limited to the above specific method.

Figure 50:
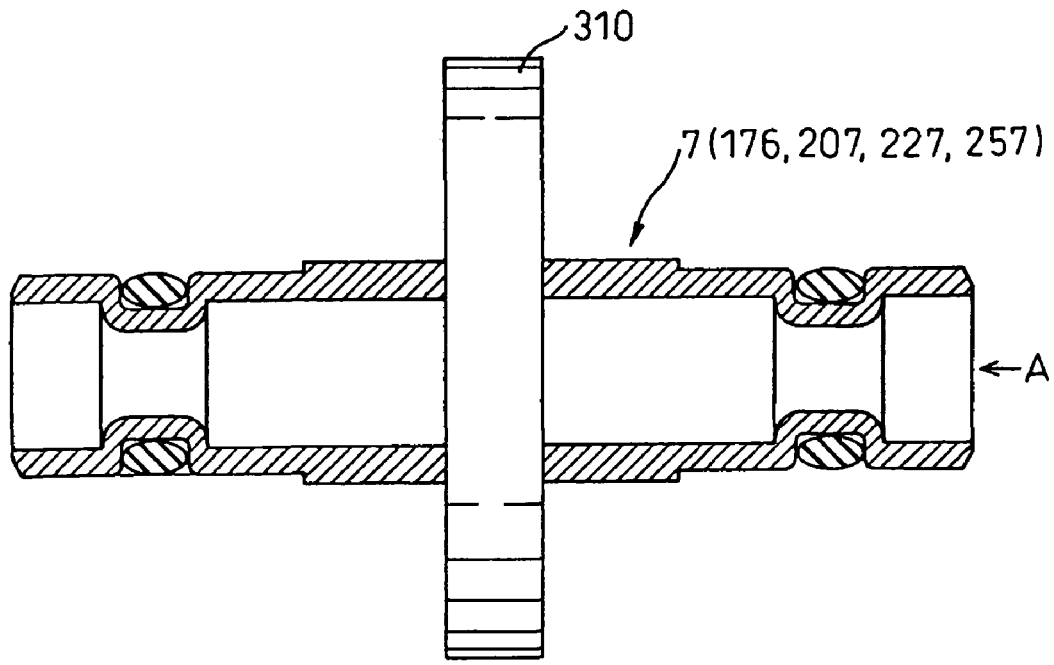
FIG. 50 is a partially sectional view showing an embodiment of holding a bypass inner pipe by a holding ring.
Figure 51:
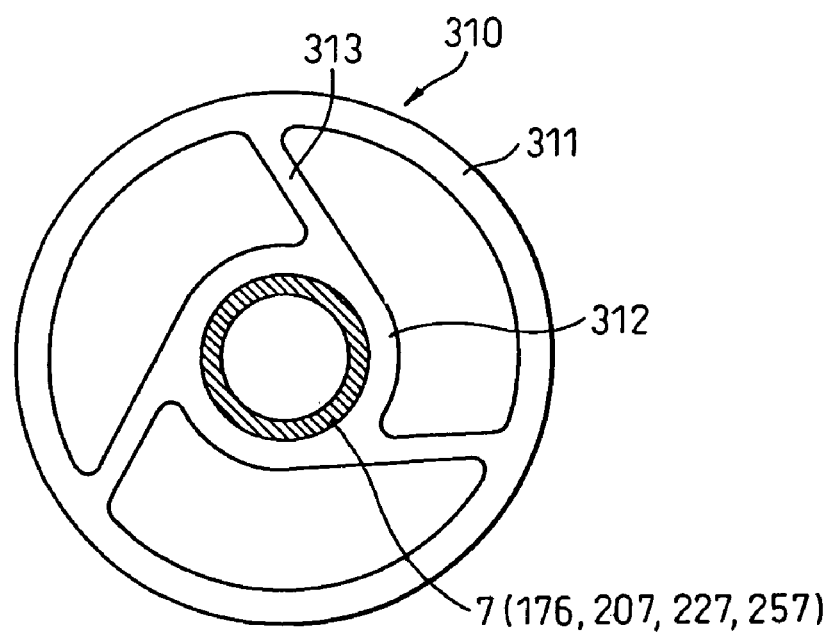
FIG. 51 is a view taken in the direction of arrow A in FIG. 50.

Further, as shown in FIGS. 50 and 51, the above bypass inner pipe 7 (103, 176, 207, 227 and 257) may be held by the holding ring 310. The holding ring 310 includes: an outer ring 311; an inner ring 312; and a fin portion 313 arranged from the outer ring 312 toward the inner ring 312 along the tangential direction of the inner ring 312 being divided into three fins. The holding ring 310 has a predetermined width H. The inner ring 312 is externally engaged with the outer circumferential face of the bypass inner pipe 7 (103, 176, 207, 227 and 257), and the outer circumferential face of the outer ring portion 311 is supported by the inner circumferential face of a predetermined member.

Figure 52:
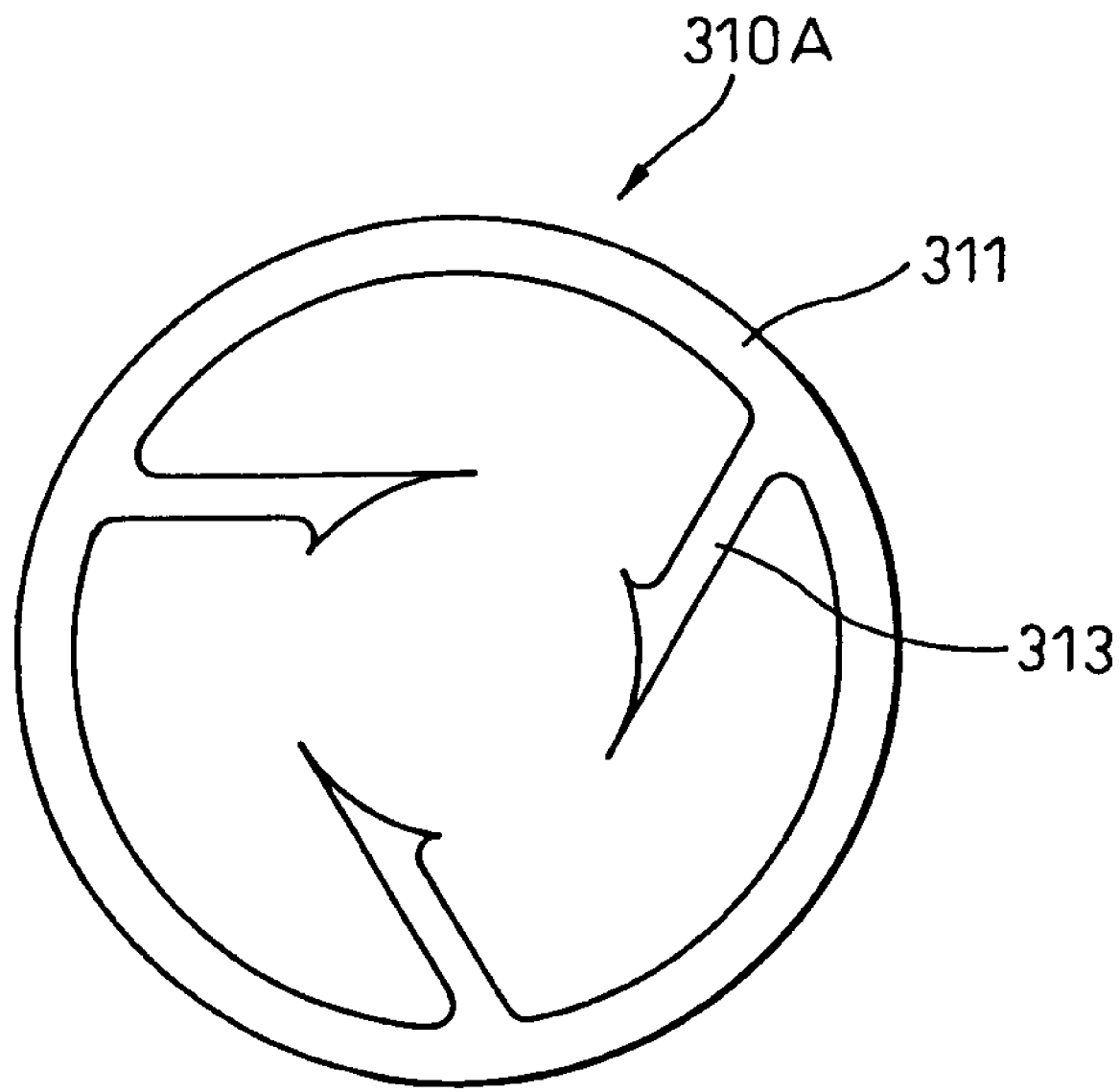
FIG. 52 is a front view showing another embodiment of a holding ring in FIG. 51.

This holding ring is not limited to the above specific structure. For example, it is possible to adopt the structure shown in FIG. 52 in which the inner ring 312 is deleted from the holding ring 310. That is, the holding ring 310A may be composed of the outer ring 311 and the three fins 313.

The invention claimed is:

1. A double pipe structure in which an inner pipe for circulating fluid of high pressure is disposed in an outer pipe for circulating fluid of low pressure and the inner pipe and the outer pipe are formed differently from each other and are joined to a joint member at respective end portions, wherein
   an end portion of the inner pipe and an end portion of the outer pipe each define a plastically deformed area directly engaging the joint member for joining the joint member to the inner and outer pipes; and
   the end portion of the inner pipe extends from the end portion of the outer pipe, extends through an insertion hole defined by the joint member and is joined to the joint member by expanding the end portion of the inner pipe at a side of the joint member to form the plastically deformed area of the inner pipe.

2. A double pipe structure according to claim 1, wherein the joint member includes a port connected to another pipe, the plastically deforming area of the inner pipe joining the inner pipe to the joint member by expanding the end portion of the inner pipe to form the plastically deformed area of the inner pipe, and the outer pipe is joined to the joint member by contracting the end portion of the outer pipe to form the plastically deformed area of the outer pipe.

3. A double pipe structure according to claim 1, wherein a seal member is interposed in a joint portion of the joint member and the inner pipe or in a joint portion of the joint member and the outer pipe.

4. A double pipe structure according to claim 1, wherein rigidity of the inner pipe is lower than rigidity of the outer pipe.

5. A double pipe structure in which an inner pipe for circulating fluid of high pressure is disposed in an outer pipe for circulating fluid of low pressure and the inner pipe and the outer pipe are formed differently from each other and are joined to the joint member at respective end portions, wherein
   the inner pipe and the outer pipe each define plastically deformed area directly engaging the joint member for joining the joint member to the inner and outer pipes,
   the joint member includes a cylindrical portion formed at an end of the joint member and connected to the outer pipe, an insertion hole, through which the inner pipe extends, is formed at an opposite end of the joint member inside the joint member, and a port for refrigerant of low pressure and a port for refrigerant of high pressure are connected to another pipe,
   the inner pipe protrudes from an end portion of the outer pipe, extends through the insertion hole through the cylindrical portion, and is joined to the opposite end of the joint member by drawing for expanding an end portion of the inner pipe to form the plastically deformed area of the inner pipe or by bead pressure-contact machining the end portion of the inner pipe to form the plastically deformed area of the inner pipe, and the outer pipe is joined to the cylindrical portion formed at the end of the joint member by drawing for contracting the end portion of the outer pipe to form the plastically deformed area of the outer pipe.

6. A double pipe structure according to claim 5, wherein a seal member is interposed in a joint portion of the joint member and the inner pipe or in a joint portion of the joint member and the outer pipe.

7. A double pipe structure according to claim 5, wherein rigidity of the inner pipe is lower than rigidity of the outer pipe.

8. A double pipe structure comprising:
   a double pipe in which an inner pipe is laid in an outer pipe, said inner pipe and said outer pipe being formed differently from each other; and
   a joint member joined to an end portion of said inner pipe and an end portion of said outer pipe; wherein
   said inner pipe is joined to said joint member in a state in which said inner pipe is arranged eccentric with respect to said outer pipe;
   an end portion of the inner pipe and an end portion of the outer pipe each define a plastically deformed area directly engaging the joint member for joining the joint member to the inner and outer pipes; and
   the end portion of the inner pipe extends from the end portion of the outer pipe, extends through an insertion hole defined by the joint member and is joined to the joint member by expanding the end portion of the inner pipe at a side of the joint member to form the plastically deformed area of the inner pipe.

9. A double pipe structure according to claim 8, wherein said joint member has a port and an extending passage extending from said outer pipe and communicating with the port, and wherein said inner pipe is arranged eccentric with respect to said outer pipe on an opposed side to the port.

10. A double pipe structure according to claim 8, wherein a bent portion is formed in a portion of said double pipe in the longitudinal direction.

11. A double pipe structure according to claim 8, wherein a fluid of high pressure circulates in said inner pipe and a fluid of low pressure circulates in said outer pipe.

12. A double pipe structure comprising:
   a double pipe in which an inner pipe is laid in an outer pipe, said inner pipe and said outer pipe being formed differently from each other, and
   a joint member joined to an end portion of said inner pipe and an end portion of said outer pipe; wherein
   said joint member includes a body, a cylindrical male portion protruding from the body and to which said outer pipe is connected, an extending passage extending from said outer pipe and communicating with a hollow portion of the cylindrical male portion, and a groove, a diameter of the groove being smaller than an outer diameter of the cylindrical male portion, formed on the cylindrical male portion, and wherein
   said outer pipe is disposed over the cylindrical male portion of said joint member, the end portion of said outer pipe defining a plastically deformed area disposed within the groove of the cylindrical male portion to join the outer pipe to the cylindrical male portion of said joint member.

* * * * *